(12) United States Patent
Shimomura et al.

(10) Patent No.: US 7,186,969 B2
(45) Date of Patent: Mar. 6, 2007

(54) OPTICAL CONFIGURATION FOR IMAGING-TYPE OPTICAL ENCODERS

(75) Inventors: Toshitaka Shimomura, Utsunomiya (JP); Shingo Nihommori, Kawasaki (JP); Miyako Mizutani, Kawasaki (JP); Eric Herbert Altendorf, Edmonds, WA (US); Joseph Daniel Tobiason, Woodinville, WA (US)

(73) Assignee: Mitutoyo Corporation, Kawasaki (JP)

( * ) Notice: Subject to any disclaimer, the term of this patent is extended or adjusted under 35 U.S.C. 154(b) by 202 days.

(21) Appl. No.: 10/804,636

(22) Filed: Mar. 19, 2004

(65) Prior Publication Data

US 2004/0173737 A1    Sep. 9, 2004

Related U.S. Application Data

(63) Continuation-in-part of application No. 10/776,899, filed on Feb. 11, 2004.

(30) Foreign Application Priority Data

Feb. 12, 2003   (JP)   .............................. 2003-034284

(51) Int. Cl.
  *G01D 5/34*   (2006.01)
  *G01D 5/36*   (2006.01)
(52) U.S. Cl. .................... 250/231.13; 250/237 R; 250/237 G; 33/1 PT; 341/13
(58) Field of Classification Search ................
  250/231.1–231.19, 237 R, 237 G; 356/356, 356/373, 375; 33/1 PT; 341/11, 13
See application file for complete search history.

(56) References Cited

U.S. PATENT DOCUMENTS 3,454,777 A   7/1969   Marcus
4,051,367 A   9/1977   Sayce et al.

(Continued)

FOREIGN PATENT DOCUMENTS

DE   1 523 231   5/1969

(Continued)

OTHER PUBLICATIONS

English Translation of Chinese Office Action issued in corresponding Chinese Patent Application No. 2004-10045139.4, 4 pages.

(Continued)

*Primary Examiner*—Stephone B. Allen
*Assistant Examiner*—Patrick J. Lee
(74) *Attorney, Agent, or Firm*—Christensen O'Connor Johnson Kindness PLLC

(57) ABSTRACT

A displacement measuring device including a scale, and an optical readhead including an index pattern and a light receiving element is provided. A bright/dark pattern arising from a scale grating is detected by the readhead to measure displacement. In various embodiments, a magnification of the pattern is adjusted by the spacing between at least a lens element, aperture element, and detection plane of the readhead. An aperture can be designed to provide a diffraction-limited telecentric imaging configuration that filters an image of the scale grating to provide a sinusoidal intensity pattern that supports highly interpolated measurements. An aperture dimension, selected in relation to the grating pitch and other parameters, can provide a desirable combination of readhead operating characteristics including one or more of a desired depth of field; degree of spatial filtering; and optical signal power.

34 Claims, 28 Drawing Sheets

U.S. PATENT DOCUMENTS

| | | | |
|---|---|---|---|
| 4,799,798 A | 1/1989 | Erb | |
| 4,974,962 A | 12/1990 | Stephens et al. | |
| 5,539,519 A * | 7/1996 | Takagi et al. | 356/499 |
| 5,576,537 A | 11/1996 | Holzapfel | |
| 5,751,492 A | 5/1998 | Meyers | |
| 6,617,572 B2 * | 9/2003 | Ishizuka | 250/237 G |
| 6,635,863 B1 * | 10/2003 | Nihommori et al. | 250/231.13 |
| 2003/0209658 A1 | 11/2003 | Iguchi et al. | |

FOREIGN PATENT DOCUMENTS

| | | |
|---|---|---|
| JP | 59-134006 | 9/1984 |
| JP | B-60-23282 B2 | 6/1985 |
| JP | 62-200223 A | 9/1987 |
| JP | A-1-57120 A | 3/1989 |
| JP | B-2610624 B2 | 2/1997 |
| JP | 2002-231604 A | 8/2002 |
| JP | 2003-021787 A | 1/2003 |
| JP | 2003-307440 A | 10/2003 |

OTHER PUBLICATIONS

Christian Berger, "Design of telecentric imaging sytstems for noncontact velocity sensors," Oct. 2002, Optical Engineering, vol. 41 No. 10, pp. 2599-2606.

* cited by examiner

| OUTER DIAMETER DIS. (mm) | EFFECTIVE FOCAL LENGTH EFL (mm) |
|---|---|
| 1.0 | 0.6 |
| 1.0 | 1.0 |
| 1.5 | 1.0 |
| 1.5 | 1.5 |
| 2.0 | 1.5 |
| 2.0 | 2.0 |
| 2.5 | 2.0 |
| 2.5 | 2.5 |
| 2.5 | 3.0 |
| 3.0 | 3.0 |
| 3.0 | 4.5 |
| 3.0 | 6.0 |
| 3.0 | 9.0 |
| 3.0 | 12.0 |
| 3.0 | 15.0 |
| 4.0 | 4.0 |
| 4.0 | 6.0 |
| 4.0 | 8.0 |
| 4.0 | 10.0 |
| 4.0 | 12.0 |
| 4.5 | 4.5 |
| 4.5 | 9.0 |
| 5.0 | 5.0 |
| 5.0 | 10.0 |
| 5.0 | 12.0 |
| 5.0 | 15.0 |
| 6.0 | 6.0 |
| 6.0 | 9.0 |
| 6.0 | 12.0 |
| 6.0 | 15.0 |
| 6.0 | 18.0 |
| 6.0 | 21.0 |
| 6.0 | 24.0 |
| 6.0 | 30.0 |
| 6.0 | 36.0 |
| 6.0 | 48.0 |
| 6.0 | 72.0 |
| 9.0 | 9.0 |
| 9.0 | 13.5 |
| 9.0 | 18.0 |
| 9.0 | 22.0 |
| 9.0 | 27.0 |
| 9.0 | 36.0 |
| 9.0 | 45.0 | f VERSUS DIAMETER OF EDMOND LENS

OPTICAL CONFIGURATION FOR IMAGING-TYPE OPTICAL ENCODERS

CROSS-REFERENCE TO RELATED APPLICATIONS

This application is a continuation-in-part application of U.S. patent application Ser. No. 10/776,899, filed Feb. 11, 2004, the filing date and priority of which is hereby claimed under 35 U.S.C. § 120. U.S. patent application Ser. No. 10/776,899 claims priority from Japanese Patent Application No. 2003-034284, filed Feb. 12, 2003, under 35 U.S.C. § 119. The key content of U.S. patent application Ser. No. 10/776,899 is included herein, and it is otherwise incorporated herein by reference in its entirety.

FIELD OF THE INVENTION

The present invention relates to optical or photoelectric encoders that sense the displacement of a periodic scale pattern.

BACKGROUND OF THE INVENTION

In the related art, a transmission-type photoelectric encoder as shown in FIG. 15 has been used. The transmission-type photoelectric encoder as shown in FIG. 15 includes a light source 10, a collimator lens 12, a transmission-type main scale 20, and a light receiving portion 30. The collimator lens 12 forms the light emitted from the light source 10 into parallel rays. The transmission-type main scale 20 has a first grating 21 having a predetermined pitch P at a surface (lower face in the drawing) thereof. The light receiving portion 30 consists of an index grating 31 having a predetermined pitch Q and a light receiving element 32.

In the transmission-type photoelectric encoder of FIG. 15, since the index grating 31 and the light receiving element 32 are formed as individual parts, they need to be assembled to form the light receiving portion 30. Further, a plurality of light receiving elements 32A, 32B are needed for discriminating directions (A phase, B phase) and they need selection, to obtain uniform optical sensitivity and uniform temperature characteristics.

To solve such problems, as described in Japanese Publication JP-B-2610624, there is proposed a transmission-type photoelectric encoder using a light receiving element array 33 as the light receiving portion, as shown in FIG. 16 (front view) and FIG. 17 (plane view taken along line III—III of FIG. 16). That is, the light receiving element array 33 includes an index grating pattern having the predetermined pitch Q and a light receiving element 32, which are integrally formed with each other. In FIG. 17, numeral 34 designates a preamplifier and numeral 36A, 36B designate differential amplifiers.

By adopting such a light receiving element array 33, a number of advantages are achieved including realizing small-sized formation and signal stability.

Further, in a reflection-type photoelectric encoder, as described in JP-B-60-23282, a three-grating system is used, as shown in FIG. 18. That is, the reflection-type photoelectric encoder includes a first grating 51 on an index scale 50, a second grating 42 on a reflection-type main scale 40, and a third grating (index grating) 53 on the index scale 50. A bright/dark pattern obtained by the two gratings (the first grating 51 and the second grating 42) is changed by moving the gratings relative to each other. The bright/dark pattern is filtered by the third grating 53 to thereby detect a relative movement amount of the main scale 40 and the index scale 50. This reflection-type photoelectric encoder can obtain the above-described advantages by using the light receiving element array 33 (arranged to face the main scale 40 in FIG. 18) as the light receiving portion.

However, in any of the encoders described above, the grating pitch Q on the light receiving side is determined by the grating pitch P of the main scale 20, 40. Therefore, when using a main scale having a grating pitch different from the pitch P, the light receiving portion needs to be remade or replaced with a new one to correspond with the main scale having a different grating pitch. Further, the bright/dark pattern is obtained only at a distance from the surface of the grating 21, 42 of the main scale 20, 40, which distance is determined by the grating pitch P and an optical wavelength $\lambda$. Therefore, whenever a gap between the main scale and the light receiving portion changes, a signal output of the light receiving portion decreases, regardless of whether the light receiving array 33 is adopted or not.

Further, according to the encoder utilizing a three-grating system, as shown in FIG. 18, normally, the second grating 42 is formed on the main scale 40. Therefore, as shown in FIG. 19, when there is waviness at the surface of the main scale 40, a measurement error may result from a change in a reflected angle of light.

It is apparent from the foregoing description that displacement measurements are typically made by sensing the relative change in the position of a scale from a reference position relative to a photoelectric encoder readhead (which is sometimes simply referred to as a "readhead" herein) of an optical encoder. Typically, this requires sensing a periodic scale pattern so that periods of the pattern can be counted during movement, and furthermore sensing the position of the scale pattern within a particular period at the start and finish of a motion, to provide a measurement resolution that is finer than the period of the scale pattern. Providing a measurement resolution that is finer than the period of the scale pattern is often referred to as signal interpolation, measurement signal interpolation, or providing an interpolated measurement.

In addition to the previously described optical encoders, various optical encoders are known that use a readhead having a relatively simple optical arrangement that includes a lens to provide an image of the scale pattern to a photodetector arrangement in the readhead. This type of system, which images a scale pattern onto an optical reader to thereby measure the relative or absolute displacement of the scale pattern, is called an imaging-type encoder. One such system is disclosed in U.S. Pat. No. 5,539,519, to Takagi et al., which is incorporated herein by reference. The system described in the '519 patent includes an encoder plate having a periodic slit pattern. A light source illuminates the slit pattern to form a primary fringe image. A lens projects the primary fringe image by a given magnification to form a secondary enlarged fringe image that shifts along a second plane. A fixed light receiving unit receives the shifting image through a fixed periodic mask pattern (an index grating) at the second plane. However, the signals provided by an encoder according to the '519 patent are suitable only for very crude levels of measurement signal interpolation. In addition, various characteristics of the signals are not stable with respect to various potential misalignments and gap variations between the encoder readhead and scale. Thus, an encoder according to the '519 patent cannot provide robust signals suitable for significant levels of measurement signal interpolation.

Some imaging-type optical encoder readheads are known that use a relatively simple optical arrangement that further includes a telecentric aperture. A telecentric aperture provides relatively constant magnification over a desired range of object distances. However, similarly to the '519 patent, the signals provided by such known readheads also are suitable only for very crude levels of measurement signal interpolation. Thus, their resolution and accuracy are relatively crude.

A position sensing device that can overcome the foregoing problems and limitations, individually or in combination, is desirable.

SUMMARY OF THE INVENTION

The invention is proposed to resolve the foregoing problems of the related art. According to one aspect, it is an object of the present invention to provide a photoelectric encoder capable of using alternative main scales having different pitches together with one kind of a light receiving portion, and further having a simple structure.

In order to accomplish the object above, a photoelectric encoder is proposed comprising a main scale with a grating, and a light receiving portion with an index grating pattern and a light receiving element, wherein the light receiving portion is capable to move relative to the main scale and the light receiving portion detects a bright/dark pattern obtained at least by the grating of the main scale. The photoelectric encoder further comprises a lens disposed between the main scale and the light receiving portion, wherein a magnification of an image is set by adjusting distances among the lens, the main scale, and the light receiving portion. The bright/dark pattern can be set by designing an optical system such that the bright/dark pattern is an interference pattern of an image of the main scale.

Further, in order to simplify the structure of the light receiving portion, in the photoelectric encoder, the light receiving portion may be a light receiving element array in which the index grating pattern and the light receiving element are integrally formed with each other.

Still further, in order to improve a gap variation characteristic, the photoelectric encoder may further comprise an aperture disposed at a position of a focal point of the lens.

In accordance with another aspect of the invention, in the photoelectric encoder, a lens array may be used as the lens to improve the gap variation characteristics.

Still further, the photoelectric encoder may further comprise an aperture array disposed at a position of the focal points of the lens array.

Still further, in order to prevent incidence of stray light from an adjacent lens of the lens array, the photoelectric encoder may further comprise a partition plate placed between the adjacent lenses of the lens array.

Still further, according to various embodiments of the present invention, an influence of the waviness of a surface of the scale is reduced when the main scale is of a reflecting type or a transmissive type.

Still further, the structure is simplified in various embodiments by using a diffused light source and using a collimator lens as the lens.

Particularly, in various embodiments according to this invention, when the aperture is inserted between the main scale and the index grating or the light receiving element, an influence of a variation in a gap between the main scale and the light receiving portion can be reduced and stable signals can be obtained.

According to another aspect of the invention, a photoelectric encoder comprises a main scale with a grating, and a light receiving portion with an index grating pattern and a light receiving element, wherein the light receiving portion is capable of moving relative to the main scale, and the light receiving portion detects a bright/dark pattern obtained at least by the grating of the main scale. The photoelectric encoder further comprises an aperture disposed between the main scale and the light receiving portion, wherein a magnification of an image is set by adjusting distances among the aperture, the main scale, and the light receiving portion. Further, in order to simplify the structure of the light receiving portion, in the photoelectric encoder, the light receiving portion may be a light receiving element array in which the index grating pattern and the light receiving element are integrally formed with each other.

In various embodiments according to this invention, alternative scales having different grating pitches can be used with one kind of the light receiving portion.

In accordance with another aspect of the invention, in various embodiments, the lens may be omitted to reduce the cost of production, and further to reduce the size of the encoder system to permit liberal setting of its magnification.

According to another aspect of the invention, in various other embodiments, an imaging-type encoder system according to this invention includes a relatively small number of optical elements in the readhead of the encoder and employs a telecentric aperture selected to balance certain design tradeoffs in order to provide a desirable combination of multiple optical characteristics for the readhead. Thus, in various embodiments, the present invention is directed to further improved and refined telecentric aperture configurations for imaging-type optical encoders.

In accordance with this aspect of the invention, the optical assembly is configured as a diffraction-limited telecentric system, which includes a limiting aperture that is located at the focal point of an imaging lens. Accordingly, only light rays that are input to the lens approximately parallel to the optical axis of the lens and aperture are allowed through the aperture. A key advantage of such a diffraction-limited telecentric system is that it provides a magnification for the operable scale images in the readhead that is approximately independent of the distance between the readhead and the scale. In particular, according to this invention, a dimension of the limiting aperture aligned along the direction of the measuring axis of the encoder system is selected to provide a desired depth of field for the readhead imaging system, as well as providing approximately constant magnification along the direction of the measuring axis (i.e., the magnification of the dimension along the measuring axis is approximately constant within the desired depth of field). Within the depth of field, the telecentric imaging system will generally show little or no magnification error and will maintain high image contrast. Such embodiments thus provide robust mounting tolerances and relatively strong measuring signals.

In accordance with a further aspect of the invention, the magnification of a scale image is set by adjusting distances among the aperture, the lens, and the light receiving portion, and the magnification is relatively independent of a spacing between the readhead and the scale.

In accordance with a further aspect of the invention, various embodiments of the encoder readhead are constructed with a dimension of the limiting aperture aligned along the direction of the measuring axis that provides a diffraction-limited imaging system and provides a desired degree of spatial filtering in relation to a spatial period or pitch of the scale grating or scale pattern, to provide an approximately ideal sinusoidal intensity pattern at a detector of the readhead. Such embodiments thus provide robust mounting tolerances in a manner that is simple, economical, and capable of providing stable measurement signals that are suitable for higher levels of interpolation, resolution, and accuracy than prior art readheads.

In accordance with a further aspect of the invention, various embodiments of the encoder readhead are constructed using fiber optic receiver channels.

In accordance with a further aspect of the invention, various embodiments of the encoder readhead are miniature all-optical fiber optic readheads.

In accordance with a further aspect of the invention, various embodiments of the encoder readhead are constructed with a dimension of the limiting aperture aligned along the direction of the measuring axis that further provides at least a minimum desired proportion of the available contrast in the sinusoidal intensity pattern at the detector of the readhead.

In accordance with a further aspect of the invention, various embodiments of the encoder readhead are constructed with a dimension of the limiting aperture aligned along the direction of the measuring axis that is selected from a range that corresponds to a range of spatial frequency cutoff values that is refined to provide a desirable combination of readhead operating characteristics including one or more of a desired depth of field; degree of spatial filtering; and optical signal power.

In accordance with a further aspect of the invention, the dimension of the limiting aperture aligned along the direction of the measuring axis is selected to correspond to a refined range of spatial frequency cutoff values that is further refined depending on the particular dimension of the scale grating pitch in microns, in order to provide an aperture dimension that is customized to that particular scale grating pitch so as to provide a combination of readhead operating characteristics for that particular scale grating pitch that is preferred in some applications.

In accordance with another aspect of the invention, the limiting aperture is relatively elongated in a direction transverse to the measuring axis.

In accordance with a further aspect of the invention, the relatively elongated dimension of the aperture is limited according to a relation that provides a relatively uniform nominal illumination in the sinusoidal intensity pattern at a detector of the readhead.

In accordance with another aspect of the invention, an optical axis of a readhead according to this invention is oriented along a direction normal to a nominal plane of a reflective scale grating.

In accordance with a further aspect of the invention, a readhead according to the invention is usable with a faceted reflective scale grating included on a tape-type scale.

In accordance with another aspect of the invention, a readhead according to this invention uses a limiting aperture plate that is highly reflective and angled relative to an optical axis of the readhead, in order to deflect light from a readhead light source along the optical axis to a reflective scale grating that is oriented approximately normal to the optical axis. Image light reflected from the reflective scale grating travels back along the optical axis and though the aperture of the limiting aperture plate.

In accordance with another aspect of the invention, in various embodiments which include a lens and an aperture located at the focal point of the lens, a second lens may be positioned between the aperture and the light receiving element. In one exemplary embodiment the second lens is located nominally symmetrically to the other lens about the plane of the aperture, and has optical characteristics that are similar or identical to the other lens. Thus, the second lens tends to compensate or eliminate optical aberrations induced by the first lens. In various exemplary embodiments, such an arrangement is used with economical lenses that are of particularly small diameter and simple form, in order to provide superior optical characteristics and an accurate image despite the low cost, small size and simplicity of such lenses.

In accordance with a separate aspect of the invention, various embodiments of the encoder readhead are constructed in a particularly economical, accurate, and compact manner.

Hence, various embodiments of the invention overcome the disadvantages of prior art imaging-type optical displacement sensing devices that use a relatively simple optical arrangement including a lens to provide an image of a scale pattern. Various embodiments include a telecentric aperture designed specifically to provide a diffraction-limited optical system and a desired combination of encoder operating characteristics, in order to provide measurements at an improved level of accuracy, resolution, and robustness by the use of particularly simple and economical elements.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

A detailed explanation will be given of embodiments of the invention in reference to the drawings as follows.

Figure 1:
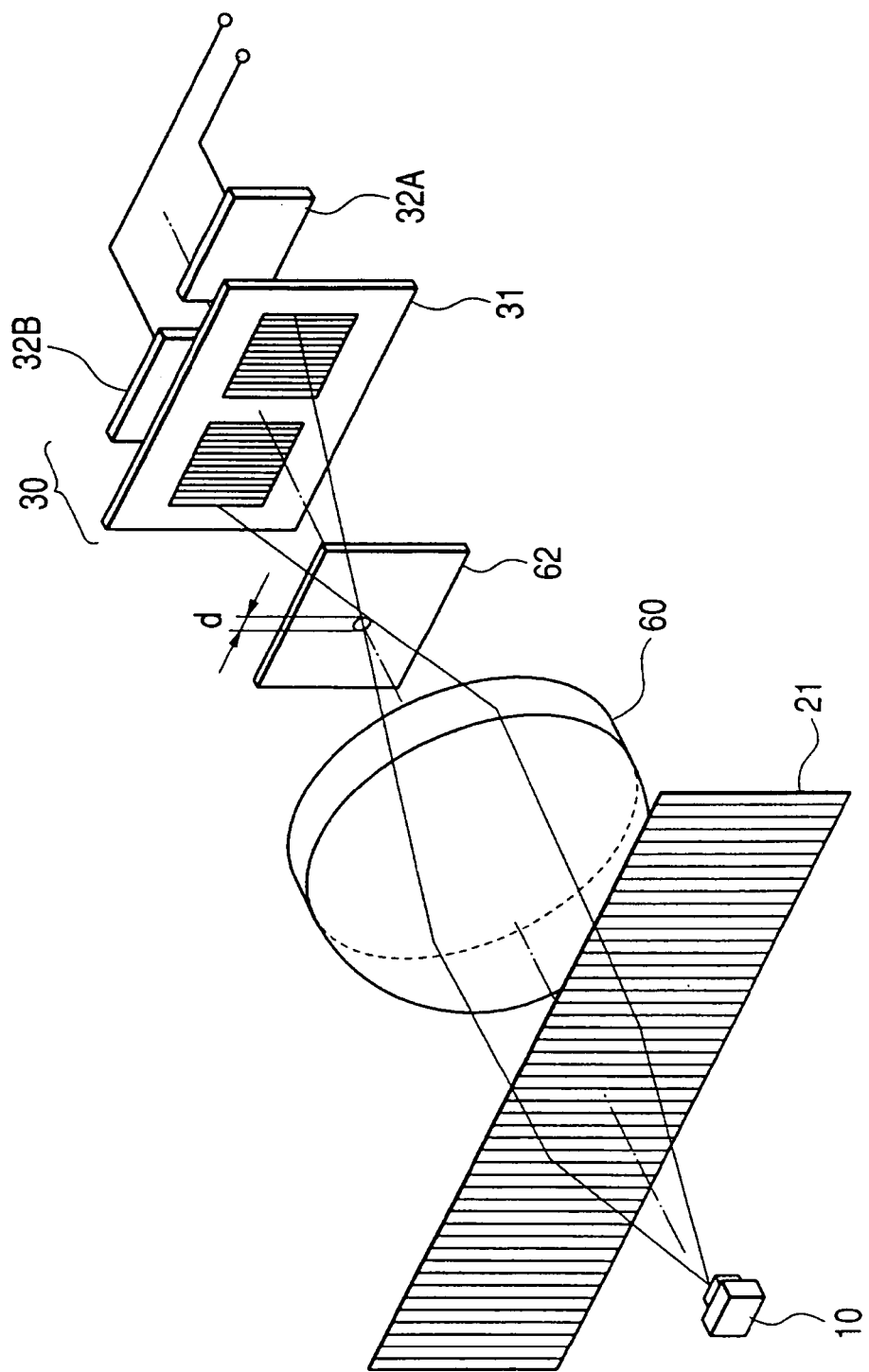
FIG. 1 is a perspective view showing a structure of an essential portion of a transmission-type photoelectric encoder of a first embodiment according to the present invention.
Figure 2:
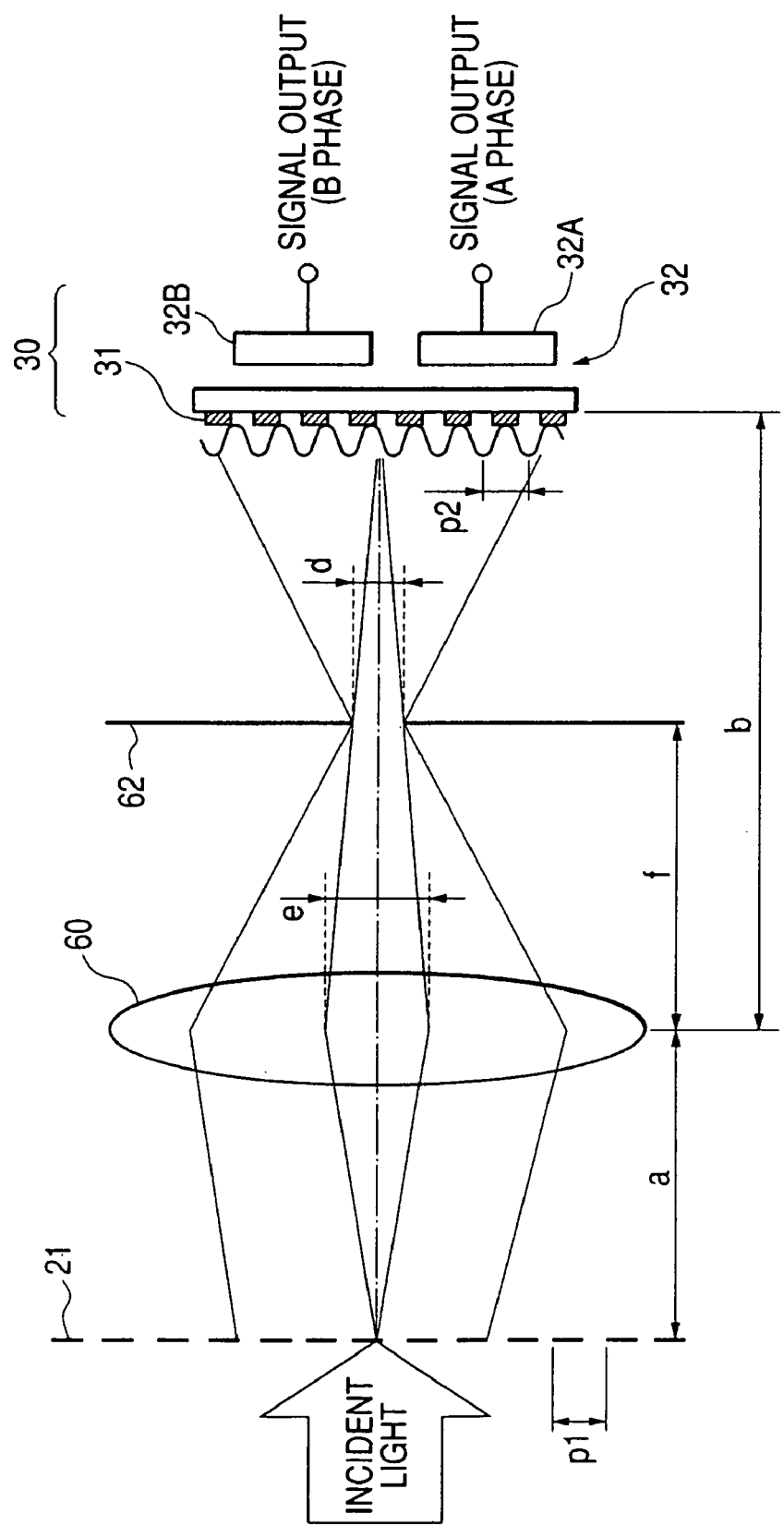
FIG. 2 is an optical path view showing an optical system of the transmission-type photoelectric encoder of the first embodiment according to the invention.
Figure 15:
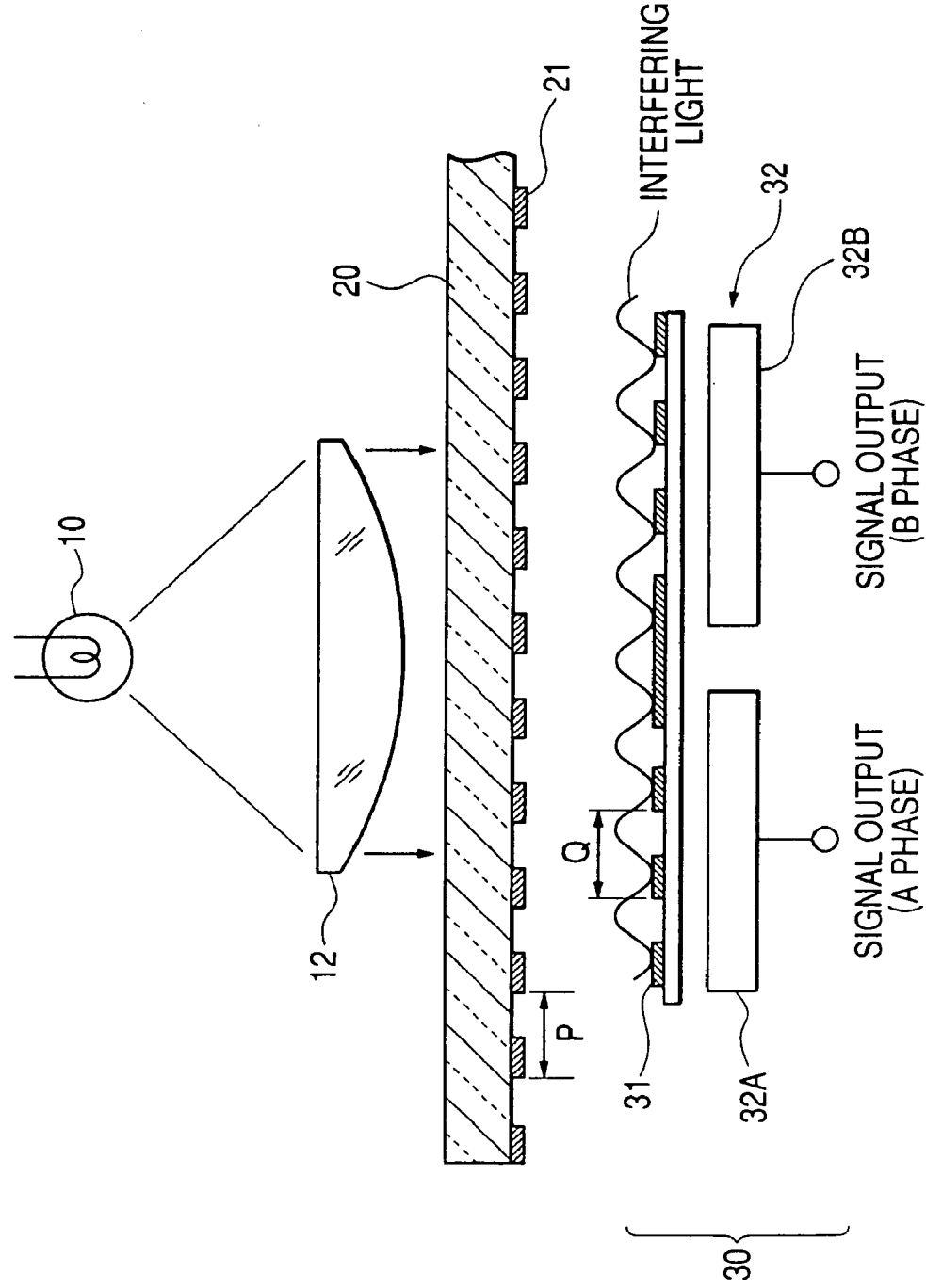
FIG. 15 is a front view showing a structure of an example of a transmission-type photoelectric encoder in the prior art.

According to a first embodiment of the present invention, in a transmission-type photoelectric encoder similar to that in the related art shown in FIG. 15, as shown in FIG. 1 (perspective view) and FIG. 2 (optical path view), a light source 10 is provided. Further, a lens 60 and an aperture 62 are inserted between the first grating 21 of the main scale 20 and the light receiving portion 30, and a magnification of an image is set by adjusting distances a and b between the lens 60 and the first grating 21 and between the lens 60 and the index grating pattern 31, respectively.

According to the first embodiment, light emitted from the light source 10 passes through the first grating 21 of the main scale 20 and is incident on the lens 60. Only light emitted from the lens 60 along an optical axis passing through the aperture 62 provided at a focal point of the lens 60 reaches the index grating pattern 31 to form an image of the first grating 21.

Here, the magnification is calculated from a relationship between a pitch p1 of the main scale 20 and a pitch p2 of the image on the index grating pattern 31 as follows.

$$M = p2/p1 = b/a \qquad \text{(Eq. 1)}$$

Further, in order to provide the image, intervals among the respective devices are determined to satisfy the following equation.

$$1/f = (1/a) + (1/b) \qquad \text{(Eq. 2)}$$

where f is the focal length of the lens. For example, the intervals are determined as shown by Table 1.

TABLE 1

|  | Example 1 | Example 2 |
|---|---|---|
| Pitch of main scale: p1 | 20 μm | 10 μm |
| Pitch of index grating pattern: p2 | | 20 μm |
| Magnification: M | 1 | 2 |
| Focal length of lens: f | | 3 mm |
| Distance btw. scale and lens: a | 6 mm | 4.5 mm |
| Distance btw. lens and index grating: b | 6 mm | 9 mm |
| N.A. by Equation (4) (DOF = 100 Dm) | | 0.066 |

A gap variation characteristic of such an encoder structure is significantly related to a focal depth DOF (depth of field) of a lens optical system, and the larger the focal depth DOF, the wider the range in which the gap (distance a in FIG. 2) is allowed to vary without significantly affecting the operation of the encoder. The focal depth DOF is represented by Equation (3) as follows.

$$DOF = \lambda/(2*N.A.^2) \quad (Eq. 3)$$

where $\lambda$ is a light source wavelength.

The focal depth DOF, that is, the allowable air gap variation range has values respectively suitable for intended purposes of the encoder, and thus, N.A. may be specified to correspond to the intended purposes of the encoder. Therefore, the following inequality is established:

$$DOF <= \lambda/(2*N.A.^2) \quad N.A. < (\lambda/(2 \times DOF))^{1/2} \quad (Eq. 4)$$

Here, when 100 μm is needed as the focal depth DOF, N.A. needs to be smaller than the value calculated by Equation (4). When the light source wavelength $\lambda$ is set to 880 nm:

$$N.A. < (\lambda/(2 \times DOF))^{1/2} = (880 \text{ nm}/(2 \times 100 \text{ μm}))^{1/2} = 0.066$$

Meanwhile, N.A. of the optical system is calculated by Equation (5) as follows.

$$N.A. = (1/2)*(e/a) = M*((1/2)*d/(b-f)) = d/2f \quad (Eq. 5)$$

where d is an aperture size and e is a beam diameter of the lens.

In this way, the light receiving portion having the index grating pattern pitch p2 of 20 μm can respectively correspond to the main scale pitch p1 of either 10 μm and 20 μm.

Figure 3:
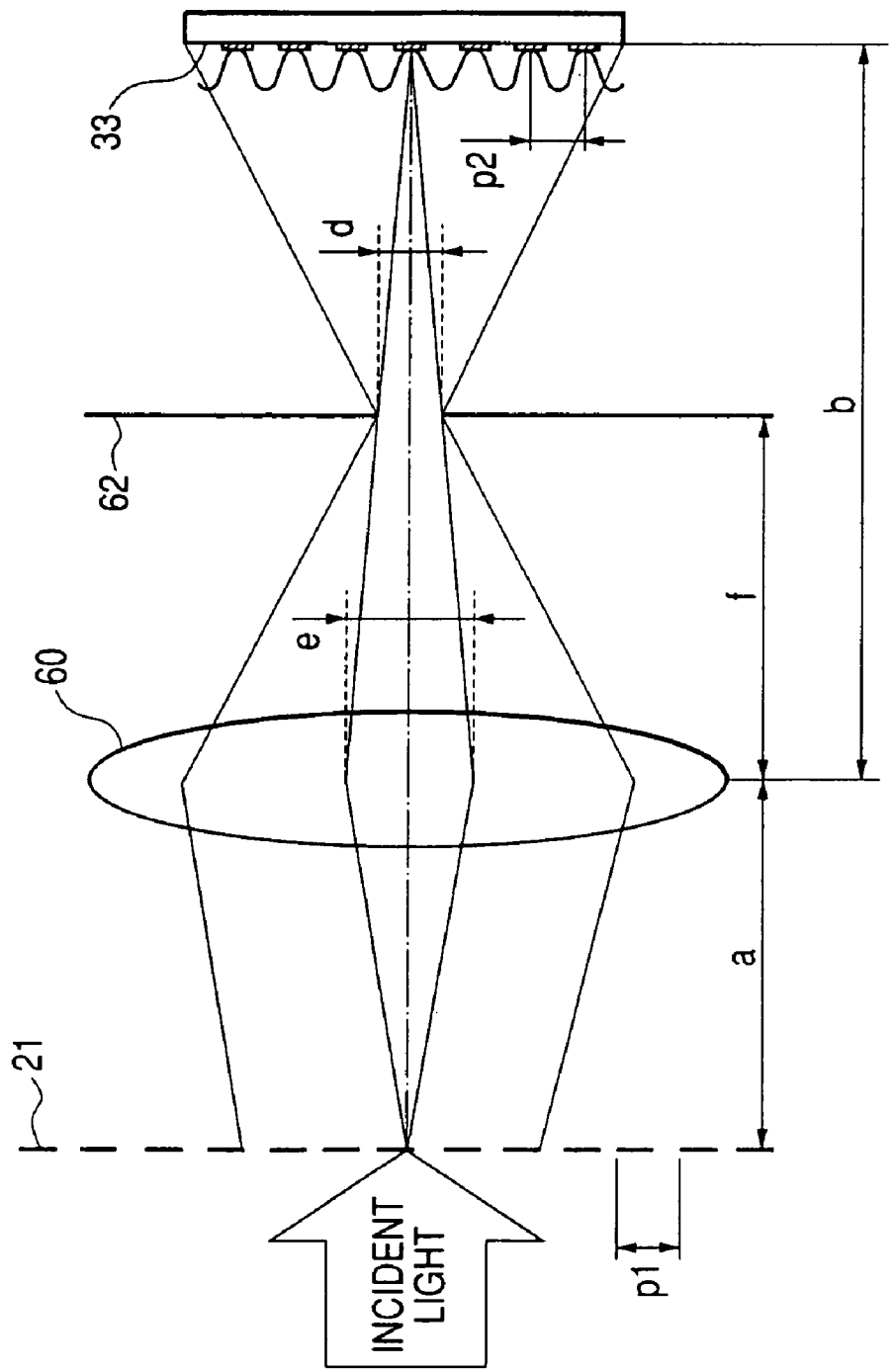
FIG. 3 is an optical path view showing an optical system of a transmission-type photoelectric encoder of a second embodiment according to the present invention using a light receiving element array.
Figure 16:
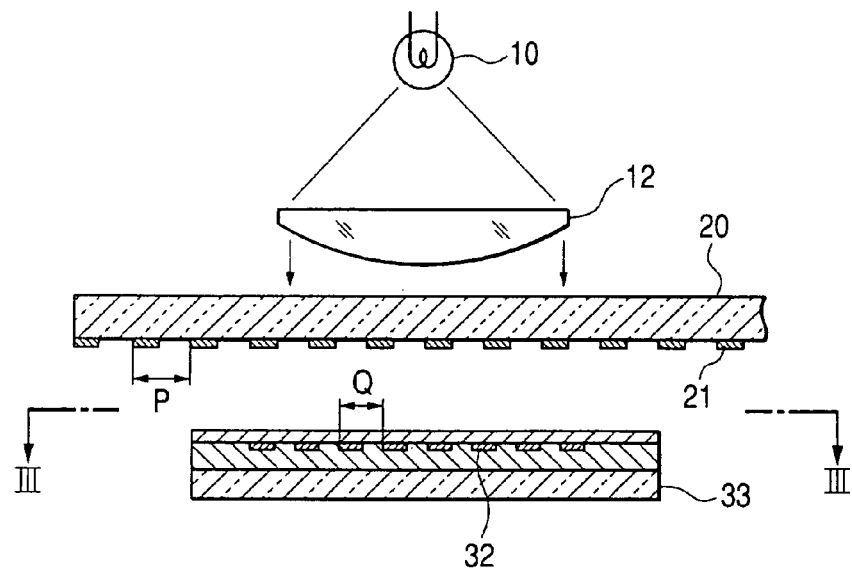
FIG. 16 is a front view showing a structure of an example of a transmission-type photoelectric encoder in the prior art using a light receiving element array.
Figure 17:
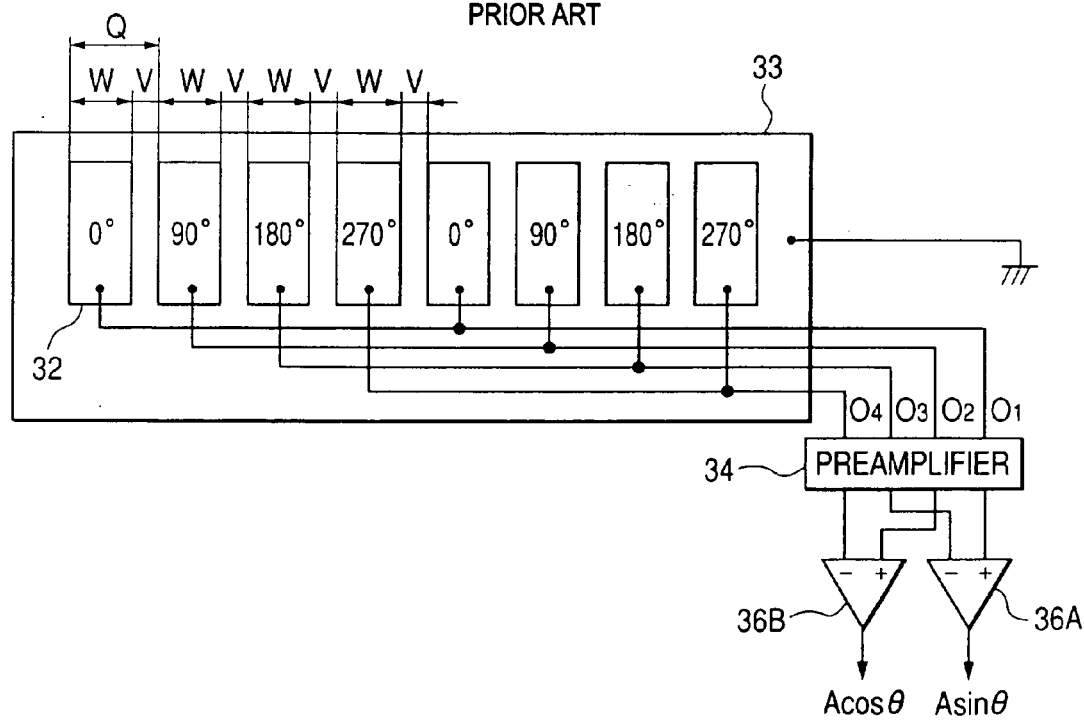
FIG. 17 is a plane view of the light receiving element array taken along line III—III of FIG. 16.
Figure 18:
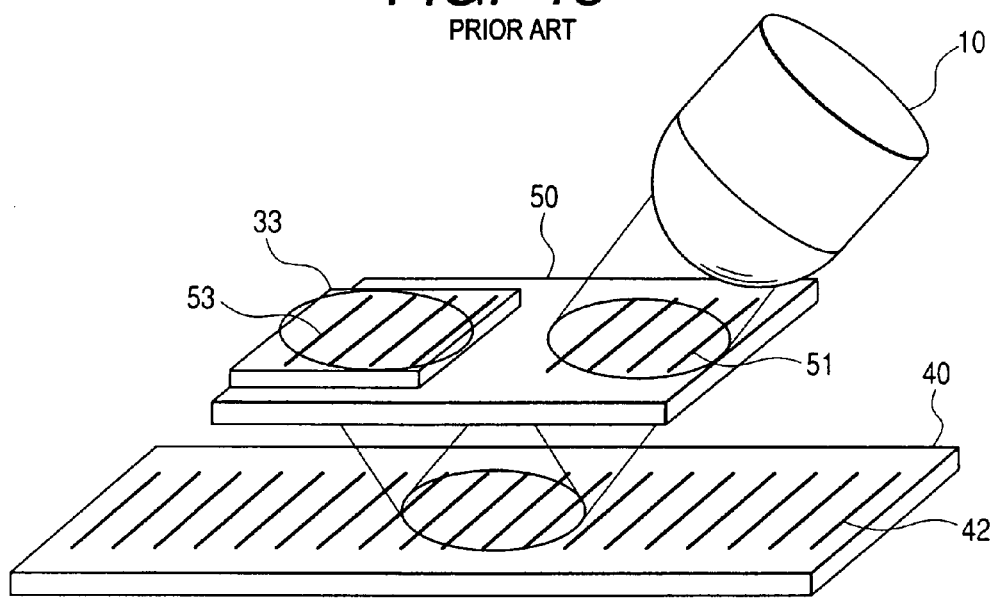
FIG. 18 is a perspective view showing a structure of an example of a reflection-type photoelectric encoder of in the prior art utilizing a three-grating system.
Figure 19:
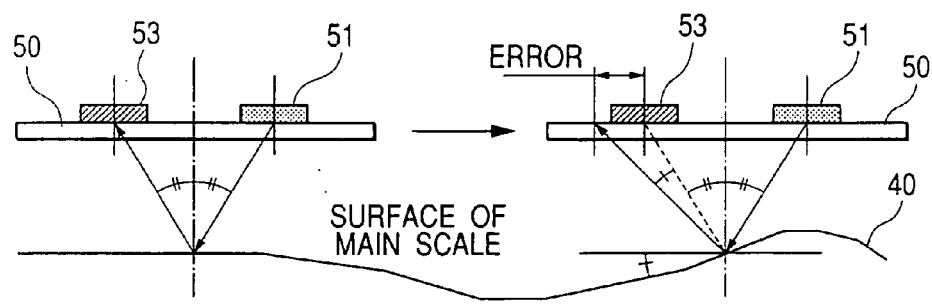
FIG. 19 is an outline front view for explaining a problem of the example of the prior art of FIG. 18.

Further, as a second embodiment, the light receiving portion 30 can be replaced by the light receiving element array similar to that in FIG. 16, as shown in FIG. 3.

Although there is only one optical axis according to the first and the second embodiments, as a third and a fourth embodiment, an explanation will be given of a structure for detection by an optical system comprising a plurality of optical axes using a lens array and an aperture array as follows.

According to the first and the second embodiments described above, the focal length of the lens is 3 mm and, therefore, a distance connecting the main scale, the lens, and the index grating pattern falls in a range of 12 through 13.5 mm. In order to achieve further small-sized formation, the focal length of the lens needs to be reduced.

Figure 4:
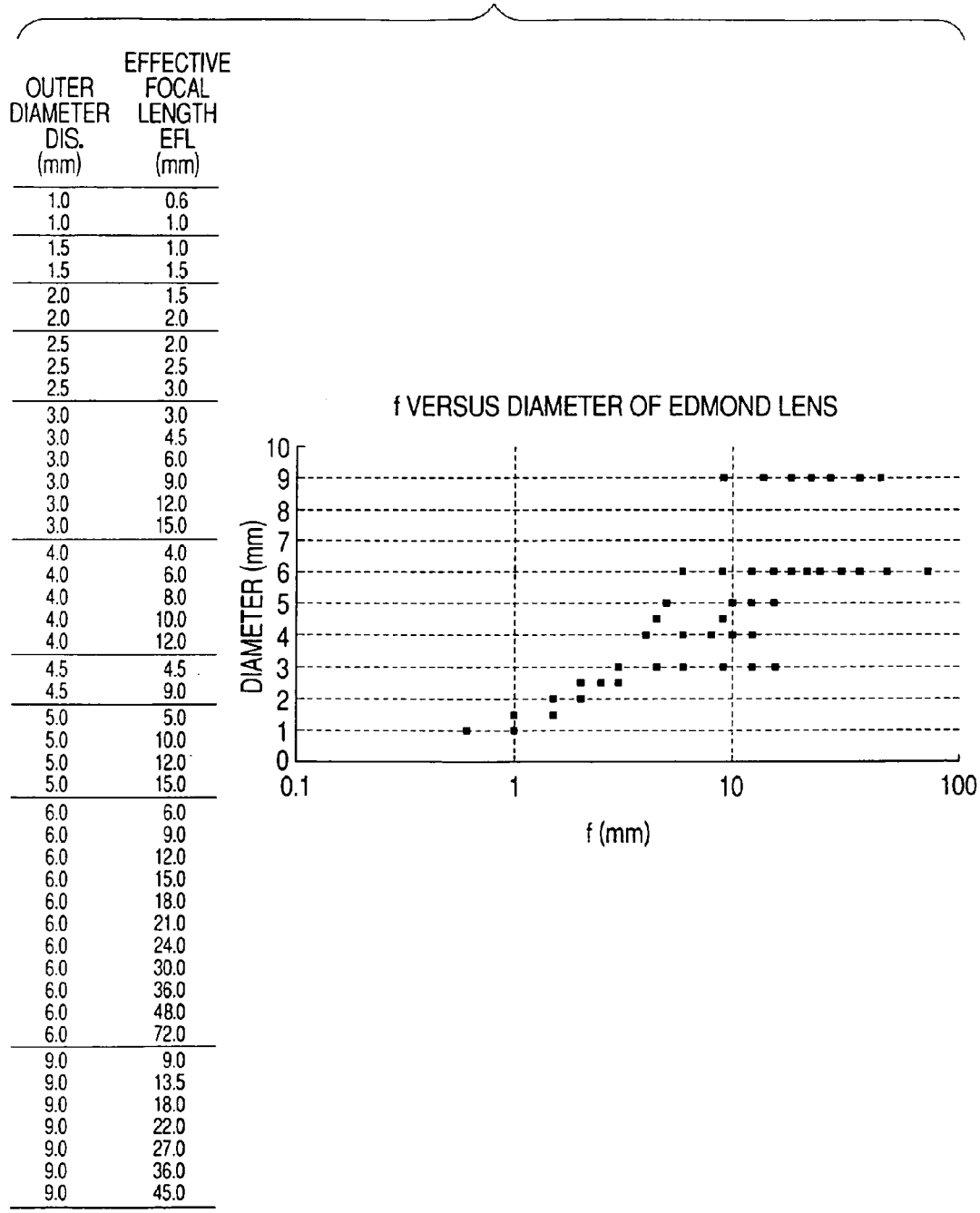
FIG. 4 is a diagram showing a relationship between a focal length and a lens diameter of a flat/convex lens.

However, when the focal length of the lens is reduced, in the case of a general lens that is readily obtainable, a diameter thereof is reduced. (FIG. 4 shows a list of flat/convex lenses available from Edmund Optics Japan Co., Ltd. and a diagram showing a relationship between the focal length f and the diameter of the lens). When the diameter of the lens is reduced, a detectable field of view on the main scale is narrowed.

Figure 5:
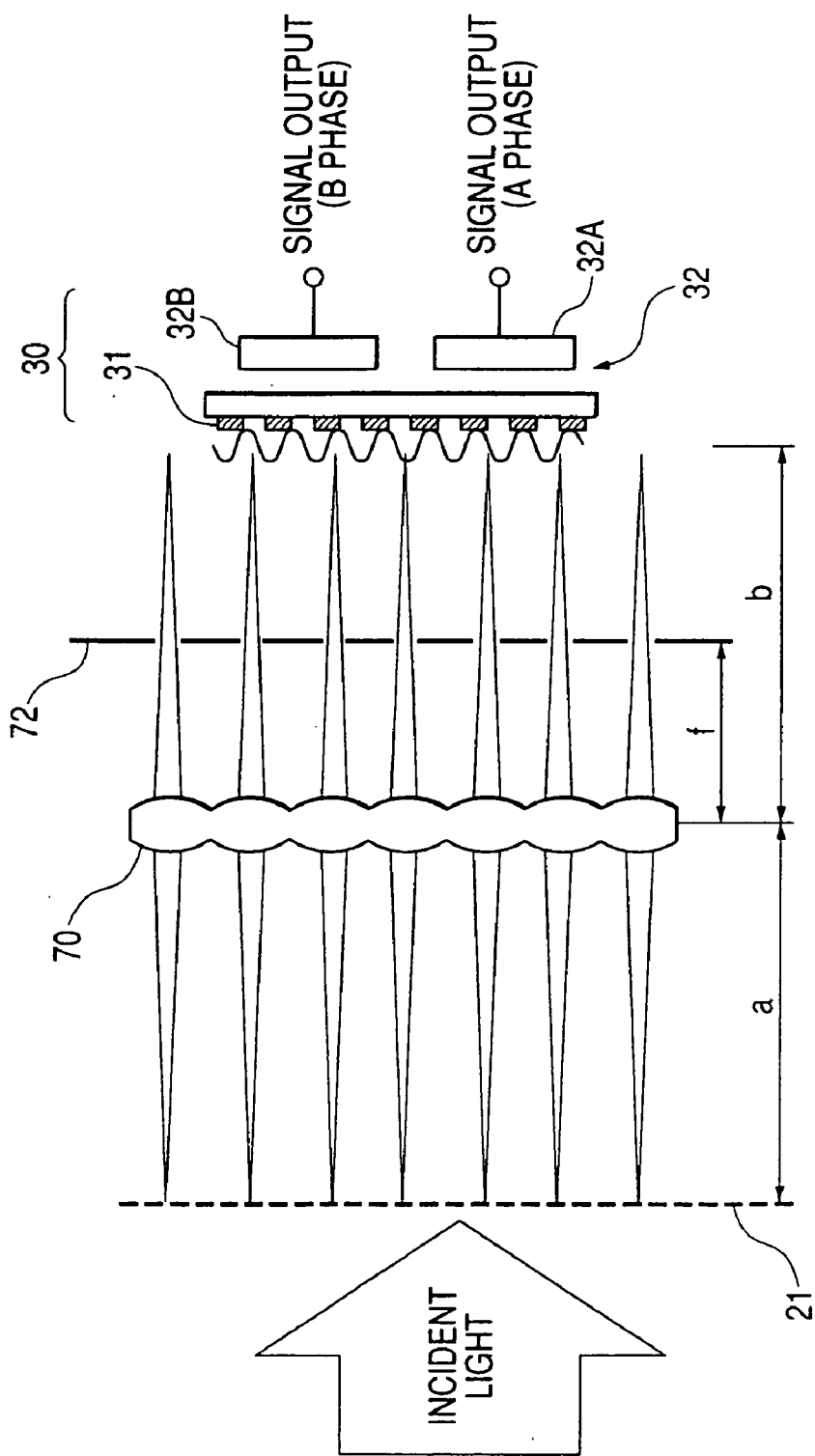
FIG. 5 is an optical path view showing an optical system of a transmission-type photoelectric encoder of a third embodiment according to the present invention using a lens array.

Accordingly, FIG. 5 shows a third embodiment using a lens array 70 and an aperture array 72. In FIG. 5, a method of determining distances among the first grating 21 of the main scale, the lens array 70, the aperture array 72, and the index grating pattern 31 is the same as that of the first embodiment as shown by, for example, Table 2.

TABLE 2

|  | Example 1 | Example 2 |
|---|---|---|
| Pitch of main scale: p1 | 20 μm | 10 μm |
| Pitch of index grating pattern: p2 | | 20 μm |
| Magnification: M | 1 | 2 |
| Focal length of lens: f | | 0.6 mm |
| Distance btw. scale and lens: a | 1.2 mm | 0.9 mm |
| Distance btw. lens and index grating: b | 1.2 mm | 1.8 mm |
| N.A. by Equation (4) (DOF = 100 Dm) | | 0.066 |

Figure 6:
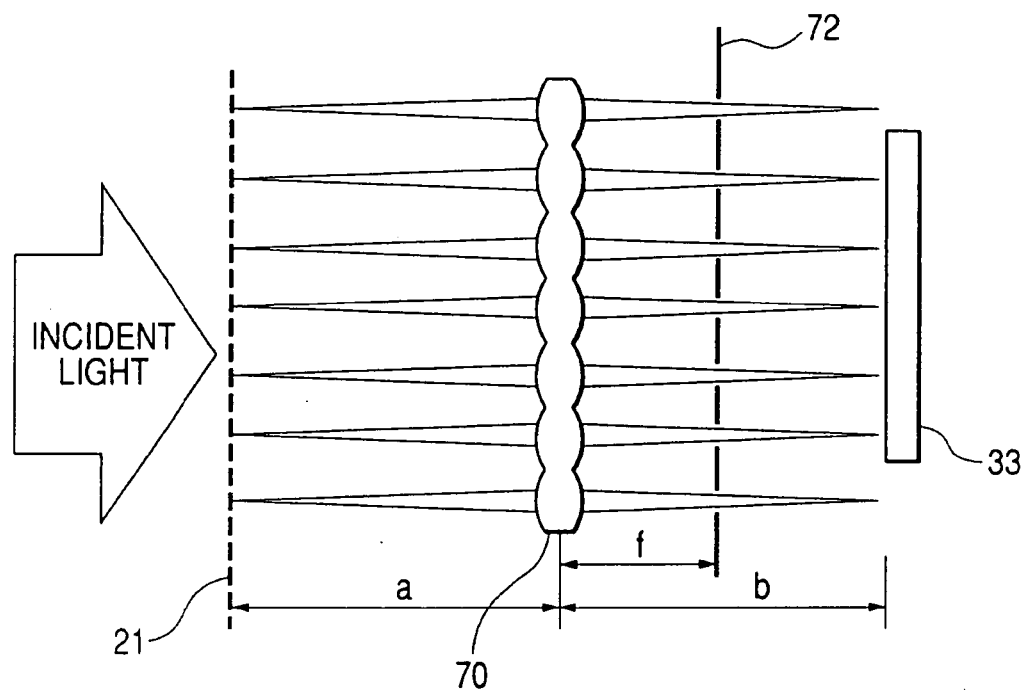
FIG. 6 is an optical path view showing an optical system of a transmission-type photoelectric encoder of a fourth embodiment according to the present invention using a light receiving element array and a lens array.

FIG. 6 shows a fourth embodiment in which the light receiving portion 30 is changed to the light receiving element array 33.

Figure 7:
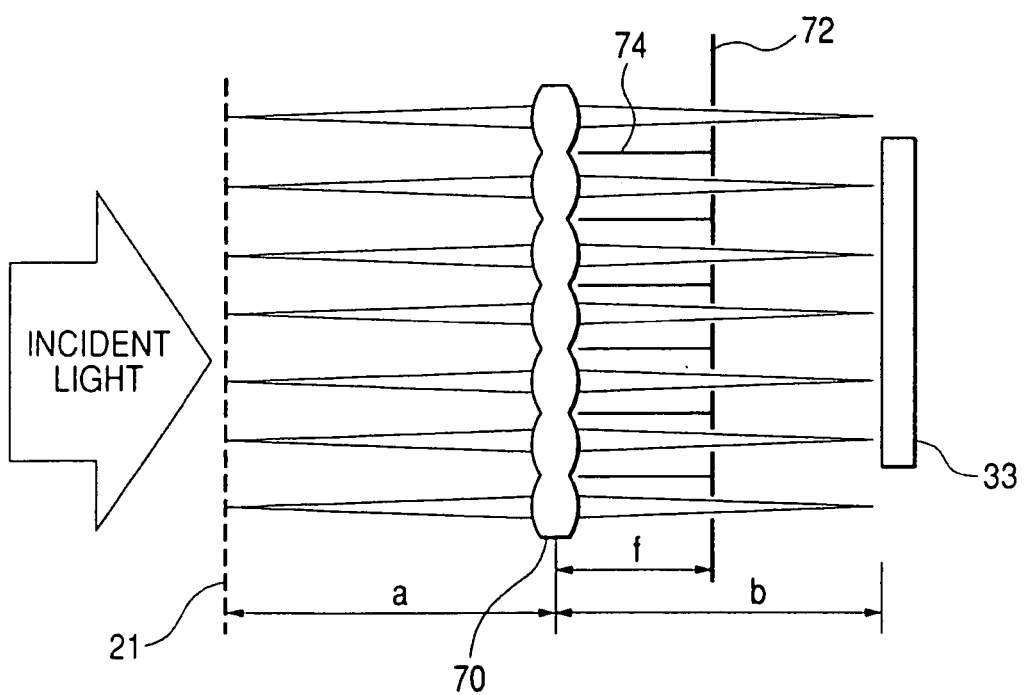
FIG. 7 is an optical path view showing an optical system of a transmission-type photoelectric encoder of a fifth embodiment according to the present invention using partition plates arranged between lenses of a lens array.

In the case of using the lens array, there is a possibility that stray light from one lens of the lens array interferes with, or unintentionally overlaps with, light collected by an adjacent lens. Hence, as in a fifth embodiment shown in FIG. 7, such unwanted stray light can be prevented by providing a partition plate 74 between the lens array 70 and the aperture array 72.

Figure 8:
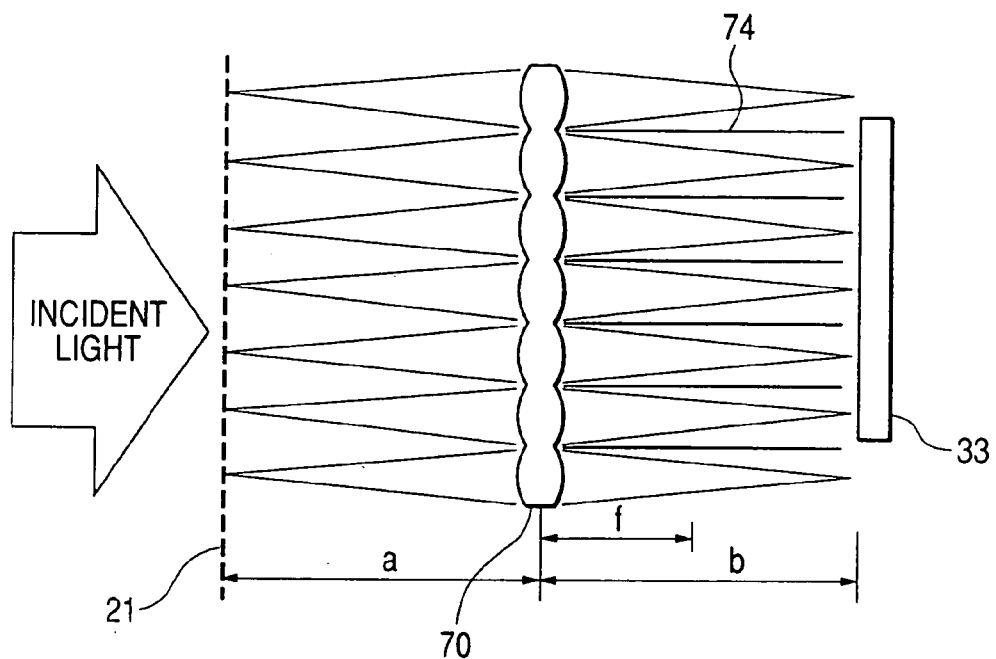
FIG. 8 is an optical path view showing an optical system of a transmission-type photoelectric encoder of a sixth embodiment according to the present invention which does not use an aperture.

Further, when N.A. of the lens array 70 is small and the aperture is not needed, as in a sixth embodiment shown in FIG. 8, the aperture array can be omitted.

Figure 9:
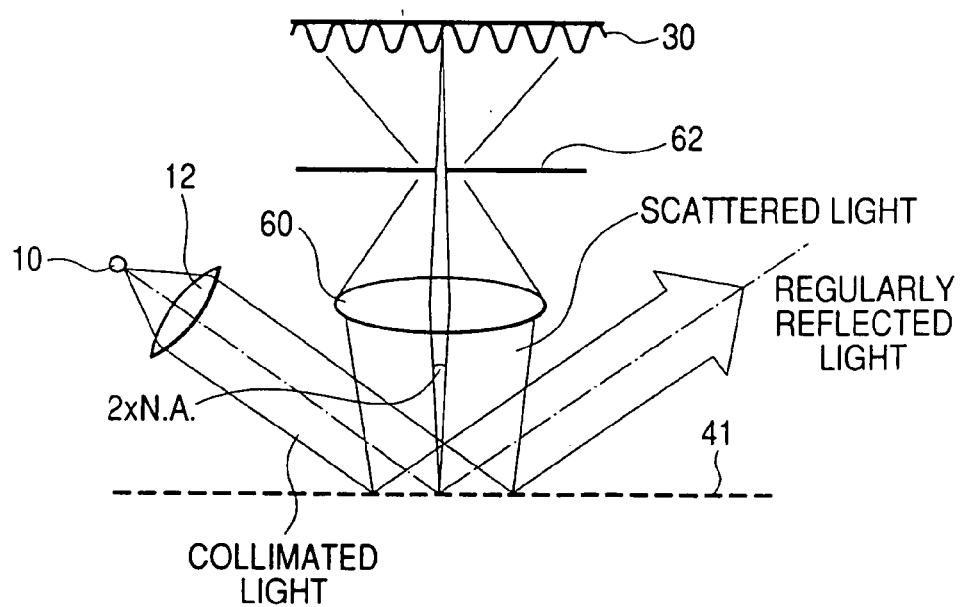
FIG. 9 is an optical path view showing an optical system of a reflection-type photoelectric encoder of a seventh embodiment according to the present invention using a reflection-type main scale.

Further, although a description has been given of the transmission-type photoelectric encoder as described above, also in the reflection-type photoelectric encoder, basically the same structure is constructed as in a seventh embodiment shown in FIG. 9. According to the seventh embodiment, collimated light is incident to a first grating 41 of a reflection-type main scale 40 from an oblique direction and deflected by the first grating 41. Then, the deflected light is restricted by the aperture 62, and thus only the light restricted according to the N.A. is guided to the light receiving portion 30.

Figure 10:
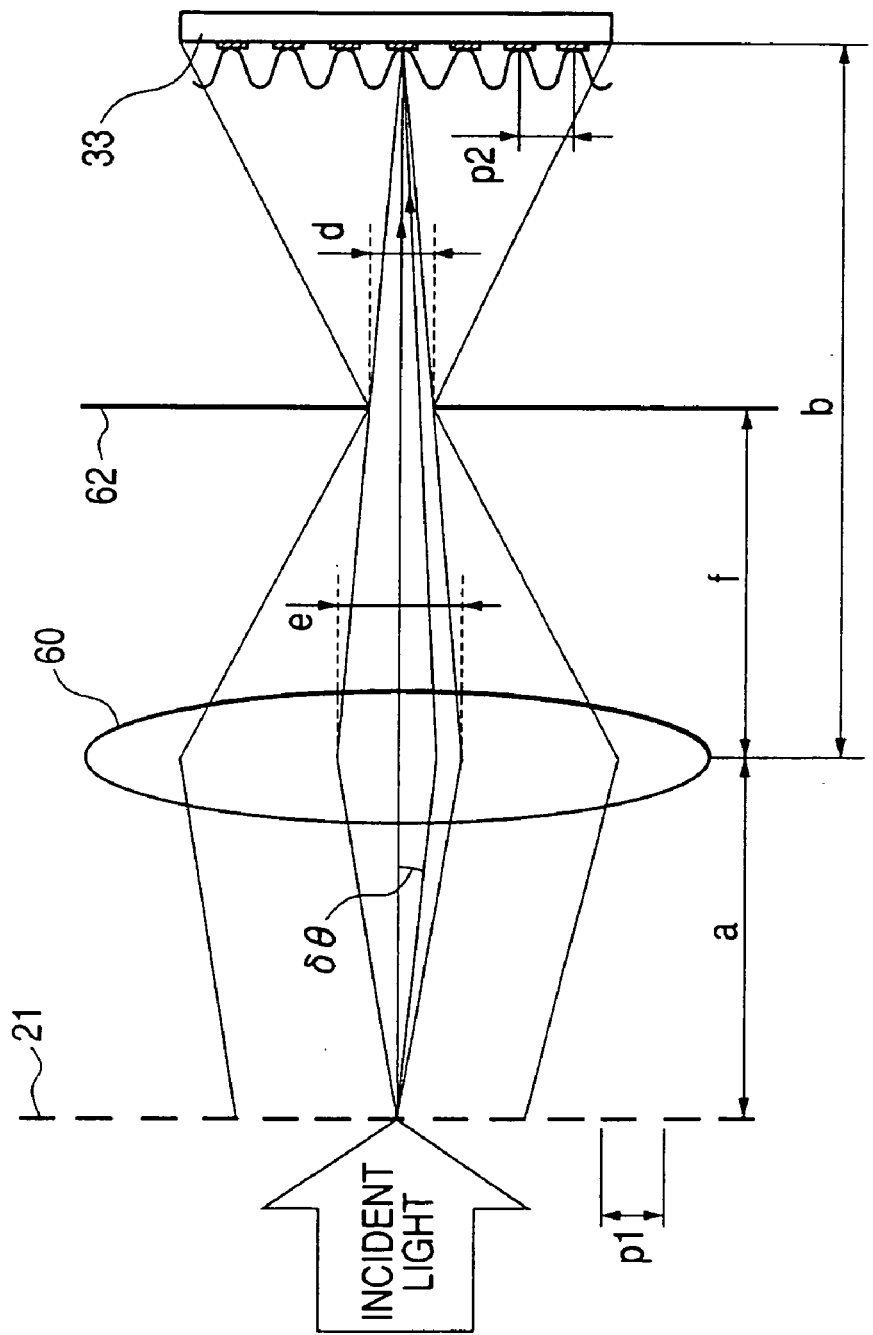
FIG. 10 is an explanatory view explaining that the optical system of the seventh embodiment is not influenced by a change in a scale grating angle induced by a waviness of the scale.

According to the optical system comprising the lens 60 opposed to the reflection-type main scale 40 as shown in the seventh embodiment, even when light emitted from a certain point on the main scale is shifted by a surface waviness of the main scale, as schematically shown in FIG. 10 with reference to a transmission-type encoder, the light is focused to a certain point by the lens 60. Therefore, an influence of the surface waviness is not effected when the surface waviness of the main scale is within ±N.A.

Figure 11:
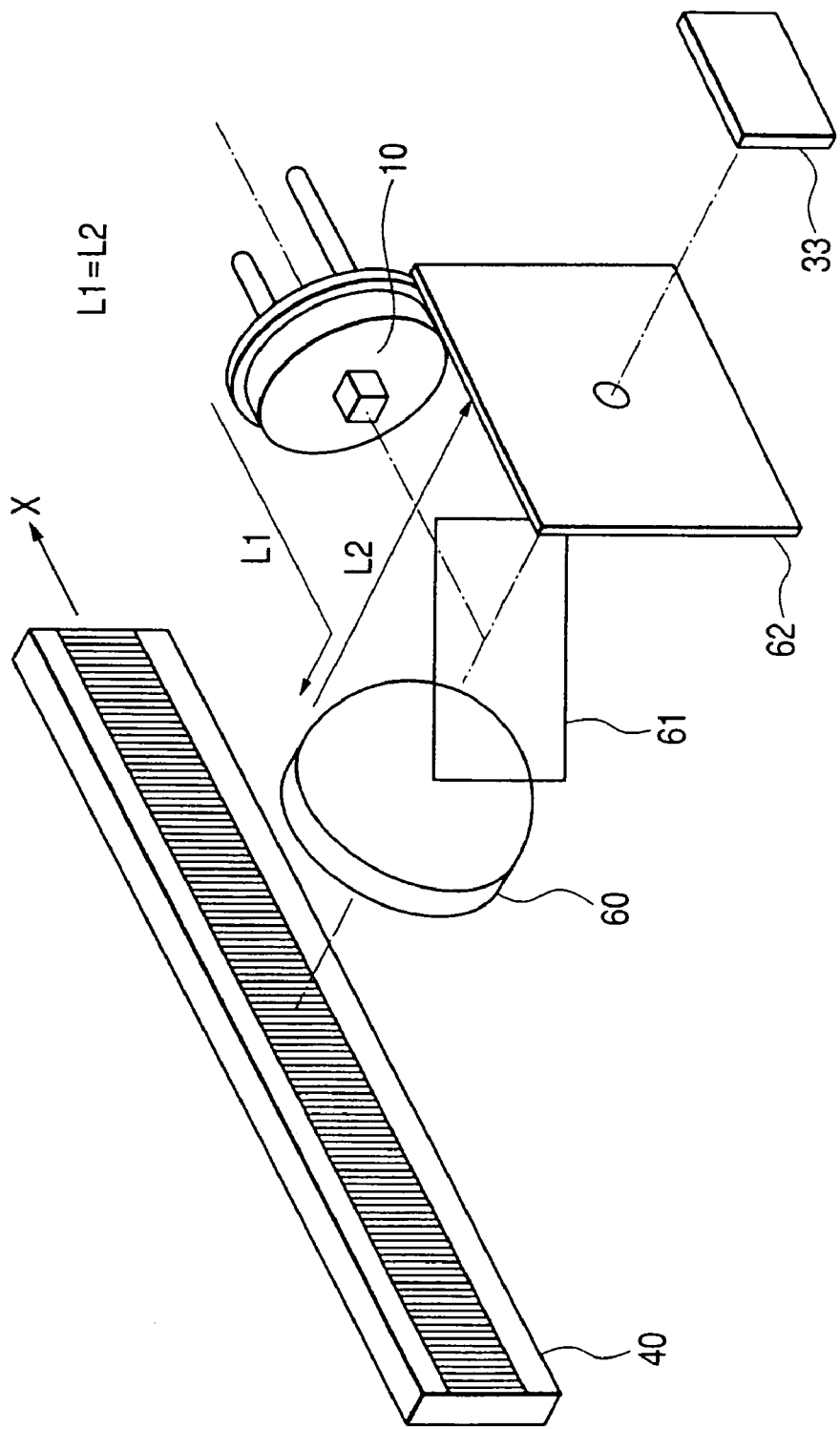
FIG. 11 is a perspective view of a reflection-type photoelectric encoder of an eighth embodiment according to the present invention using a beam splitter.

Further, FIG. 11 shows an eighth embodiment arranging a diffused light source 10 at a focal point of the lens 60, which is serving also as a collimator lens. In FIG. 11, the diffused light source 10 is arranged at a position of the focal point of the lens 60 via a beam splitter 61. Therefore, light irradiated from the lens 60 to the main scale 40 becomes collimated light and light reflected at the first grating 41 of the main scale 40 is guided to the aperture 62 by passing the lens 60 and beam splitter 61. Both of the diffused light source 10 constituting a light emitting source and the aperture 62 are arranged at the position of the focal point of the lens 60 and, therefore, light can effectively be utilized.

Figure 12:
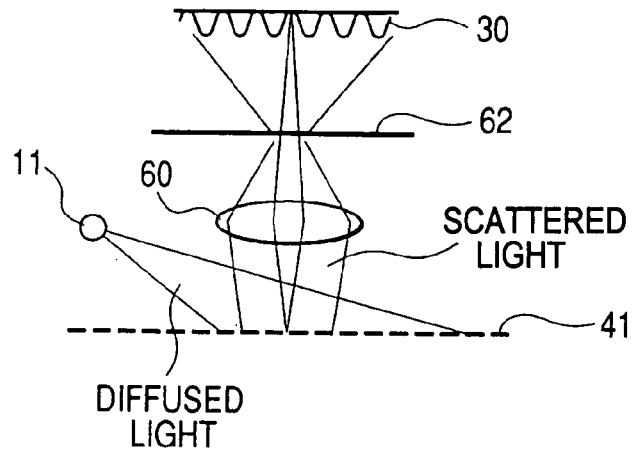
FIG. 12 is an optical path view showing an optical system of a reflection-type photoelectric encoder of a ninth embodiment according to the present invention using a diffused light source.

FIG. 12 shows a ninth embodiment constituting a reflection-type photoelectric encoder and using the diffused light source 11. The ninth embodiment is the same as the seventh embodiment shown in FIG. 9 other than the light source (being diffused, as opposed to being collimated) and therefore, a detailed explanation thereof will be omitted.

Further, although according to all of the above-described embodiments, the lens is used, the lens can be omitted.

Figure 13:
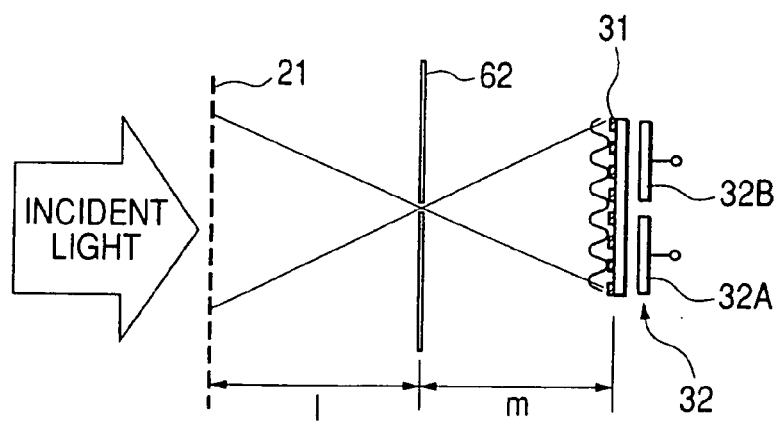
FIG. 13 is an optical path view showing an optical system of a transmission-type photoelectric encoder of a tenth embodiment of the present invention omitting a lens.

FIG. 13 shows a tenth embodiment using the index grating pattern 31 and the receiving elements 32A, 32B at the light receiving portion and omitting the lens in the first embodiment (refer to FIG. 2).

Figure 14:
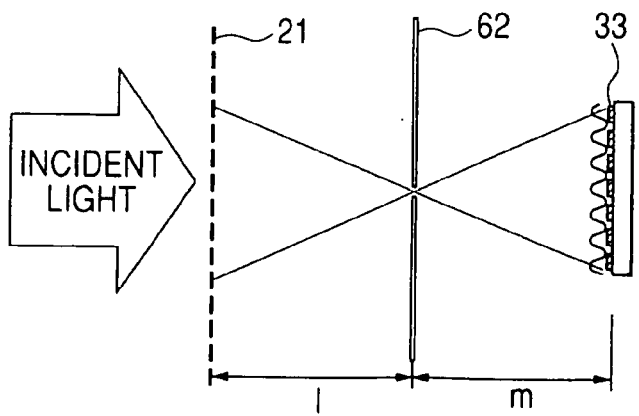
FIG. 14 is an optical path view showing an optical system of a transmission-type photoelectric encoder of an eleventh embodiment according to the present invention using a light receiving element array and omitting a lens.

Further, FIG. 14 shows an eleventh embodiment omitting the lens in the second embodiment (refer to FIG. 3) using the light receiving element array 33 at the light receiving portion.

A magnification M of the tenth and the eleventh embodiments omitting the lens is calculated by the following equation.

$$M = m/l \tag{Eq. 6}$$

where m,l, designate distances between the aperture 62 and the first grating 21 and between the aperture 62 and the index grating pattern 31, respectively.

According to the tenth and the eleventh embodiment, when a gap is varied, the magnification M of the image is varied. However, since the lens is not used, the cost of production can be reduced, and further small-sized formation can be achieved while permitting liberal setting of the magnification.

In the above-described embodiments shown in FIGS. 1–3 and 5–12, the embodiments using the aperture can provide for excellent signal stability by reducing an influence of the variation in the gap. Further, when the variation in the gap is not problematic, an aperture can be omitted as in the sixth embodiment.

Figure 20:
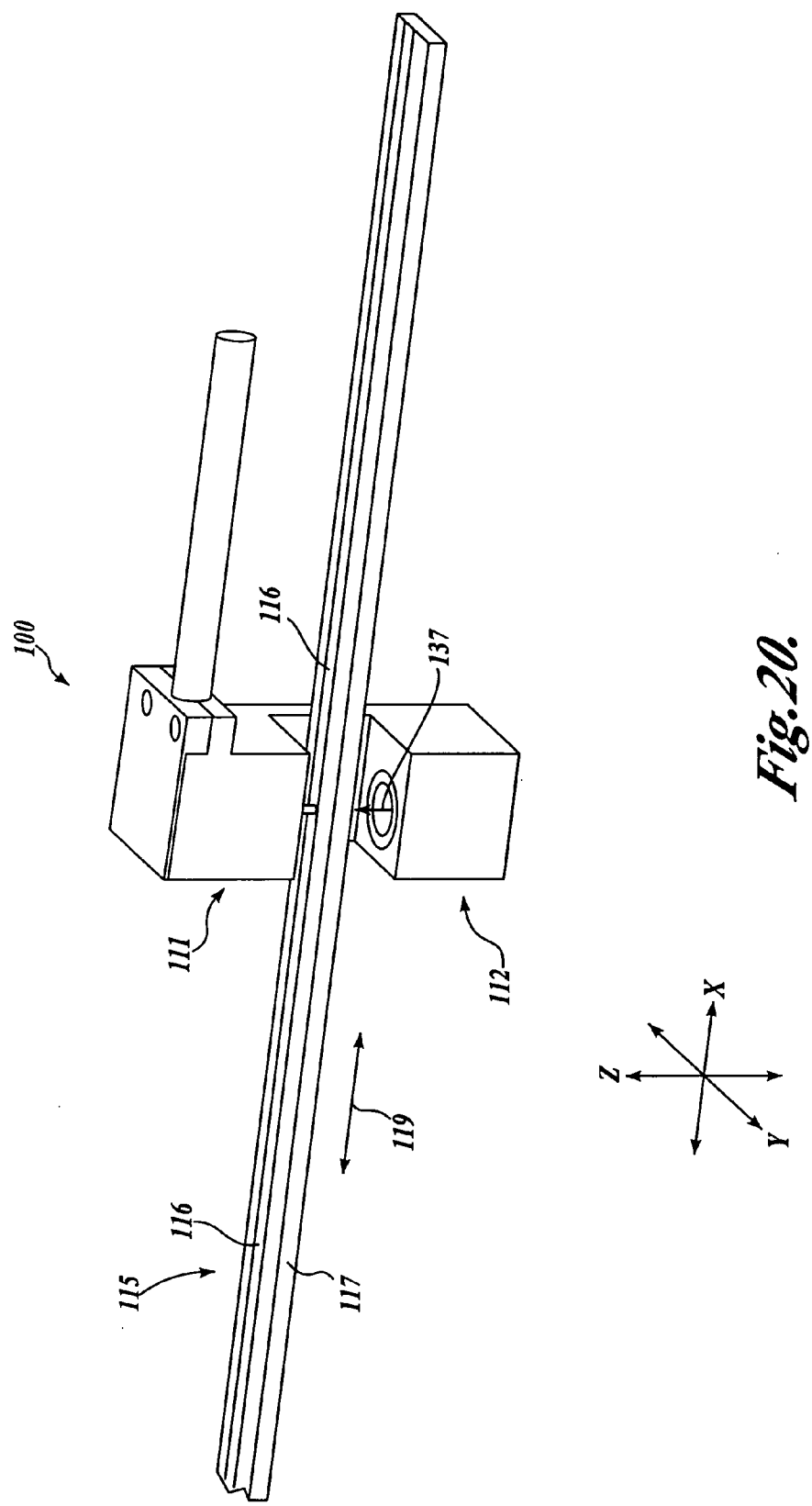
FIG. 20 is an isometric view of a twelfth embodiment of a readhead according to this invention that is operable with a transmissive type scale.

FIG. 20 is an isometric view of a twelfth embodiment of a readhead according to this invention that is operable with a transmissive type scale. A scale 115 is of the transmissive type, and comprises a scale substrate 117 that is generally transparent. In various exemplary embodiments, the substrate 117 is made of a type of glass having a desired thermal expansion. More generally, any type of mechanically stable material that transmits an operable amount of light may be used. The scale 115 further comprises a scale grating 116, which comprises a periodic pattern (too fine to be visible in FIG. 20) that extends along a measuring axis direction 119 to form a scale track along the scale substrate 117. The x-axis in FIG. 20 is defined to be parallel to the measuring axis 119, and the two terms are generally used interchangeably herein. The y-axis is defined herein to be perpendicular to the measuring axis 119 and parallel to the nominal plane of the scale grating 116 and the z-axis is orthogonal to the x- and y-axes.

A readhead 100 includes an imaging and detection portion 111 that includes various optical elements, as will be more fully described below, to provide a spatially filtered image of an imaged portion of the scale grating 116. In the embodiment shown in FIG. 20, the readhead 100 also includes an illumination portion 112 on the side of the scale substrate 117 that is opposite the imaging and detection portion 111. The illumination portion 112 includes various elements, as will be more fully described below, to provide an illumination light 137 that illuminates the imaged portion of the scale grating 116. In various embodiments the illumination portion 112 may provide any operable monochromatic or quasi-monochromatic (i.e., narrow band) light, such as a light provided by a light emitting diode (LED), or the like. In various exemplary embodiments, the light is incoherent or only partially coherent. In various other embodiments a broad band light may be used, such as a light provided by a "white-light" LED, or the like. It should be appreciated that the term "light" is used in a broad sense herein, and is intended to include any operable radiation wavelengths inside or outside of the visible portion of the spectrum. Operable wavelengths may be determined or verified by experiment, if needed. Various factors related to using coherent light in various embodiments according to this invention are discussed further below.

In operation, the scale 115 translates relative to the readhead 100 along the measuring axis direction 119, so as to provide a moving image of the scale grating 116 in the imaging and detection portion 111 of the readhead 100, as described in greater detail below. Various means for achieving an operable mounting and translation of the scale substrate 117 relative to the readhead 100 are known in the art, and thus need not be described herein.

For a transmissive type scale, in various exemplary embodiments, the scale pattern may be located on either the front side or the back side of the scale substrate 117, provided that it is arranged to fall within the depth of field of the imaging and detection portion 111, as outlined further below.

Figure 21:
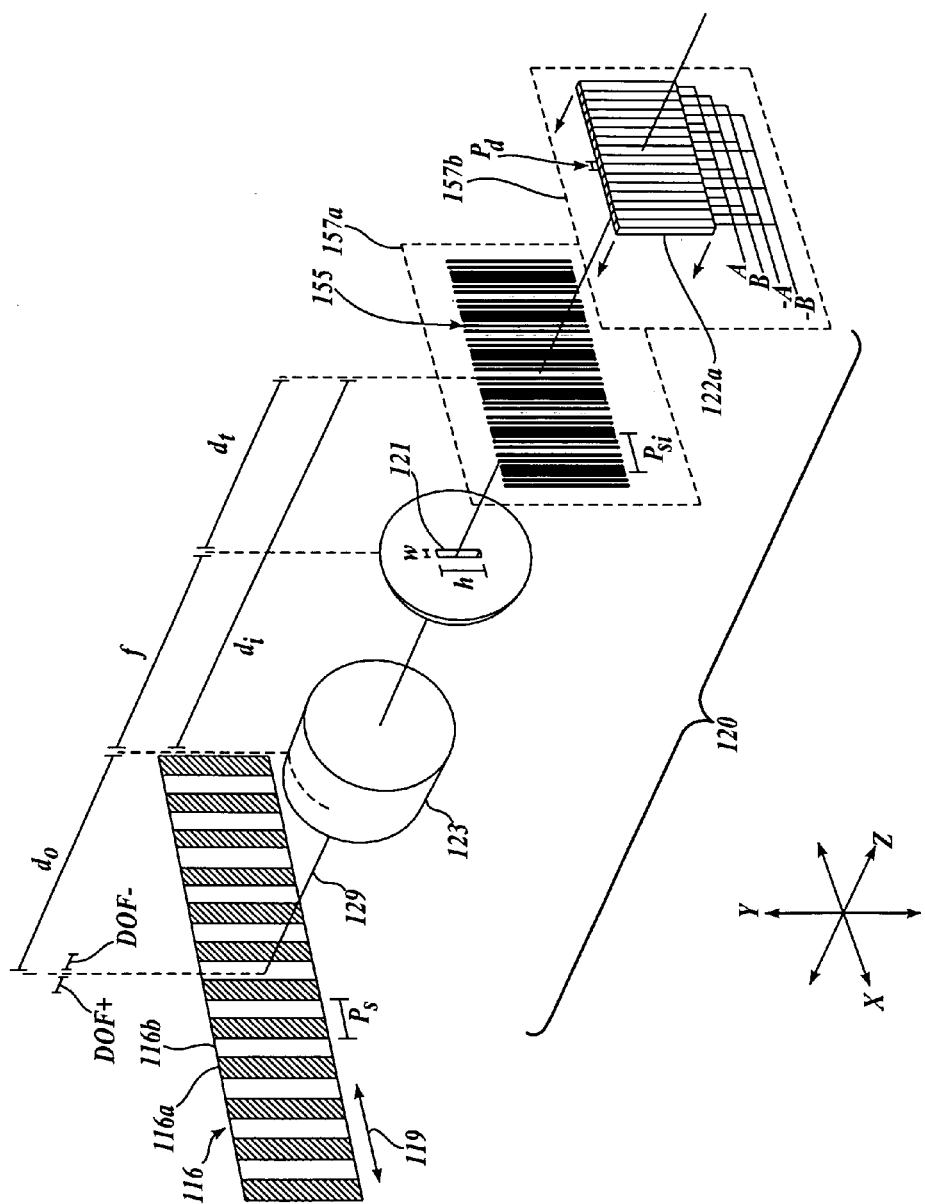
FIG. 21 is an exploded isometric view illustrating the general characteristics of one exemplary optical arrangement according to this invention that is usable in various readheads according to this invention.
Figure 22:
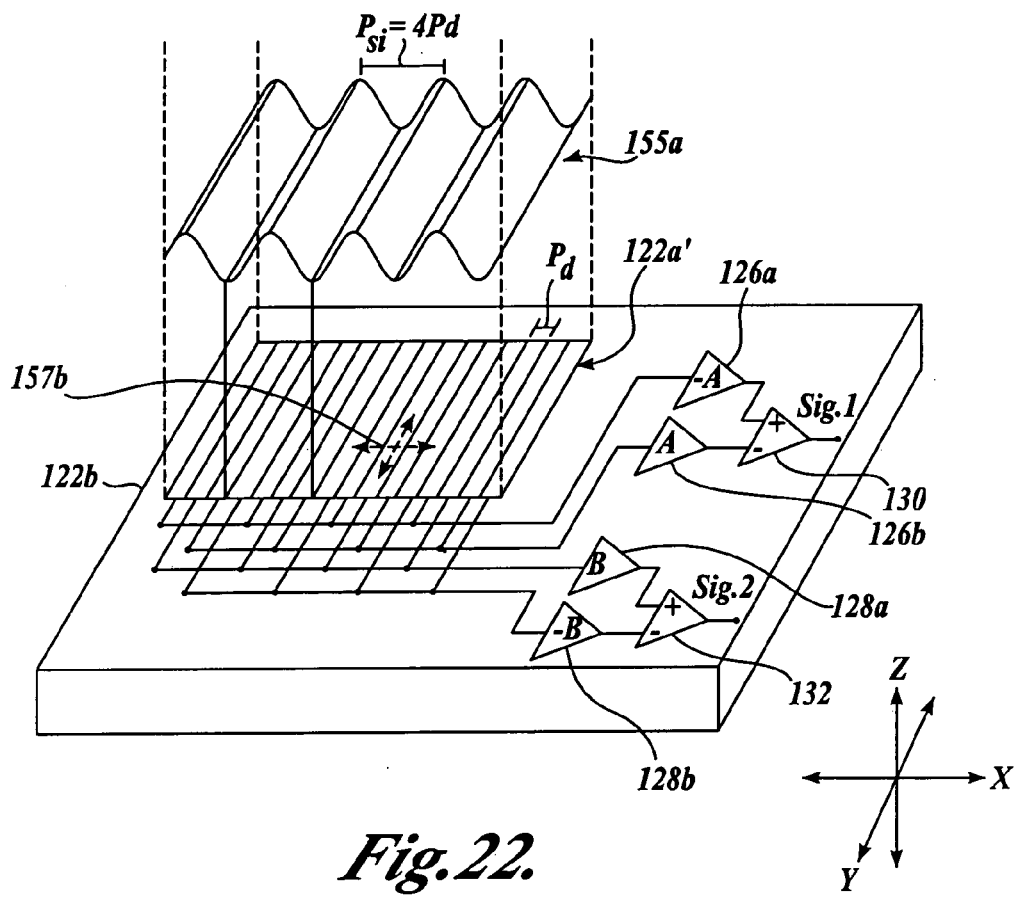
FIG. 22 is a partially schematic isometric view of one exemplary photodetector circuit that is usable in various readheads according to this invention.

FIG. 21 is an exploded isometric view, schematically illustrating the general characteristics of one exemplary imaging arrangement usable in various readheads according to the present invention. The imaging arrangement 120 includes generally three elements arranged along an optical axis 129: a lens 123, an aperture 121, and a set of optical detectors 122a that are generally included in a detector assembly (not shown.) One exemplary embodiment of the set of optical detectors 122a and one exemplary embodiment of the shape of the aperture 121 are shown schematically in FIG. 21. However, it should be appreciated that other aperture shapes and other configurations of the set of optical detectors, including other now known or later developed optical detector structures, are usable according to this invention. In various exemplary embodiments, the set of optical detectors 122a may be included in a photodetector circuit. FIG. 22 shows one exemplary embodiment of a photodetector circuit 122b, described further below. The effective plane of the lens 123 and the image detection plane 157a of the set of optical detectors 122a are spaced apart by distance $d_i$. The image detection plane 157a receives a spatially filtered periodic image 155 of the scale grating 116, which exhibits periodically occurring lighter and darker regions having a pitch $P_{si}$. The lighter and darker regions of the spatially filtered periodic image 155 are schematically represented by the varying densities of light and dark vertical lines in FIG. 21. The actual structure of the periodic image 155 is outlined in greater detail below.

It should be appreciated that in various exemplary embodiments according to this invention, the image detection plane 157a is defined by, and coincides with, the nominal light-receiving surface 157b of a set of optical detectors 122a. Thus, it should be appreciated that the exemplary set of optical detectors 122a shown in FIG. 21 are illustrated in an artificially "exploded" position, solely to avoid obstructing the view of the schematically illustrated periodic image 155. Accordingly, it should be appreciated that in an actual assembly according to this invention the light-receiving surface 157b of a set of optical detectors 122a is nominally located at the distance $d_i$ from the effective plane of the lens 123, and coincides with the image detection plane 157a.

The aperture 121 is interposed between the lens 123 and the image detection plane 157a, and is located at a focal length f from the effective plane of the lens 123. The distance from the aperture 121 to the image detection plane 157a is defined as $d_t$. The imaging arrangement 120 including the lens 123, aperture 121, and set of optical detectors 122a, is in turn arranged relative to the scale grating 116 provided on the scale substrate 117 (not shown in FIG. 21). The distance from the effective plane of the lens 123 to the scale grating 116, when the scale grating 116 is at a nominal best focus position, is defined as $d_o$. It should be appreciated that in FIG. 21, the relative lengths of $d_o$ and the other dimensions and the apparent image magnification as illustrated are only for purposes of explanation, and are not shown to scale. Rather, the relationships between various dimensions are determined according to the principles outlined herein.

The scale grating 116 has dark-image areas 116a and bright-image areas 116b. In various exemplary embodiments they are approximately the same width with respect to each other. In the illustrated embodiment, the dark-image and bright-image areas 116a and 116b are shown as elongated bars. Dark bars may comprise chrome bars on glass, for example, with the bright-image areas 116b comprising the transparent glass areas between the bars, in a transmissive type scale. Each of the dark-image and bright-image areas 116a and 116b are periodically arranged according to a pitch $P_s$ of the scale grating 116. In operation, as the scale grating 116 is translated along the measuring axis direction 119, a moving image of the scale grating 116 consisting of alternate dark and bright areas is received and focused by the lens 123 at its focal length f and is spatially filtered by the telecentric aperture 121 located at the focal length f, and is transmitted to the light-receiving surface 157b of a set of optical detectors 122a at the image detection plane 157a. The operation and the configuration of the telecentric aperture 121 will be more fully described below.

Regarding the magnification of the periodic image 155 at the image detection plane 157a relative to the scale grating 116 in the exemplary embodiment shown in FIG. 21, the light passed by the telecentric aperture 121 is transmitted a distance $d_t$ along the optical axis to the image detection plane 157a. In contrast to the aperture configuration shown and described with reference to FIGS. 2 and 3 above, in the telecentric arrangement according to the embodiment shown in FIG. 21 and described here, the telecentric aperture is designed to be narrow enough, at least parallel to the measuring axis direction, so that the magnification M of the received periodic image 155, at least parallel to the measuring axis direction, depends primarily on the relationship between the focal length $f$ and the distance $d_t$, and is approximately given by EQUATION 7 as follows:

$$M \approx \frac{d_t}{f} \qquad (Eq. 7)$$

It should be appreciated that regardless of the size of the limiting aperture, the effective magnification of a readhead according to the principles of this invention can be determined and/or verified experimentally.

In general, for a magnification of 1, the scale grating 116 and the periodic image 155 would have the same pitch. For the embodiment shown in FIG. 21, when $d_t$=f, the magnification is approximately 1 and the periodic image 155 would have a pitch ($P_{si}$) that is the same as the pitch of the scale grating 116 ($P_s$). In various exemplary embodiments, typical scale grating pattern pitches ($P_s$) may range from less than 4 microns to more than 40 microns. In one embodiment, the scale grating 116 consists of chrome bars on glass, which are spaced 10 μm apart and are 10 μm wide (this is referred to as a 10/10 scale) such that the pitch $P_s$ of the scale grating 116 is nominally equal to 20 microns. In one embodiment, the lower limit for the allowable scale grating pattern pitch is set by the limiting lateral resolution of the imaging system, which is readily calculable by those of ordinary skill in the art. However, it should be appreciated that the smaller the lateral resolution of the imaging system, the smaller the allowable depth of focus and the smaller the allowable gap tolerance. (As used herein, "gap" means the space between the effective plane of the lens 123 and the scale grating 116, or do in FIG. 21.) For incoherent illumination, the diffraction limit for the lateral resolution is given by EQUATION 8, as follows:

$$\sim \frac{1.22\lambda}{2NA} \qquad (Eq. 8)$$

where λ is the illumination wavelength, and NA is the numerical aperture of the optical system.

It will be appreciated that the cutoff frequency for incoherent illumination is 2NA/λ, while for coherent illumination the cutoff frequency is NA/λ, and that the lateral resolution thus depends on the degree of coherence of the light. In general, any operable wavelength of visible or non-visible light may be used with this invention, provided that such wavelengths are compatible with the opto-electronic detectors that eventually receive the optical signals provided according to the principles of this invention.

A magnification of 1 is described above, though the present invention is not so limited. In various embodiments according to the principles of this invention, the effective magnification along the measuring axis direction is designed to provide a desired ratio of the pitch $P_{si}$ of the periodic image 155 at the image detection plane 157a to the pitch $P_s$ of the scale grating 116. This is because the set of optical detectors 122a are generally configured to act as a spatial filter for the periodic image 155, and thus should have a configuration exhibiting a pitch that matches the pitch $P_{si}$ of the periodic image 155 at the detection plane 157a, in the same manner as described in the co-pending U.S. patent application Ser. No. 10/298,312 (hereinafter "the '312 application"), which is incorporated by reference herein, where the received image of the scale grating is a self-image, instead of an image produced by an imaging lens system. Most of the following readhead figures show a magnification of 3, which is suitable for imaging a scale grating 116 having a 20 μm pitch $P_s$ onto a set of optical detectors that provide a spatial filtering pitch of 60 μm for example, but the invention is not limited to a magnification of 3. In any embodiment, each readhead is designed such that the pitch $P_{si}$ of the periodic image 155 corresponds to the spatial filtering pitch associated with the set of optical detectors 122a at the image detection plane 157a. Typically, this is accomplished by adjusting the scale pitch $P_s$ to provide a periodic image 155 that matches the spatial filtering pitch associated with the set of optical detectors 122a at the image detection plane 157a for a given magnification, or by adjusting the magnification to provide a periodic image 155 that matches the spatial filtering pitch associated with the set of optical detectors 122a at the image detection plane 157a for a given scale pitch $P_s$.

FIG. 22 is a partially schematic isometric view of one exemplary embodiment of a photodetector circuit 122b that includes one exemplary embodiment of a set of optical detectors 122a', usable in various readheads according to this invention. Each of the individual photodetector elements of the set of optical detectors 122a' is arranged relative to its nearest neighbor according to a pitch $P_d$ such that $4P_d=P_{si}$, and each individual photodetector element is electrically connected with (or otherwise summed with) the individual photodetector elements located the pitch $P_{si}=4P_d$ away from it, to form 4 respective sets in the set of optical detectors 122a'. An image intensity profile 155a schematically represents one exemplary approximately-sinusoidal intensity distribution exhibited by the spatially filtered periodic image 155 at the light-receiving surface 157b of the set of optical detectors 122a'. The image intensity profile 155a is shown at one exemplary position along the measuring axis direction relative to the set of optical detectors 122a'.

As the readhead 100 moves relative to the scale grating 116 along the measuring axis direction 119, the spatially filtered periodic image 155 moves relative to the set of optical detectors 122a'. The set of optical detectors 122a' spatially filters the periodic image 155, and accordingly, each one of the set of optical detectors 122a' receives an optical signal that varies periodically, according to the approximately-sinusoidal image intensity profile 155a, as a function of the relative motion between the scale grating 116 and the readhead 100. Each cycle of the periodic optical signal indicates an amount of relative motion that is equivalent to the pitch $P_s$, of the scale grating 116.

The photodetector circuit 122b as illustrated in FIG. 22 is a simplified schematic representative of various known photodetector circuit configurations that produce quadrature type signals. Therefore, it need not be described in detail. Briefly, referring to FIG. 22 as an example, each one of the set of optical detectors 122a' receives an optical signal that varies periodically according to the approximately-sinusoidal image intensity profile 155a as a function of the relative position between the scale grating 116 and the readhead 100, as discussed above. Thus, each one of the set of optical detectors 122a' outputs an electrical signal that similarly varies periodically as a function of the relative position between the scale grating 116 and the readhead 100. Therefore, the photodetector circuit 122b receives respective optical signals and outputs them as respective electrical signals A to amplifier (26a), B to amplifier (28a), –A to amplifier (26b), and –B to amplifier (28b). The signals A and –A from amplifiers 126a and 126b are combined via a differential amplifier 130 to produce signal 1 (Sig. 1), while the signals B and –B from amplifiers 128a and 128b are combined via a differential amplifier 132 to produce signal 2 (Sig. 2).

The respective optical signals corresponding to the signals A and –A are out of phase by 180 degrees, and the respective optical signals corresponding to the signals B and –B are also out of phase by 180 degrees, while the optical signals corresponding to the signals A and B are out of phase by 90 degrees, as are the optical signals corresponding to the signals –A and –B, respectively, all according to the dimensions of the sets of optical detectors 122a' relative to the pitch of the approximately-sinusoidal image intensity profile 155a. Thus, the resulting signal 1 (Sig. 1) and signal 2 (Sig. 2) are approximately sinusoidal signals that are out of phase by 90 degrees, and both have had their DC components nominally eliminated by the differential signal processing.

Figure 23:
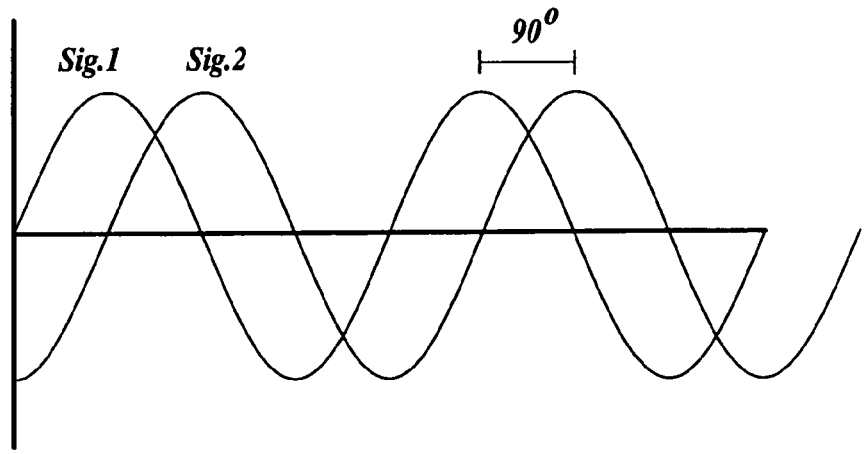
FIG. 23 shows the general characteristics of the output signals provided by the photodetector circuit of FIG. 22, used in conjunction with the optical arrangement of FIG. 21.

FIG. 23 shows the general characteristics of the output signals (Sig. 1 and Sig. 2) provided by the photodetector circuit 122b of FIG. 22, used in conjunction with the imaging arrangement of FIG. 21. As described above, the output signals (Sig. 1 and Sig. 2) are phase-shifted by 90 degrees, that is, they are quadrature signals. The processing of such quadrature signals for determining the displacement of the scale grating 116 relative to the readhead 100 is a standard process known to one of ordinary skill in the art and therefore need not be discussed in detail. However, a brief discussion of one exemplary method is outlined below with reference to the quadrature signal values $Q_1$ and $Q_2$ and EQUATION 9.

Figure 35:
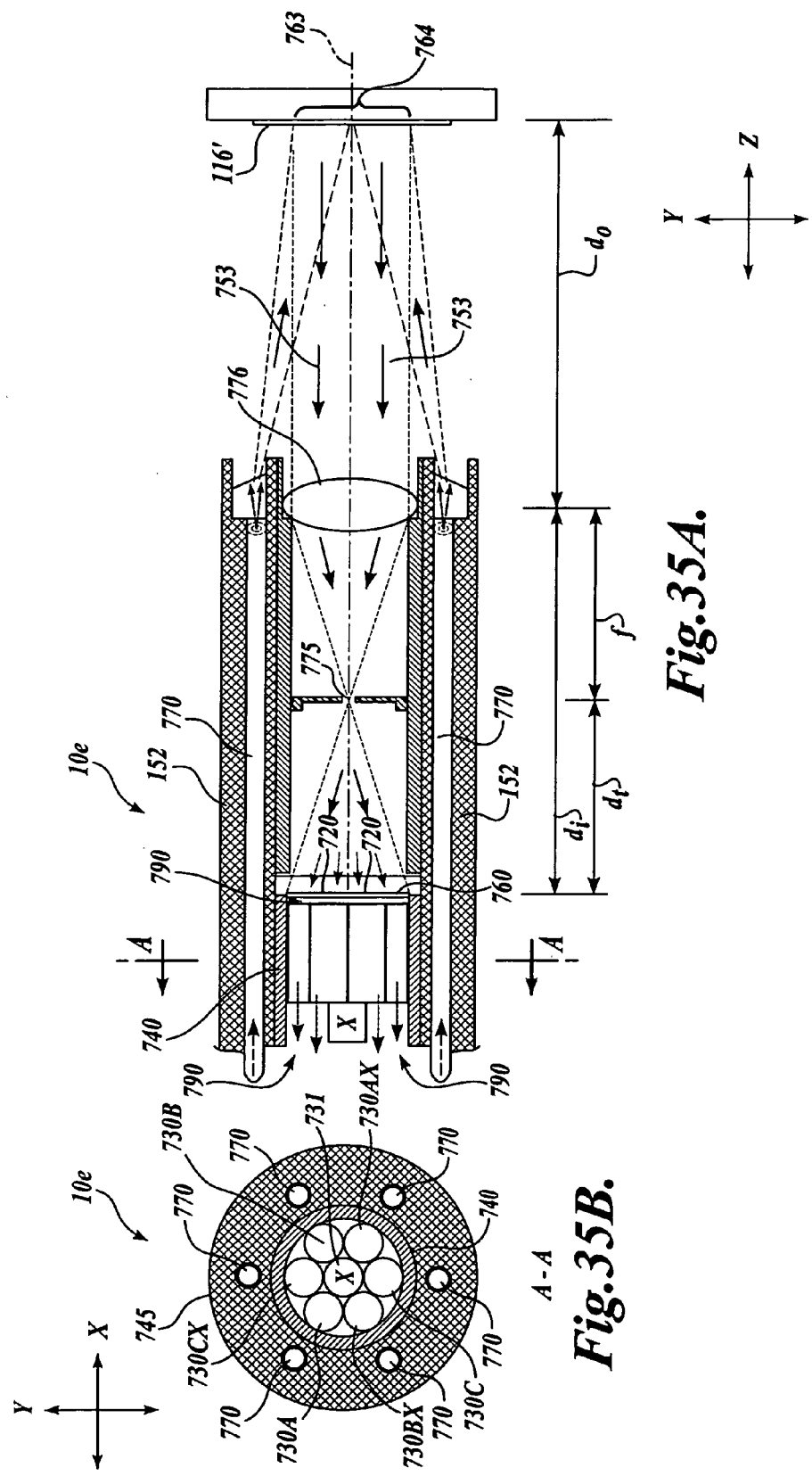
FIGS. 35A and 35B are cross-section views cut along the optical axis and cut perpendicularly to optical axis, respectively, illustrating the assembled optical components and optical path of a sixteenth embodiment of a readhead according to this invention that uses a fiber optic receiver channel configuration and that is operable with various reflective type scales.

The '312 application, incorporated by reference above, further discloses methods for determining the displacement of the scale grating 116 relative to the readhead 100 using a detector arrangement that provides "three-phase" displacement signals. This signal processing may be particularly useful with readheads having certain fiber-optic receiver channel configurations, such as the exemplary readhead embodiment to be more fully described below with respect to FIGS. 35A–36. In particular, in one exemplary embodiment of the present invention, three optical signals can be processed by the exemplary method described in the '312 application, to determine two derived quadrature signal values $Q_1$ and $Q_2$. In the general case, the two derived quadrature signal values $Q_1$ and $Q_2$ (or alternatively, the signal 1 (Sig. 1) and signal 2 (Sig. 2) quadrature signals) can be processed to determine a current phase position ϕ within a period $P_s$ of the scale grating 116 using a two-argument arctangent function that is modulo $2\pi$:

$$\phi = a\tan 2(Q_1, Q_2) \qquad \text{(Eq. 9)}$$

The two-argument "a tan 2" function shown in EQUATION 9 is available and described in a number of publicly available mathematical programs. The function's result is the arctangent of $Q_1/Q_2$, in radians. However, the use of two arguments allows the determination of the quadrant of the resulting angle, so that the result is between –pi and +pi rather than –pi/2 and +pi/2. The scale grating 116 and the readhead 100 can be used to provide a position measurement within one period along the direction of the measuring axis 119 of the scale grating 116, by multiplying the scale grating pitch $P_s$ by the current respective phase position ϕ. During displacement, the number of accumulated wavelengths can be counted by known methods to provide displacement and/or position measurements over a long range. It should be appreciated that the accuracy of a current phase position ϕ determined according to EQUATION 9 will depend on the signal-to-noise (S/N) ratio of the processed quadrature signals as well as how closely they conform to an ideal sinusoidal function of displacement. As described further below, a telecentric aperture configuration according to this invention can produce an image that provides signals that provide a good S/N ratio and that closely approach such an ideal sinusoidal function, in order to support high levels of accurate signal interpolation and provide a measuring resolutions far finer than the basic pitch ($P_s$) of the scale grating 116.

Figure 24:
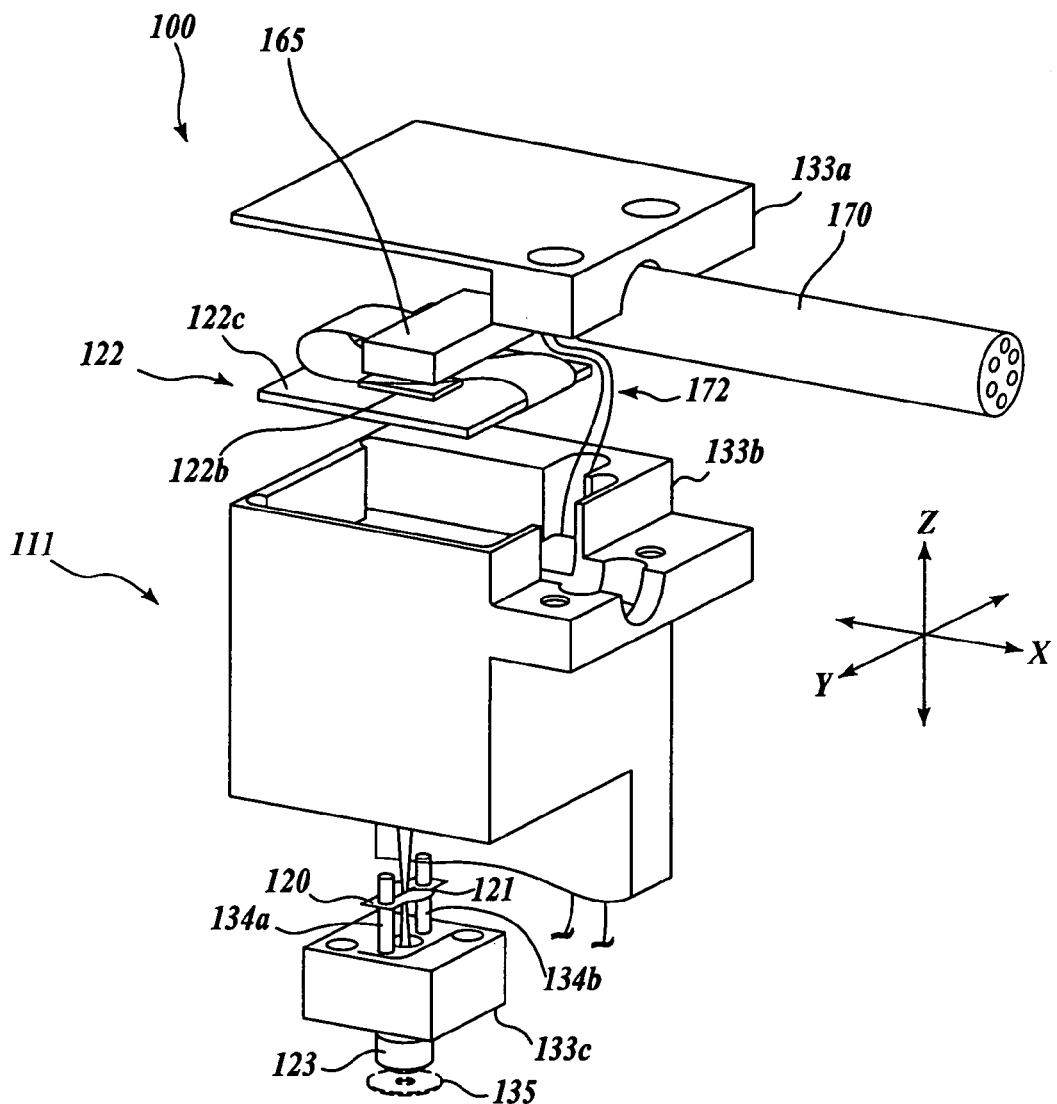
FIG. 24 is an exploded isometric view illustrating one exemplary configuration of readhead elements usable to implement the readhead of FIG. 20.

FIG. 24 is an exploded isometric view illustrating one exemplary configuration of several elements usable to implement the imaging and detection portion 111 of the readhead 100 of FIG. 20. Specifically, the illustrated embodiment of the imaging and detection portion 111 includes a housing 133 (consisting of a cover 133a, housing body 133b, and an optic module 133c) for suitably incorporating therein the lens 123, the aperture 121, and a detector assembly 122 (comprising, for example, a set of optical detectors 122a and a photodetector circuit 122b). The aperture 121 is positioned by two alignment pins 134a and 134b and against the surface of a shallow recess in the upper surface of the optic module 133c. The lens 123 is positioned in a bore in the bottom portion of the optic module 133c and against a surface fabricated in the bore so as to locate the effective plane of the lens 123 at the distanced f from the aperture 121. The illustrated embodiment further includes an entrance aperture 135 placed in front of the lens 123. In various embodiments an entrance aperture provides an independently adjustable element that can be used to determine or adjust the field of view, and/or confine the optical path to the central portion of the lens 123, and/or effectively limit the operational length of a rectangular telecentric aperture, and reduce stray light. However, it should be appreciated that there are other means to control most or all of these same design characteristics. Thus, the entrance aperture 135 is omitted in various other exemplary readhead embodiments according to this invention. The optic module 133c is aligned in a matching recess in the bottom portion of the housing body 133b and is positioned along the z-axis direction at a prescribed position within the housing body 133b.

The embodiment of the detector assembly 122 shown in FIG. 24 is a "chip-on-glass" assembly, which includes a transparent substrate 122c that holds conductive traces and appropriate circuitry, which in one embodiment includes the photodetector circuit 122b, which is mounted such that the set of optical detectors 122a' "faces down" to receive the spatially filtered periodic image 155 from the aperture 121 (from below in FIG. 24) through the transparent substrate 122c. The transparent substrate 122c is aligned against a surface in a matching recess in the upper portion of the housing body 133b. The surface is located so as to position the light-receiving surface 157b of the set of optical detectors 122a' at the distance $d_t$ from the aperture 121. In the embodiment shown in FIG. 24, the signals of the detector assembly 122 are routed through a flexible connector assembly 165 and output through a cable 170, which also inputs power for the illumination portion 112 on appropriate supply wires 172.

Figure 25:
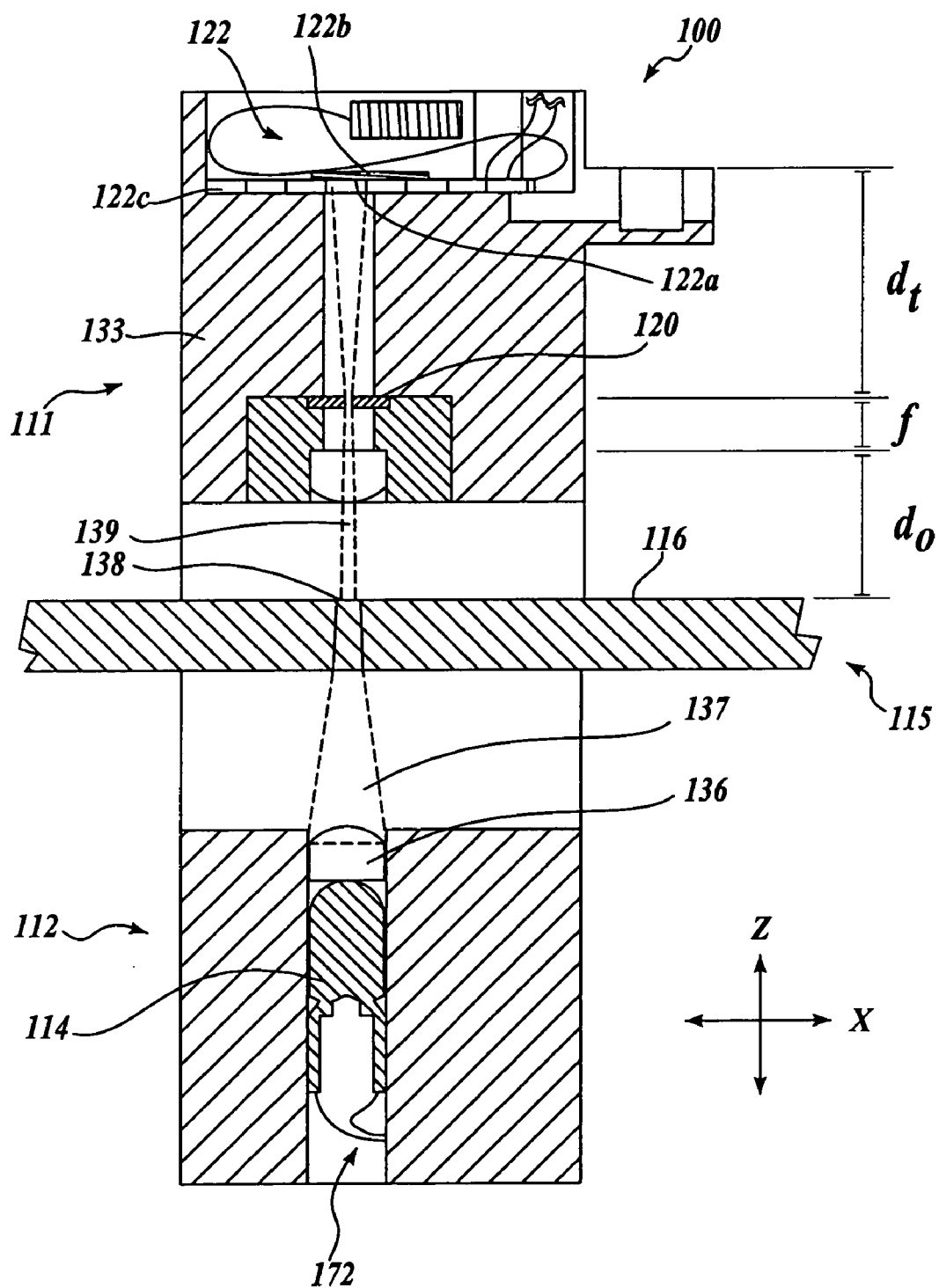
FIG. 25 is a cross-section view cut along (i.e., viewed perpendicular to) the optical axis, illustrating the assembled optical components and optical path of the configuration of FIG. 24.

FIG. 25 is a cross-section view of the assembled components of the configuration of FIG. 24, but further including an operably positioned scale 115 and the illumination portion 112 to generally correspond with the configuration of FIG. 20. In the illustrated embodiment, the light 137 from an operable illumination source 114, which is an LED in various exemplary embodiments, passes through a lens 136 to be generally focused onto a limited region 138 of the scale grating 116, so as to concentrate the available optical power in the field of view. The limited region 138 is defined larger than the nominal field of view of the readhead 100 in order to accommodate gap variations. Thus, as illustrated, the optical path 139 from the scale grating 116 to the detector assembly 122 shows only the detected rays, and therefore appears narrower than the illuminating optical path 137. In one embodiment, the optical elements are arranged such that $d_t$=8.938 mm, f=3.00 mm, and do=4.795 mm. According to EQUATION 7, these parameters provide a magnification of 2.98. However, taking into account a realistic lens thickness, and other factors known to one skilled in the art, a magnification of 3.0 is provided in an actual readhead. The transparent substrate 122c, or the like, may also influence the magnification. Thus, for the best accuracy, the operational magnification is determined and/or verified by experiment or simulation in various exemplary embodiments.

Referring back to FIG. 21, telecentricity in the optical system is achieved by placing the sufficiently narrow limiting aperture 121 at the back focal plane of the lens 123, so that the only rays that contribute to imaging are those that enter the lens 123 nominally parallel to the optical axis 129. Accordingly, the imaged portion of the scale grating 116 remains the same size (i.e., constant magnification) regardless of reasonably expected variations in its distance along the z-axis from the lens 123 due to mounting variations, bearing runout, scale waviness, or vibration during operation, for example. Thus a telecentric lens system according to the principles described with reference to FIG. 21, and further described below, provides robust mounting tolerances for the system while maintaining good accuracy. It is noted, though, that a telecentric lens system loses focus just like an ordinary lens system as the object moves in and out of its focal plane, causing defocusing of the image (albeit at constant magnification).

It should be appreciated that "blurring" the image by spatial filtering of higher order spatial harmonics so as to provide an approximately ideal sinusoidal intensity pattern according to this invention, as will be more fully discussed below, is distinctly different from blurring the image by intentionally locating one or more elements of the readhead components or the scale grating 116 to defocus the image of the scale grating 116, as is done in many prior art systems. The difference is that spatial filtering according to this invention will retain a relatively higher degree of contrast, or intensity variation within the desired fundamental spatial frequency of the detected periodic image 155, corresponding to the pitch ($P_{si}$) of the received image. This maximizes the useful measurement signal and the S/N ratio of a readhead according to this invention. In contrast, blurring the image by intentionally "mislocating" an optical element or scale along the optical axis relative to its ideal "focus" position relatively reduces the contrast at the fundamental spatial frequency, in addition to its effect of reducing higher spatial harmonic content in the image, reducing the useful measurement signal and the S/N ratio. Thus, in various exemplary embodiments according to this invention, the telecentric aperture dimension along the measuring axis direction is the primary means of spatially filtering the received image such that the distribution of light intensity along the image of the scale grating 116 will exhibit an approximately sinusoidal variation, rather than a square, triangular, trapezoidal, or other non-sinusoidal variation, which is desirable for enhancing the achievable measurement resolution and accuracy in various exemplary embodiments according to this invention.

It should be appreciated that in selecting the size of the aperture 121, there is a tradeoff between the depth of field (DOF) where a sufficiently limited undesirable image defocusing or loss of contrast is observed; the degree of spatial filtering of higher order spatial harmonics from the received image; and the maximum image intensity variation and total optical power at the detector, which determines the amplitude of the measurement signal. In various exemplary embodiments according to the present invention, aperture dimensions embodying the proper tradeoffs for a particular application can be determined based on the principles to be disclosed further below. In general, the aperture 121 or the like can be circular, square, rectangular, or any operable shape in various exemplary embodiments, with at least the aperture dimension along the measuring axis direction chosen according to the principles of this invention described further below, to provide the desired tradeoffs.

In the embodiment illustrated in FIG. 21, the aperture 121 is a rectangular slit aligned parallel to the scale grating bars, and having width w and height h. It has been found that the rectangular slit shape is beneficial because it can provide approximately a tenfold increase in the optical signal power compared to that of a circular aperture. It should be noted that a rectangular slit such as that shown in FIG. 21 provides telecentricity only for dimensions oriented primarily along the measuring axis direction 119, which is sufficient in various exemplary embodiments according to this invention.

In various exemplary embodiments according to the present invention, the aperture width w along the measuring axis direction 119 is determined such that it provides and/or is compatible with at least the following two requirements: 1) for a reasonably expected and/or specified and/or allowed change in distance between the readhead optical elements and the scale grating (the operating gap), the aperture width w must be limited to provide a depth of field that sufficiently limits the loss of contrast within that gap variation. Such a loss of contrast, that is, increased blur or defocus, lowers the optical signal strength and the resulting electronic signal-to-noise (S/N) ratio, thus reducing the meaningful signal interpolation that can be achieved using the signals from the optical detectors; and 2) higher order spatial harmonics must be reliably filtered from the spatial frequency spectrum of the scale grating image along the measuring axis direction so that the resulting detected image exhibits an approximately ideal sinusoidal intensity variation along the measuring axis direction, ideally containing primarily or only the fundamental frequency of the scale, for reasons previously discussed in relation to EQUATION 9.

In the various embodiments to be described herein, either of the first or second constraints may be the more limiting one. In addition, in some embodiments, additional constraints related to the total optical signal power desired at the photodetector may be important.

A. Determining an Aperture Width Based on Depth of Field (% DOF) Constraints (i.e., Based on Limiting the Loss of Contrast Within a Desired Range of Gap Variation As generally known in the field of optics, a depth of field (DOF) and numerical aperture (NA) are fundamentally related as follows:

$$DOF \propto \frac{\lambda}{\alpha \cdot NA^2} \qquad (Eq.\ 10)$$

where $\lambda$ is the illumination wavelength and $\alpha$ is a theoretically or experimentally determined constant related to a desired limit for the loss of contrast due to defocus. In one conventional theoretical definition for DOF, $\alpha=2$, and the corresponding DOF is DOF=$\lambda/2$*NA, as previously described with reference to FIGS. 2 and 3 (see EQUATION 3).

However, with regard to encoder readhead design and related operating considerations according to this invention, in various exemplary embodiments an operational DOF and the related aperture width may be determined based on the tradeoffs between measurement signal attenuation constraints and various other readhead operating characteristics. To that end, in various exemplary embodiments, it is first defined that the peak-to-peak AC amplitude of the fundamental spatial frequency of the measurement signal may not drop by more than a defined percentage "X" of maximum signal strength when the object distance do varies within a specified gap variation range, designated herein as the "X % depth of field" (X % DOF, which is a specific case of the more general designator "% DOF"). In other words, X %

DOF as used herein is defined as the amount of shift permitted in the object distance do in either direction from the object-side focal plane of the lens 123, such that the loss of contrast due to defocus remains within a defined "X % signal attenuation" constraint. (See, "DOF+" and "DOF−," as illustrated in FIG. 21.) Thus, % DOF is defined as a variation in $d_o$, within which the telecentric imaging system will generally show little or no magnification error and only a limited amount of contrast loss due to defocus. For example, for the conventional theoretical definition for DOF discussed above, DOF=$\lambda/2$*NA, at this distance away from the plane of best focus, the reduction in contrast is approximately 20%. Thus, this definition of DOF corresponds to a 20% DOF, as defined herein.

However, in various exemplary embodiments according to this invention, an operational limit for loss of contrast X is defined as low as 10%, or as high as 30% or more, depending on the desired trade off between the various readhead operating characteristics. For example, as described in greater detail below, in applications where it is practical or customary to control the gap within a relatively narrow range, or when the optical detector and/or related circuits accommodate only a limited range of signal strength variation, the limit for loss of contrast may be approximately 10%. Conversely, in applications where it is practical and/or advantageous to provide a relatively wide gap variation range, and when the optical detector and/or related circuits can accommodate the associated range of signal strength variation, the limit for loss of contrast may be increased to 30% or more, corresponding to a relatively large allowable gap variation between the readhead and scale.

In various exemplary embodiments according to this invention, the primary design variable for determining a % DOF is the telecentric aperture dimension along the measuring axis direction. In various exemplary embodiments according to this invention, a rectangular aperture is used. From simulations and experiment, it has been found that with a rectangular-shape aperture, to satisfy a 10% signal attenuation constraint, $\alpha \approx 4$. Thus, with 10% DOF defined as the specified or required % DOF satisfying the 10% signal attenuation constraint, in various exemplary embodiments according to this invention that use a rectangular aperture:

$$NA = \sqrt{\frac{\lambda}{4 \cdot 10\%\ DOF}} \qquad (Eq.\ 11)$$

The corresponding telecentric aperture width w can then be calculated as follows, knowing the lens focal length f and the numerical aperture (NA) from EQUATION 11:

$$w = 2f \cdot NA \qquad (Eq.\ 12)$$

For example, suppose that the desired 10% DOF=200 μm and $\lambda$=632 nm, giving NA=0.0281. Then for f=3 mm:

$$\begin{aligned} w &= 2f \cdot NA & (Eq.\ 13A) \\ &= 2 \cdot 3 \times 10^{-3}\ m \cdot 0.0281 \\ &\cong 169 \times 10^{-6}\ m \\ &= 169\ \mu m \end{aligned}$$

A circular aperture with this dimension will also satisfy the same design constraints, at a level of accuracy that is sufficient for most readhead applications. This aperture width w is the maximum aperture width w that provides the desired 10% DOF for this example. The maximum aperture width is selected as the width for the aperture 121 in various exemplary embodiments according to this invention where the % DOF is the most limiting design constraint, so as to achieve both the desired % DOF, within which the desired % signal attenuation constraint is satisfied, and to provide the maximum optical signal power within that constraint. It should be appreciated that smaller values of w (i.e., less than the maximum aperture width) could be used to satisfy the % DOF constraint, but these would generally reduce the available optical signal power and similarly reduce the S/N ratio of the system.

Alternatively, a 30% DOF may be desirable or allowable in certain embodiments, as outlined above. It has been determined that for a typical range of NAs and aperture widths determined according to this invention, a 30% DOF corresponds to approximately three times a 10% DOF, with an accuracy that is sufficient for most readhead applications, although it should be appreciated that this "proportional" approximation rapidly becomes increasingly inaccurate for percentages greater than 30%. As an example of a related aperture determination, suppose that a 30% DOF=300 µm, which corresponds to 100 µm for 10% DOF. Accordingly, with λ=632 nm, NA=0.0397 for the chosen 30% DOF. Then, for f=3 mm:

$$w = 2f \cdot NA \quad \text{(Eq. 13B)}$$
$$= 2 \cdot 3 \times 10^{-3} \text{ m} \cdot 0.0397$$
$$\cong 238 \times 10^{-6} \text{ m}$$
$$= 238 \text{ µm}$$

This aperture width w is the maximum aperture width w that provides the desired 30% DOF for this example. Thus, it should be appreciated that % DOF as used herein has a functional definition that varies based on a desired "% peak-to-peak" AC amplitude (i.e., contrast) attenuation constraint for a readhead according to this invention, such as the 10% or 30% constraints discussed above, which is different from the conventional definition of DOF. The relative advantages and disadvantages of various % DOFs are outlined in greater detail below.

Based on this novel and functional definition of % DOF, various exemplary embodiments the present invention offer an improved method of determining a practical optimal aperture width w, for achieving a desired % DOF according to this functional definition. It is further noted that the % DOF can be defined herein in terms of NA (see EQUATION 10 above), wherein the parameter α for a slit aperture satisfying the 10% signal attenuation constraint was experimentally determined (see EQUATION 11 above). If a different signal attenuation is to be permitted (for example, 30% or more signal attenuation), the parameter α will differ for these differing signal attenuation constraints and may be determined by simulation and/or experiment.

B. Determining Aperture Width Based on Spatial Filtering Constraints in Relation to the Scale Pitch (i.e., Based on Desired Spatial Filtering of Higher Order Spatial Harmonics)

The image of the scale grating 116 before it passes through the lens 123 corresponds to a square wave intensity profile with a certain spatial period $\lambda_s$, which can be expressed as a sum of sinusoidal waves whose wavelengths are integral submultiples of $\lambda_s$:

$$I(x) = I_o \left[ \frac{2}{\pi} \left( \sin(kx) + \frac{1}{3}\sin(3kx) + \frac{1}{5}\sin(5kx) + \ldots \right) + \frac{1}{2} \right] \quad \text{(Eq. 14)}$$

$$\text{where } k = \frac{2\pi}{\lambda_s} = 2\pi v_s \quad \text{(Eq. 15)}$$

To generate a purely sinusoidal intensity profile, the higher order harmonics must be suppressed. In various exemplary embodiments according to this invention, this is accomplished by restricting the telecentric aperture width (w) to provide a diffraction-limited optical system that suppresses the higher order spatial harmonics by spatial filtering.

The square wave intensity profile provided by the scale grating nominally contains only odd spatial harmonics, which are the dominant error sources in many practical encoder designs. To retain at least some measurement signal amplitude at the fundamental frequency while completely eliminating the higher order odd harmonics, the cutoff spatial frequency ($v_c$) can theoretically fall anywhere below the spatial frequency of the third order term of the Fourier series, but must be higher than the fundamental spatial frequency in order to provide a measurable signal, that is:

$$\frac{k}{2\pi} < v_c < \frac{3k}{2\pi} \quad \text{(Eq. 16)}$$

where $$v_c = \frac{2 \cdot NA}{\lambda}$$

for incoherent light, and for the object space, $$k = \frac{2\pi}{p_s}, \text{ where } p_s \text{ is}$$

the period or pitch of the scale grating 116.

It should be appreciated that for coherent light, $$v_c = \frac{NA}{\lambda}.$$

To avoid confusion, incoherent light is assumed in the following disclosure, unless otherwise indicated in a particular context.

Thus, for incoherent light, the range of cutoff frequencies in EQUATION 16 corresponds to:

$$\frac{\lambda}{2p_s} < NA < \frac{3\lambda}{2p_s} \quad \text{(Eq. 17)}$$

The numerical aperture (NA) provides a measure of a system's light collecting ability. The light collecting ability is approximately proportional to w for a slit or rectangular type aperture, assuming that the longer dimension of the rectangular type aperture is held constant. The light collecting ability also factors in the focal length of the lens (f).

Along the measuring axis direction, NA and w are related as follows:

$$w=2f\text{NA} \qquad (\text{Eq. 18})$$

Accordingly, knowing the scale pitch ($P_s$), focal length of the lens (f), and illumination wavelength ($\lambda$), one can calculate the range of aperture widths corresponding to EQUATION 16 as follows:

$$f\left(\frac{\lambda}{p_s}\right) < w < 3f\left(\frac{\lambda}{p_s}\right) \qquad (\text{Eq. 19})$$

EQUATION 19 is also usable in the case of a circular aperture, where the width along the measuring axis direction, w, is the diameter. For an aperture width at or below the lower limit of EQUATION 19, no measurement signal is received at the fundamental frequency, so as a practical matter the aperture width w is chosen sufficiently above this limit to be measurable with a circuit of the readhead. When the aperture width w is below the upper limit, the resulting image consists of sinusoidal intensity fringes containing no odd harmonics above the fundamental frequency of the scale, which in turn permits higher levels of meaningful signal interpolation according to EQUATION 9, or the like, to achieve better position measurement resolution and accuracy for a given scale pitch. It should be appreciated that an aperture width w at or near the upper limit provides the most total optical power and the strongest measurement signal on the detectors, and is therefore preferred in various exemplary embodiments according to this invention where the spatial filtering constraint is the most limiting design constraint. Above the upper limit, while the optical signal power will continue to increase, the strength of higher order harmonics will increase and degrade the desired ideal sinusoidal quality of the fundamental signal.

Suppose that f=3 mm, $p_s$=20 μm, and $\lambda$=0.630 μm. Then to completely eliminate the $3^{rd}$ and higher order spatial harmonics, for example:

$$\begin{aligned} w &= \frac{3f\lambda}{p_s} \\ &= \frac{3 \cdot 3 \times 10^{-3} \text{ m} \cdot 63 \times 10^{-6} \text{ m}}{2 \times 10^{-5} \text{ m}} \\ &\approx 284 \times 10^{-6} = 284 \text{ μm} \end{aligned} \qquad (\text{Eq. 20})$$

Despite the foregoing example, it should be appreciated that in various exemplary embodiments according to this invention, the cutoff frequency is established by the aperture width w at a value somewhat above 3 times the fundamental frequency, for example 3.25 or even 3.5 times the fundamental frequency. In such embodiments, errors due to the $3^{rd}$ harmonic are significantly reduced, and the resulting readheads according to this invention still provide significant benefits in various applications.

Figure 26:
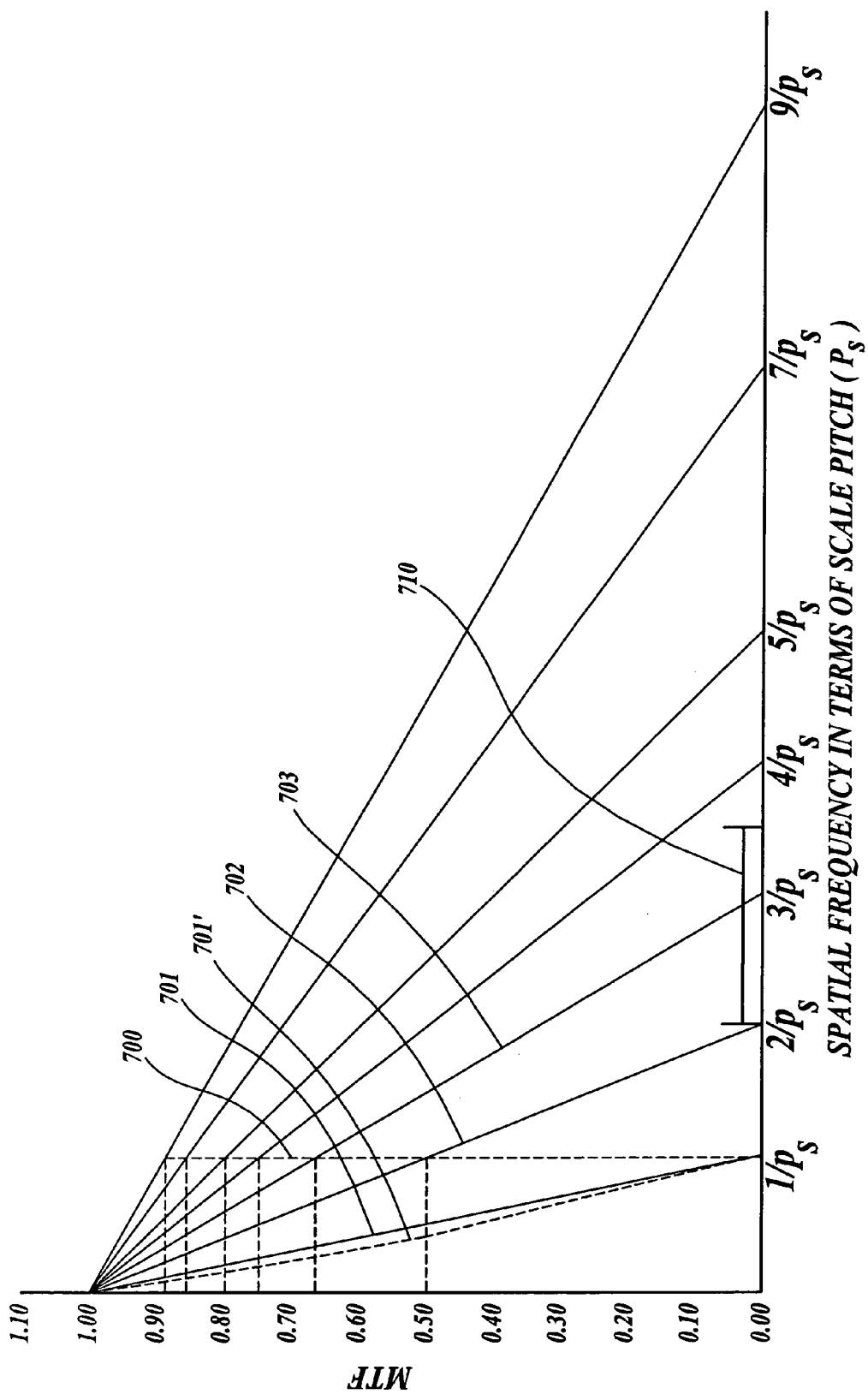
FIG. 26 is a chart illustrating the modulation transfer functions corresponding to various sets of design parameters and one exemplary design range according to this invention.

FIG. 26 is a chart illustrating the ideal modulation transfer functions (MTF) for incoherent illumination and a rectangular aperture, and corresponding to various sets of design parameters and one exemplary design range according to the present invention. The lines in FIG. 26 represent various parameter choices such that (w/$\lambda f$)=n/$p_s$ (where n/$p_s$ is shown along the X-axis). The vertical axis shows MTF values corresponding to various operating conditions. For example, the MTF lines 702 (and 703) correspond to respective spatial filtering configurations that eliminate spatial frequencies as low as 2 times (and 3 times) the fundamental spatial frequency, respectively. When one of these respective configurations is used, the signal at the fundamental spatial frequency is attenuated according to the MTF value corresponding to the intersection of the dashed line 700 and the MTF line corresponding to the respective configuration. Thus, FIG. 26 in combination with EQUATIONS 14–19 emphasizes the interrelationship between all the parameters (w, $\lambda$, $f$, and $p_s$) and the measurement signal attenuation at the fundamental frequency, and aids in identifying readhead configurations according to this invention that achieve a desirable combination of operating characteristics for a particular application or applications. The numerator integers "n" along the horizontal axis can be thought of as corresponding to the n-th spatial harmonic of the scale pitch, $P_s$.

As indicated by the design range 710 in FIG. 26, in various exemplary embodiments according to this invention where the spatial filtering constraint is the most limiting design constraint, the configuration should be adjusted to completely eliminate spatial frequencies at least as low as 3.5 times the fundamental frequency, in order to significantly reduce errors due to the third harmonic. In various other embodiments it should be adjusted to completely eliminate spatial frequencies as low as 3.25 times the fundamental frequency, to further reduce $3^{rd}$ harmonic errors. In various other embodiments it should be adjusted to completely eliminate spatial frequencies as low as 3.00 times the fundamental frequency, to completely eliminate $3^{rd}$ harmonic errors.

In various other readhead designs according to this invention, $2^{nd}$ harmonic errors may arise due to causes other than the spatial frequency content of the scale grating image. Thus, in such embodiments the configuration should be adjusted to completely eliminate spatial frequencies as low as 2.5 times the fundamental frequency, in order to significantly reduce $2^{nd}$ harmonic errors. In various other embodiments it should be adjusted to completely eliminate spatial frequencies as low as 2.0 times the fundamental frequency, to completely eliminate 2nd harmonic errors. Furthermore, the dashed line 701' in FIG. 26 is a realistic MTF line corresponding to a rectangular aperture according to this invention, that shows more signal attenuation than the comparable ideal MTF line 701. Thus, there is a risk that the measuring signal amplitude may become the limiting factor in various embodiments according to this invention.

In various exemplary embodiments according to this invention, an aperture width determined based on % DOF constraints, as outlined with reference to EQUATIONS 11–13B above, can be checked against an aperture width determined based on spatial filtering constraints as outlined above. In general, the narrowest of these aperture widths will be selected, provided that it corresponds to an acceptable overall measuring signal for the system. It should be appreciated that the MTF curves corresponding to circular apertures are generally curved lines falling somewhat below the corresponding lines shown in FIG. 26. Such curves are readily available in diffraction-limited optics design literature, and can be used in the same manner as FIG. 26, in order to determine a circular aperture dimension for a readhead according to this invention. However, it should be appreciated that the measuring signal amplitude may often become the limiting factor in various embodiments using a circular telecentric aperture according to this invention.

In general, in various exemplary embodiments of readheads according to the present invention, a limiting telecentric aperture may be provided that has a dimension along the measuring axis direction that provides a diffraction-limited optical system that suppresses the higher order spatial harmonics by spatial filtering. This robustly provides a sufficiently sinusoidal optical signal, without the need for other measures, in various exemplary embodiments. In various other exemplary embodiments, a telecentric aperture width according to the present invention may be used in combination with various other means that may include various duty cycles, element widths, and the like, for the elements of the scale grating 116 and/or a structure of the sets of optical detectors 122a of the readhead, in order to further reduce or eliminate spatial harmonics in the received image of the scale grating 116, in a manner generally known to one of ordinary skill in the art of encoder design, for example as disclosed in U.S. Pat. No. 5,576,537 to Holzapfel, which is incorporated herein by reference for all of its relevant teachings.

Referring back to FIG. 21, as discussed above, it has been found that in various exemplary embodiments according to this invention, an aperture 121 having a relatively elongated shape, such as a rectangular shape for example, is beneficial because a relatively elongated dimension can provide a significant increase in optical power compared to that of a circular aperture having the same dimension (w) along the measuring axis. Thus, although a circular aperture is used in various exemplary embodiments according to this invention, in various other exemplary embodiments, a relatively elongated dimension or height (h) is selected to be as much as 2 to 6 times the dimension (w), or more. In one exemplary embodiment a rectangular-shaped aperture is configured to have the dimensions of w=200 μm and h=400 μm. In another exemplary embodiment a rectangular-shaped aperture is be configured to have the dimensions of w=200 μm and h=800 μm. In yet another exemplary embodiment a rectangular-shaped aperture can be configured to have the dimensions of w=200 μm and h=1.8 mm. In various other exemplary embodiments according to this invention, the aperture height (h) is selected to be at most:

$$h = (2M_y/(1+M_y))(R-Fo)$$ (Eq. 21)

where $M_y$=a magnification of the image at the image detection plane 157a, along the direction of the relatively elongated dimension, R=the lens radius perpendicular to the optical axis 129, and Fo=the dimension between the optical axis and the edge of the received field of view along the y-axis at the scale grating 116, that is, the most extreme point in the field of view as determined by the dimensions of the light receiving elements of the readhead, and the optical magnification $M_y$. A maximum aperture height according to EQUATION 21 nominally restricts the amount of vignetting to zero, to achieve uniform illumination across the received image. However, it should be appreciated that various exemplary embodiments according to this invention are not so limited, and still provide many of the other benefits outlined herein.

Figure 27:
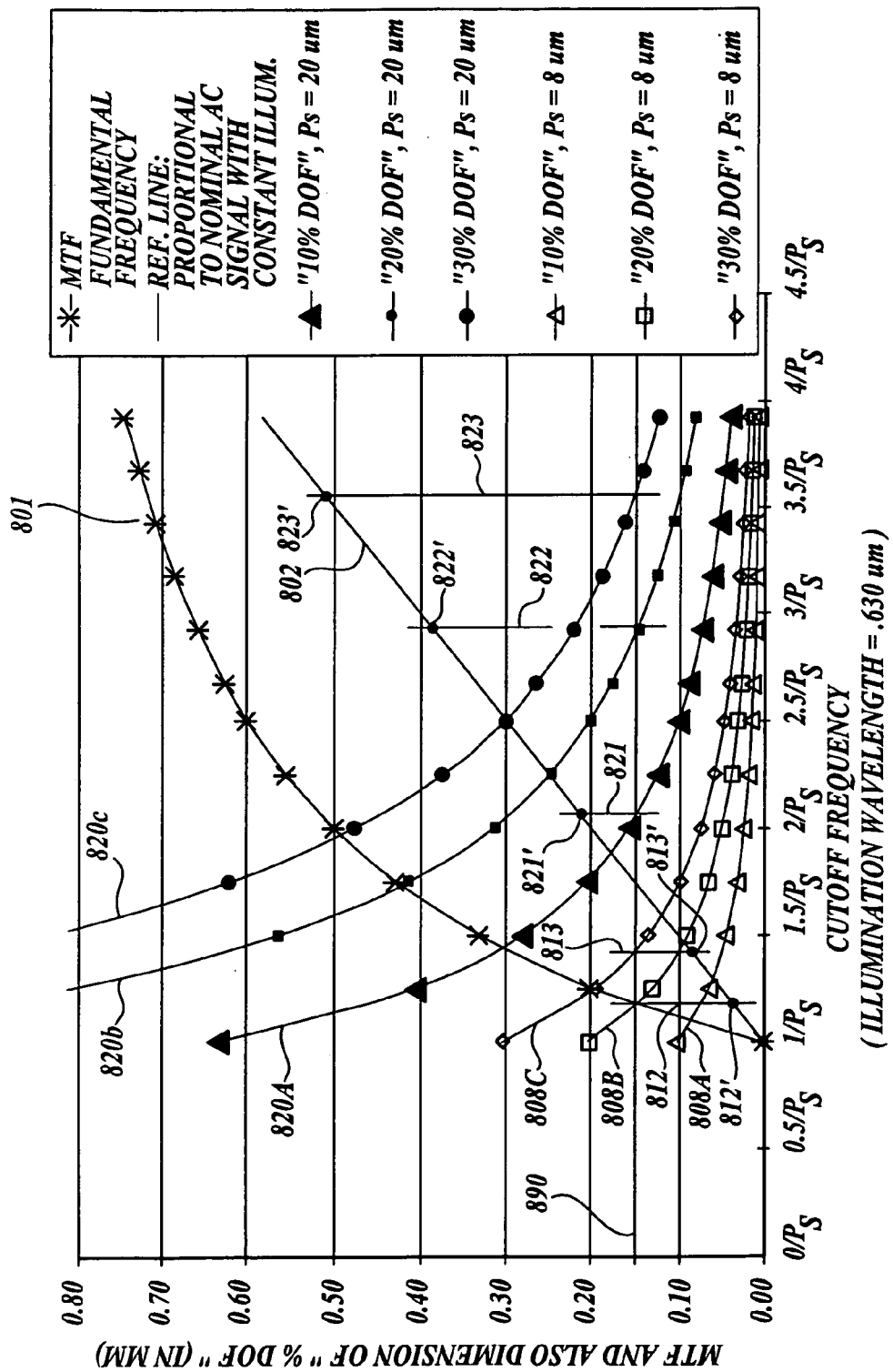
FIG. 27 is a chart illustrating the dependence of depth of field (% DOF), spatial harmonic content, and optical signal power, on the dimension of an aperture along the measuring axis direction.

FIG. 27 is a chart that assumes incoherent illumination and illustrates the dependence of depth of field (% DOF), spatial harmonic content, and optical signal power, on the dimension of an aperture along the measuring axis direction. The line 801 indicates the MTF (as a decimal fraction) for the fundamental spatial frequency corresponding to the scale grating pitch $P_s$, and corresponding to the spatial frequency cutoff shown along the horizontal axis, as provided by a corresponding telecentric aperture dimension along the measuring axis direction. The line 801 may be derived from the values along the line 700, in FIG. 26. For any cutoff spatial frequency $n/P_s$, the corresponding aperture dimension along the measuring axis direction may be determined from:

$$w = \frac{n}{P_S} * f\lambda$$ (Eq. 22)

The line 802 is a reference line indicating values (in arbitrary units) that are proportional to the nominal AC signal strength provided by the image of the scale grating at the detectors of a readhead, for the corresponding cutoff frequency and aperture dimension. The lines 808A–808C indicate the dimension of the % DOF (in mm) corresponding to 10% DOF, 20% DOF and 30% DOF, respectively, for $P_s$=8 μm. Similarly, the lines 820A–820C indicate the dimension of the % DOF corresponding to 10% DOF, 20% DOF and 30% DOF, respectively, for $P_s$=20 μm. The % DOF lines shown in FIG. 27, and similar lines corresponding to other design parameters, can be determined according to the teachings associated with EQUATIONS 11–13B and 16–19 above. The % DOF values in FIG. 27 correspond to an illumination wavelength of 630 nm.

For the example shown in FIG. 27, a line 890 indicates one exemplary design constraint for a minimum depth of field at a value of 0.15 mm. A value on any % DOF line on or above the line 890 provides the desired mounting (or allowable gap variation) tolerance of 0.15 mm. For example, the lines 821, 822 and 823 indicate that for this desired gap variation tolerance and $P_s$=20 mm, the 10% DOF corresponds to 2.1/$P_s$, the 20% DOF corresponds to 2.9/$P_s$, and the 30% DOF corresponds to approximately 3.5/$P_s$. For an illumination wavelength of 630 nm and a lens having a focal length of 3.0 mm, according to EQUATION 22 these cutoff frequencies correspond to maximum aperture dimensions of 198 mm, 274 mm, and 331 mm, respectively. When $P_s$ is somewhat less than 20 μm, for example 15 μm, a smaller aperture dimension corresponding to a cutoff frequency as low as 1.6/$P_s$ is used to provide an acceptable 10%/DOF dimension in various exemplary embodiments.

As previously indicated, in various exemplary embodiments according to this invention, the largest possible aperture that provides a desired % DOF is chosen, in order to provide the maximum nominal signal that can be obtained for a desired % DOF, in order to provide a better S/N ratio. As shown by the points 821' and 822' along the "AC signal strength" line 802, an aperture corresponding to a cutoff frequency of 2.9/$P_s$ provides almost twice the nominal signal strength of the aperture corresponding to the cutoff frequency of 2.1/$P_s$. Therefore, in various exemplary embodiments according to this invention where a relatively larger scale grating pitch, such as 15–20 μm or more, is used, cutoff frequencies as low as approximately 2.1/$P_s$ to 1.6/$P_s$ are usable to provide the largest aperture dimension for a % DOF. However, provided that the signal processing electronics are compatible with the potential optical signal variation over the desired allowable gap variation range, in various exemplary embodiments, larger apertures corresponding to a harmonic-constrained cutoff frequency of up to 3.5/$P_s$ may be used in order to provide a larger signal and a better S/N ratio, and a % DOF that is suitable for some applications may still result for such relatively large scale grating pitches. In various other exemplary embodiments, an aperture dimension is chosen in a range corresponding to a cutoff frequency range of 2.1/$P_s$ to 2.7/$P_s$, as a desirable compromise range in various exemplary embodiments that use such relatively large scale grating pitches.

For the example shown in FIG. 27, the cutoff frequency and aperture corresponding to the point 823' provide an even larger nominal signal strength in various exemplary embodiments according to this invention. Although the cutoff frequency may be set to $3.5/P_s$ with only a small portion of the third harmonic signal component appearing in the detected image, as previously described, in various other exemplary embodiments according to this invention, it is desirable to strictly eliminate all spatial frequencies greater than $3.0/P_s$ (to strictly eliminate the third harmonic) since the third harmonic provides the largest error contribution in many practical readhead applications. Thus, as previously outlined with reference to FIG. 26, in such embodiments an aperture corresponding to a maximum cutoff frequency of less than or equal to $3.0/P_s$ is chosen, even though a smaller nominal signal may result.

When a moderate scale grating pitch, such as approximately 12–15 μm, is used, in various exemplary embodiments according to this invention an aperture dimension is chosen in a lower range corresponding to a cutoff frequency range of $1.4/P_s$ to $2.5/P_s$, as one desirable compromise range that provides a relatively larger allowable gap variation for such moderate scale grating pitches, although a even smaller nominal signal may result.

For the exemplary % DOF curves 808A–808C, it can be seen the 10% DOF curve 808A cannot provide the desired allowed gap variation. The 20% DOF and 30% DOF curves 808B and 808C provide the desired allowed gap variation at approximately $1.2/P_s$ and $1.4/P_s$, respectively, as indicated by lines 812 and 813. However, the line 812 and the point 812' on the line 802 indicate that an extremely weak signal will result for an aperture corresponding to $1.2/P_s$. Thus, in various exemplary embodiments that use a relatively small scale grating pitch $P_s$, a % DOF of 30% or more is used, in order to provide a larger nominal signal strength. In a corresponding manner, in various exemplary embodiments according to this invention where $P_s$ is less than or equal to approximately 12 μm for example, and an insufficient measuring signal would otherwise result, an aperture corresponding to a minimum spatial frequency cutoff range of $1.4/P_s$ to $1.8/P_s$ is used, regardless of the corresponding % DOF percentage required to provide the desired allowable gap variation dimension. In various exemplary embodiments that use such relatively smaller scale grating pitches, such a range provides one desirable compromise range that is usable in order to provide both a sufficient signal strength, and a reasonably limited variation in signal strength, within a desired allowed gap variation range of approximately 50 μm, or 100 μm, or 150 μm, for example.

It should be appreciated that, in various exemplary embodiments according to this invention, a readhead using incoherent illumination and an aperture selected according to the principles oulined above can provide sinusoidal signals that vary from an ideal sinusoidal function by as little as at least one of 1/16, 1/32, or even 1/64 or 1/256 or less of the peak-to-peak variation of the sinusoidal function. Accordingly, the signal-to-noise ratio associated with a readhead according to this invention can be quite high, as high as at least one of 32, 40, 64, 128 or even 256, for example. Thus, overall, a variety of readheads according to this invention can provide accurately interpolated displacement measurements with meaningful resolutions as high as at least one of 1/16, 1/32, or even 1/64 or 1/256 or less, of the scale grating pitch $P_s$.

Figure 28:
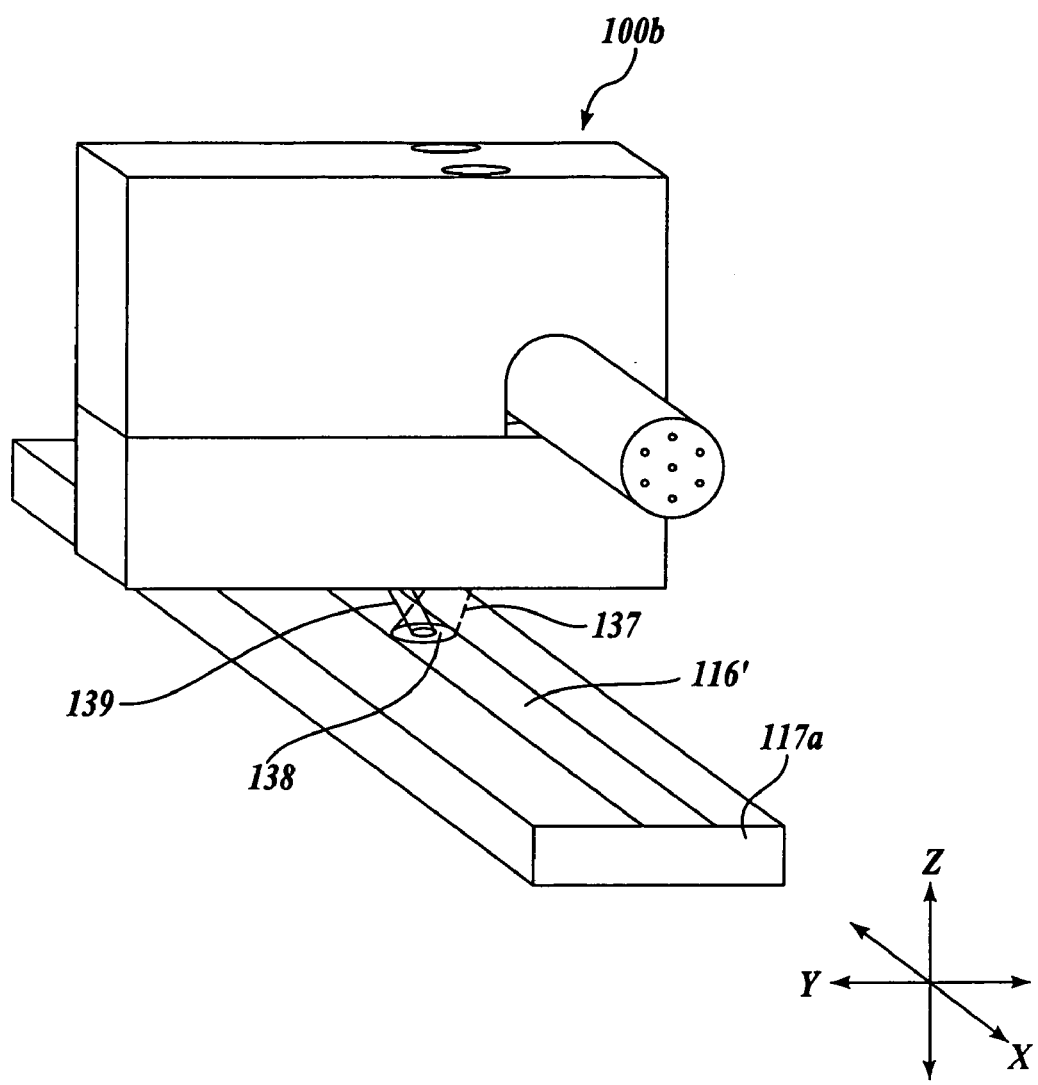
FIG. 28 is an isometric view of a thirteenth embodiment of a readhead according to this invention that is operable with a reflective type scale.
Figure 29:
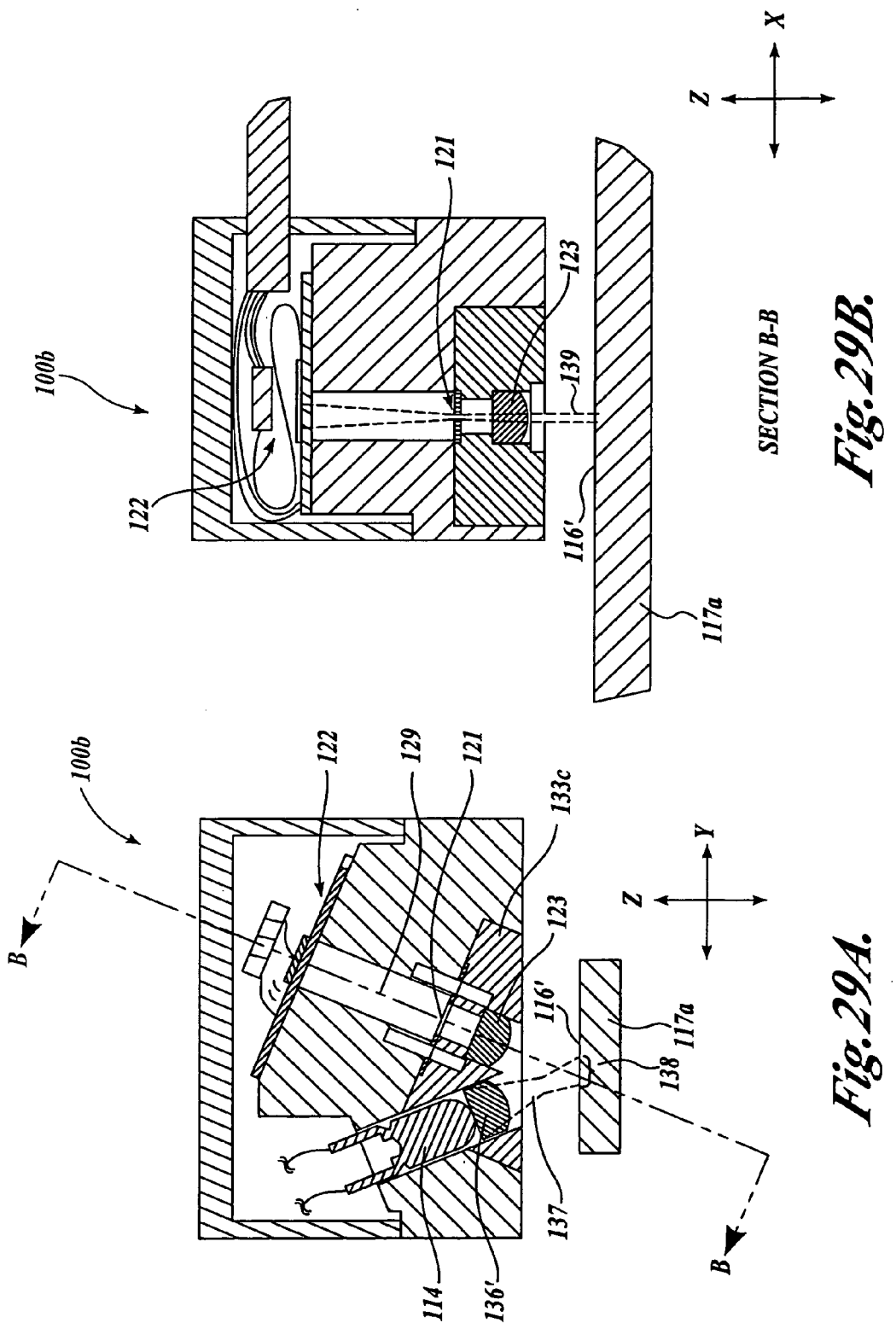
FIGS. 29A and 29B are cross-section views cut along (i.e., viewed perpendicular to) the optical axis, illustrating the assembled optical components and optical path of the configuration of FIG. 28.

FIG. 28 is an isometric view of a thirteenth embodiment of a readhead 100b according to this invention that is operable with a reflective type scale grating 116'. FIGS. 29A and 29B are cross-section views perpendicular to the optical axis 129, illustrating the assembled optical components and the optical paths of the configuration of FIG. 28. The operation of this reflective type configuration is similar to that of the transmissive type configuration described above, except that the illumination source 114 is located generally on the same side of the reflective scale grating 116' as the lens 123, aperture 121, and detector assembly 122, so as to illuminate the reflective scale grating 116' provided on the scale substrate 117a from above (in FIG. 28). In some reflective embodiments, the illumination source 114 illuminates the scale 117A at an angle, as illustrated in FIG. 28. As before, the illumination light 137 from the source 114 passes through a lens 136' to concentrate the available optical power in a limited region 138 around the field of view. The limited region 138 is large enough to ensure that the field of view is fully illuminated over the full desired gap tolerance range.

The reflective scale grating pattern 116' comprises grating lines and spaces. In various embodiments, the lines are fabricated in such a way as to reflect or diffusely reflect the light 137 from the illumination source 114, and those rays of the reflected light 139 that are directed parallel to the optical axis 129 are focused by the lens 123 and spatially filtered by the aperture 121, as described above, so as to provide brighter regions in the scale image received by the detector assembly 122. In contrast, the spaces are fabricated to either significantly absorb the light 137, reflect it away from the optical axis 129, or transmit it so that it is not received by the detector assembly 122, in various alternative embodiments. The spaces thus provide dark regions in the image received by the detector assembly 122 that strongly contrast with the bright regions provided by the reflecting or diffusely reflecting lines. In various exemplary embodiments, the scale grating pattern consists of substantially planar or flat lines and spaces. In various other embodiments, the scale grating pattern includes blazed grating elements that are designed with consideration to the angle(s) of incidence of the source light, in order to provide and/or enhance the contrast between the bright and dark regions in the image of the scale grating pattern received by the detector assembly 122. Some embodiments of reflective-type scale grating patterns suitable for use in a reflective-type configuration according to the present invention will be more fully described below in reference to FIGS. 30–33.

In various alternative embodiments, a reflective type scale grating 116' having the properties described above may be fabricated directly on a suitable substrate 117a. In various other embodiments, the scale grating 116' may be fabricated on a tape-type scale that is mounted on a suitable substrate 117a or directly on a machine surface (as illustrated in FIG. 28). In various exemplary embodiments, the tape-type scale includes angled reflecting (diverting) stripes (see FIG. 33, to be more fully described below) to produce the dark areas. In such a case, the tape-type scale may be formed of a relatively opaque (but reflecting) material.

Figure 30:
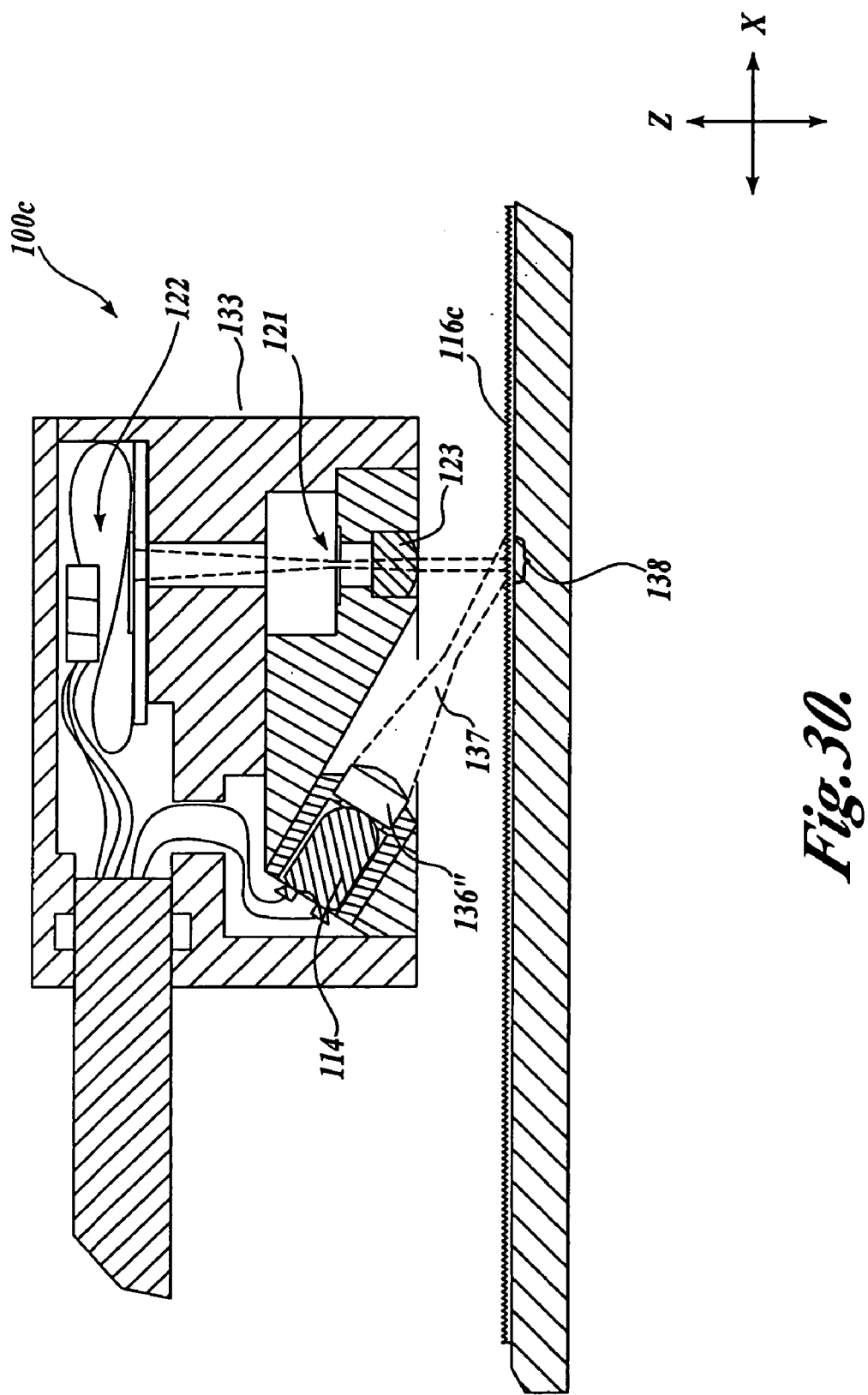
FIG. 30 is a cross-section view cut along (i.e., viewed perpendicular to) the optical axis, illustrating the assembled optical components and optical path of a fourteenth embodiment of a readhead according to this invention that is operable with various reflective type scales.

FIG. 30 is a cross-section view seen perpendicular to the optical axis, illustrating the assembled optical components and the optical paths of a fourteenth embodiment of a readhead 100c according to this invention that is operable with a reflective type scale grating 116c. In contrast to the readhead 100b, in which illumination light 137 and the optical axis 129 were aligned in the y-z plane, at respective angles, (see FIG. 29A), in the readhead 100c the illumination light 137 and the optical axis 129 are aligned in the x-z plane, with optical axis 129 normal to the nominal plane of the scale grating 116c and the illumination light 137 angled in a manner that complements certain angles used in the structure of the scale grating 116c, as described further below. In various exemplary embodiments, the illumination light 137 is collimated or nearly collimated by the lens 136" to enhance the operation of the readhead 100c with the scale grating 116c. Otherwise, the various elements of the readhead 100c are designed and operated in a manner analogous to that described for similarly numbered or obviously comparable elements of previously described readheads. Therefore, the embodiment of the readhead 100c may be understood based on previous discussions, and need not be further described here.

The scale grating 116c operable with the readhead 100c of this embodiment consists of faceted or angled surfaces. Some examples of reflective-type systems that use angled reflecting (or diverting) scale grating surfaces are disclosed in U.S. Pat. No. 4,974,962 to Stephens et al., which is incorporated herein by reference.

Figure 31:
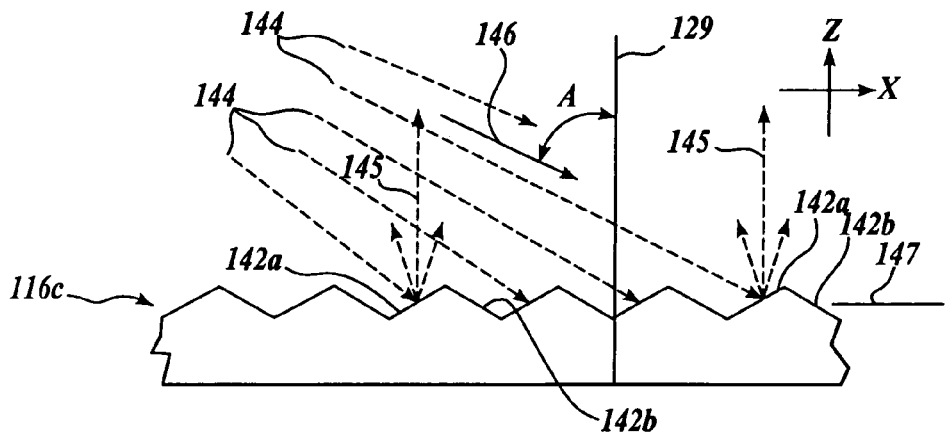
FIG. 31 is a highly magnified side view showing the operation of an illuminated portion of a first exemplary reflective scale configuration usable with the readhead of FIG. 30.

FIG. 31 is a highly magnified side view showing the principle of operation of an illuminated portion of a first exemplary reflective scale configuration 116c operable with the readhead 100c of FIG. 30. In this embodiment collimated, partially collimated and/or slightly diverging or converging illumination rays 144 of the illumination light 137 are incident on the scale grating 116c along a nominal illumination direction 146 at an angle in the x-z plane, and the optical axis 129 leading to the photodetector assembly 122 (not shown) is aligned in the x-z plane normal to the nominal overall plane 147 of the scale grating 116c. As illustrated, the reflective scale grating 116c consists of alternating first and second surfaces or facets 142a and 142b. The facets 142a are arranged at a respective angle that complements the angle of the illumination rays 144 such that the incoming rays 144 incident on the first surfaces 142a are primarily reflected therefrom in a direction 145 nominally parallel to the optical axis 129, to provide the brighter regions in the received image of the scale grating 116c. The second surfaces 142b are arranged at a respective angle such that they are either shadowed from the illumination rays 144, or such that any illumination rays 144 incident on the second surfaces 142b will be diverted away from the direction of the optical axis 129 and nominally will not reach the detector assembly 122. Thus the surfaces 142b provide the darker regions in the received image of the scale grating 116c. In embodiments where the first surfaces 142a are highly planar and reflective, slightly diverging and/or converging illumination rays tend to insure that light is reflected along the optical axis 129 to form an image, even if the readhead 100c is slightly misaligned or the nominal plane of the scale grating 116c undergoes slight local angular deviations due to non-flatness of the surface of the scale or mounting surface, or the like. If the first surfaces 142a are fabricated in such a way that a hybrid reflection is produced, that is, a combination of Lambertian and specular reflection is produced, then the illumination may be provided as collimated, or approximately collimated, light.

Figure 32:
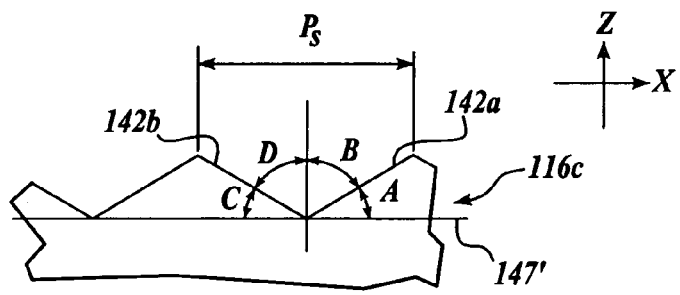
FIG. 32 is a highly magnified side view illustrating various operable sets of dimensions for the first exemplary reflective scale configuration of FIG. 31.

FIG. 32 is a still further magnified side view illustrating various operable sets of dimensions for the first exemplary reflective scale configuration 116c of FIG. 31. The scale pitch $P_s$ is defined as the length along the x-axis of one first surface 142a and one second surface 142b. The first surfaces 142a lie at an angle A to a plane 147' that is parallel to the nominal plane 147 of the scale 116c and at a complementary angle B to an optical axis 129 of the readhead 100c. The second surfaces 142b lie at an angle C to the plane 147' of the scale 116c and at a complementary angle D to the optical axis 129. Due to the angles A and B, the first surfaces 142a reflect the incident light (144 in FIG. 31) toward the readhead 100c along the optical axis 129. In one exemplary embodiment, A=C=30 degrees, B=D=60 degrees, and the illumination rays are provided at an angle of 30 degrees relative to the plane 147. However, other operable combinations of angles may be used in various other embodiments.

Figure 33:
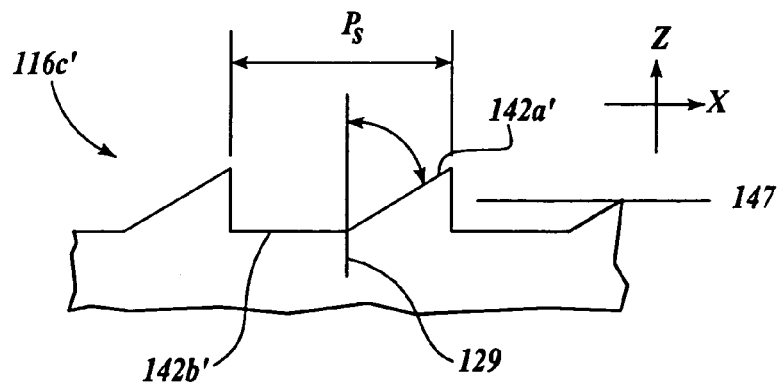
FIG. 33 is a highly magnified side view illustrating a second exemplary reflective scale configuration usable with the readhead of FIG. 30.

FIG. 33 is a similarly magnified side view illustrating a second exemplary reflective scale grating 116c' usable with the readhead 100c of FIG. 30. As illustrated, the reflective scale 116c' has a sawtooth profile, consisting of alternating first inclined surfaces 142a' that may be angled and operated in the same manner as the previously described first surfaces 142a. Second surfaces 142b' are approximately parallel to the plane 147. In one exemplary embodiment, the angle E is 60 degrees, and the illumination rays are provided at an angle of 30 degrees relative to the plane 147 such that the shadows of the surfaces 142a' are nominally coextensive with the surfaces 142b'.

The reflective type embodiments of the scale gratings 116c and 116c' including angled reflecting (or diverting) surfaces, as described above, provide improved optical contrast between the brighter and darker regions in the received image of the scale gratings. A telecentric aperture configuration according to this invention is particular well suited for such scales, which tend to have somewhat imperfect or irregular grating element edges due to the metal-forming methods used to fabricate such scales. It should be appreciated that somewhat irregular edges become relatively inconsequential and do not contribute to significant errors since the higher spatial frequencies associated with the edge imperfections tend to be filtered out along the measuring axis direction of the received image according to this invention.

Figure 34:
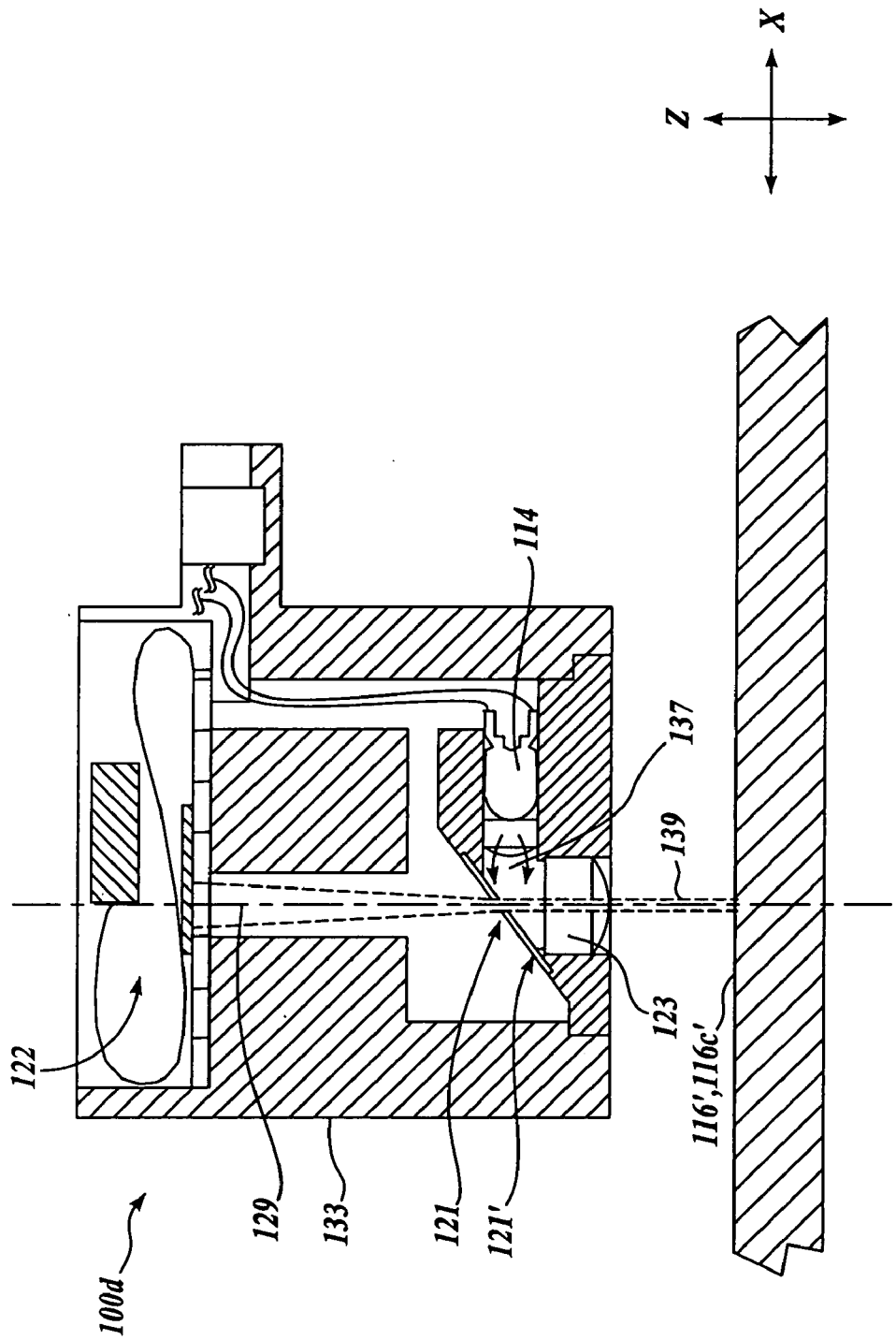
FIG. 34 is a cross-section view cut along (i.e., viewed perpendicular to) the optical axis, illustrating the assembled optical components and optical path of a fifteenth embodiment of a readhead according to this invention that is operable with various reflective type scales.

FIG. 34 is a cross-section view seen perpendicular to the optical axis, illustrating the assembled optical components and optical paths of a fifteenth embodiment of a readhead 100d according to this invention, which is similar to the eighth exemplary embodiment shown in FIG. 11, and which is also operable with various reflective type scales, such as the scales 116' or 116c' (although it should be appreciated that in this embodiment, for the scale 116c' the second surfaces 142b' in FIG. 33 would provide brighter regions in the received image and the first surfaces 142a' would provide darker regions, since the illumination light is nominally normal to the plane of the scale, as will be more fully described below.) As before, the readhead 100d includes a housing 133 that encloses the lens 123, aperture 121, and detector assembly 122.

The primary difference between the majority of the previous readhead embodiments and the readhead 100d is that the aperture 121 is located in an aperture plate 121' that is positioned at an angle relative to the optical axis 129 so as to receive the light 137 from a suitably positioned light source 114 and deflect it generally along the optical axis 129 and through the lens 123 to illuminate the scale grating in a manner similar to that previously described. Thus the readhead 100d eliminates the beam splitter 61 shown in FIG. 11, and provides the same light deflecting function with the plate 121' defining the aperture 121. To that end, the plate defining the aperture 121 is fabricated as a reflective mirror made, for example, of a reflective thin film on glass, polished metal, or the like. It should be appreciated that this configuration avoids a first loss of illumination intensity and a second loss of optical signal intensity, as well as potential spurious reflections, that may be associated with the eighth exemplary embodiment. The telecentric aperture 121 is still positioned and operated as previously described to spatially filter the detected light 139 that is reflected from the scale grating 116', 116c, 116c', or the like, parallel to the optical axis 129, to transmit a nearly sinusoidal image intensity profile toward the detector assembly 122. Accordingly, the illumination path and the return optical path are aligned and nominally normal to the scale 116. This offers great flexibility in choices of the types of scales, as well as excellent misalignment error rejection characteristics. This design can also be very compact along both the x- and y-axis. Otherwise, the various elements of the readhead 100d are designed and operated in a manner analogous to that described for similarly numbered or obviously comparable elements of previously described readheads. Therefore, the embodiment of the readhead 100d may be understood based on previous discussions, and need not be further described here.

It should be appreciated that any of the embodiments shown, described, or taught herein can be adapted in any of the circular or cylindrical rotary position readheads as taught in the '312 application, incorporated above. A circular rotary embodiment may be understood by considering a segment of the scale grating 116 shown in FIG. 21 as arranged to have a radius of curvature in the x-y plane such that the shape of the scale grating elements remains operable, that is, they are not too wedged shaped. Such a scale is arranged circumferentially on a relatively planar scale surface that rotates about an axis parallel to the z-axis. In such a case, the measuring axis follows a relatively planar circular path in the x-y plane. A cylindrical rotary embodiment may be understood by considering a segment of the scale grating 116 shown in FIG. 21 as arranged to have a radius of curvature in the x-z plane such that an operable quantity of light is transmitted (reflected) from the scale grating 116 parallel to the optical axis, and the field of view lies with an operable % DOF. Such a scale is arranged circumferentially around a relatively cylindrical surface that rotates about an axis parallel to the y-axis. In such a case, the measuring axis follows a relatively circular path in the x-z plane. As with the linear encoders described above, the dimension of a telecentric aperture along the measuring axis is to be chosen based on a desirable depth of field (% DOF) and/or desirable spatial frequency, and other considerations such as contrast and optical power, so as to obtain a desired combination of readhead operating characteristics.

FIGS. 35A and 35B are cross-section views seen perpendicularly to and along an optical axis 763, respectively, illustrating the assembled optical components and the optical paths of a sixteenth embodiment of an imaging type readhead 100e according to this invention. The readhead 100e uses a fiber optic receiver channel configuration for receiving and outputting a periodic image of the scale grating 116', as opposed to the optoelectronic optical detector assembly 122 described with respect to various other readhead embodiments according to this invention. The readhead 100e and other examples of such fiber-optic readheads are disclosed in co-pending U.S. patent application Ser. No. 10/650,453, which is incorporated by reference herein.

Briefly, the readhead 100e includes a generally cylindrical housing 152 having a plurality of illumination source fibers 770 that are located near the perimeter of the housing 152. As best illustrated in FIG. 35B, six source fibers 770 are utilized to provide the illumination light, which jointly illuminate an approximately annular or circular region 764 at the surface of the scale grating 116'. Some of the light reflected or diffusely reflected from the scale grating elements in the illuminated area(s) of the scale 116' will form light rays 753 parallel to the optical axis 763 that will be imaged back through an imaging lens 776 (analogous to the lens 123), and through a telecentric limiting aperture 775 (analogous to the telecentric aperture 121), to form a periodic image at the area(s) of a set of respective phase masks 720 (analogous to the set of optical detectors 122a) of a set of respective fiber optic receiver channels 790. The plane of the set of respective phase masks 720 defines an image detection plane 760 where the set of respective phase masks receive the periodic image of the scale grating 116'. The areas of the scale 116' that will be imaged generally surround and include the optical axis 763 of the fiber optic readhead 100e. When the telecentric limiting aperture 775 is designed as described previously for the aperture 121, to provide a diffraction-limited optical system according to this invention, and the other scale and readhead elements that combine to form the received periodic image are configured according to this invention, the periodic image received by the phase masks 720 will have the same desirable properties as those described for other readheads according to this invention. In various exemplary embodiments, the fiber optic readhead 100e is a miniature fiber optic readhead, constructed such that at least a portion of the length of the housing 152 (along the z-axis) can be inserted into a bore having a dimension perpendicular to its central axis (e.g., a diameter) that is at least as small as 5.0 millimeters.

Figure 36:
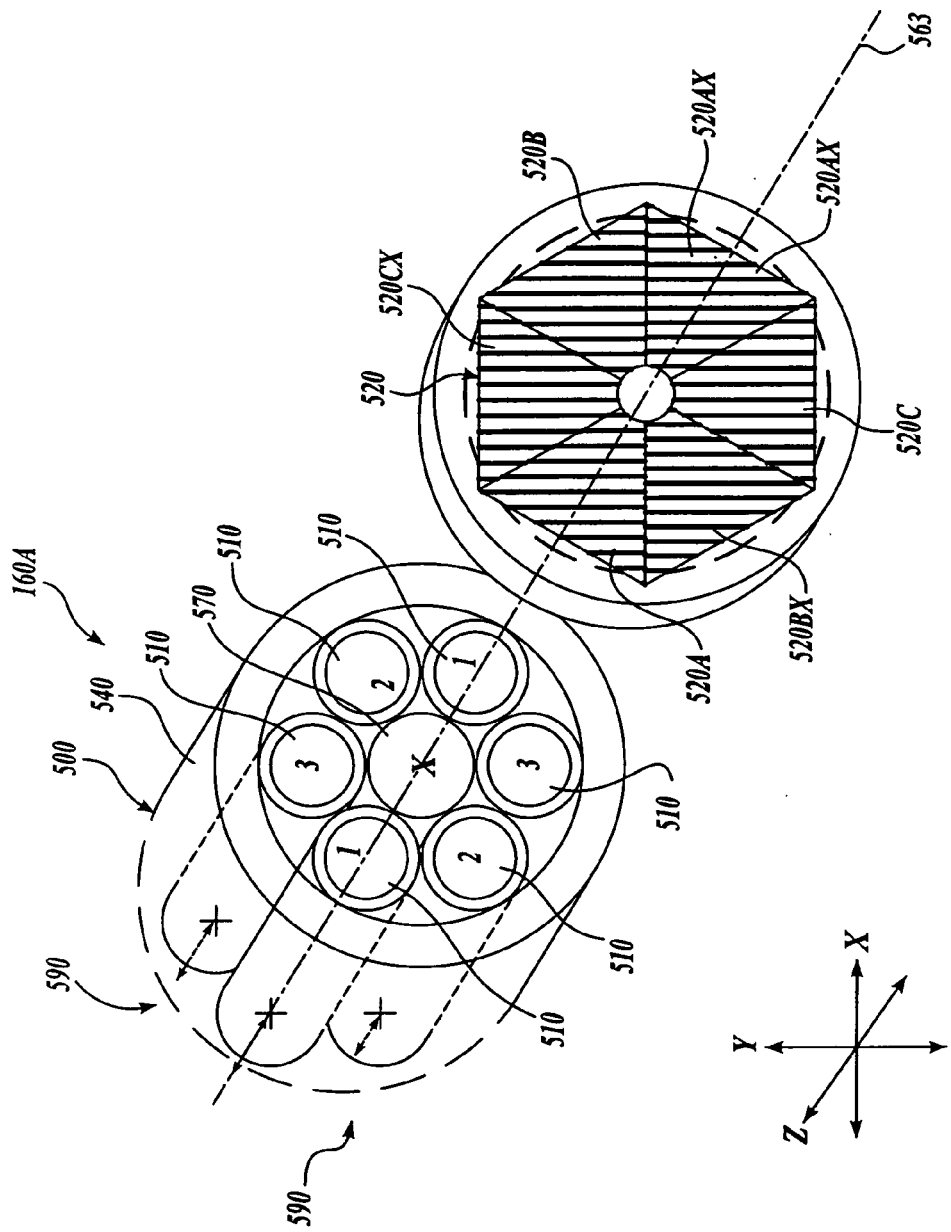
FIG. 36 is an exploded isometric view illustrating one exemplary fiber optic receiver channel configuration that is usable in the readhead of FIGS. 35A and 35B.

FIG. 36 is an exploded isometric view illustrating one exemplary fiber optic receiver channel configuration 160A for use in the readhead 100e of FIGS. 35A and 35B. The receiver channel configuration 160A is disclosed in the incorporated co-pending U.S. patent application Ser. No. 10/650,453. Elements having 5XX reference numbers in FIG. 36 are usable in place of, or identical to, the elements having the corresponding 7XX reference numbers in FIGS. 35A and 35B. Briefly, as shown in FIG. 36, phase masks 520 are 3-phase respective masks that create 3 pairs of respective optical signals that are 120 degrees out of phase when receiving a periodic image of the scale grating 116'. The pitch of the phase masks 520 matches the pitch of the received a periodic image. Specifically, there are a first set of three phase masks 520a–520c, and a second set of three respective phase masks 520ax–520cx, that are respectively arranged in "balanced pairs" on opposite sides of the optical axis 563, as described more fully in the incorporated '453 and '312 applications. The received periodic image is filtered through the three pairs of phase masks 520, and the resulting optical signals are transmitted through the corresponding three pairs of optical fibers 510 of the optical fiber receiver channels 590, which are in this embodiment arranged inside a ferrule 540 around a dummy fiber 570. The optical fibers 510 output three pairs of phase signals that can then be processed to determine the relative displacement of a scale grating, such as the displacement of the scale grating 116' relative to a readhead 100e including the fiber optic receiver channel configuration 160A.

Figure 37:
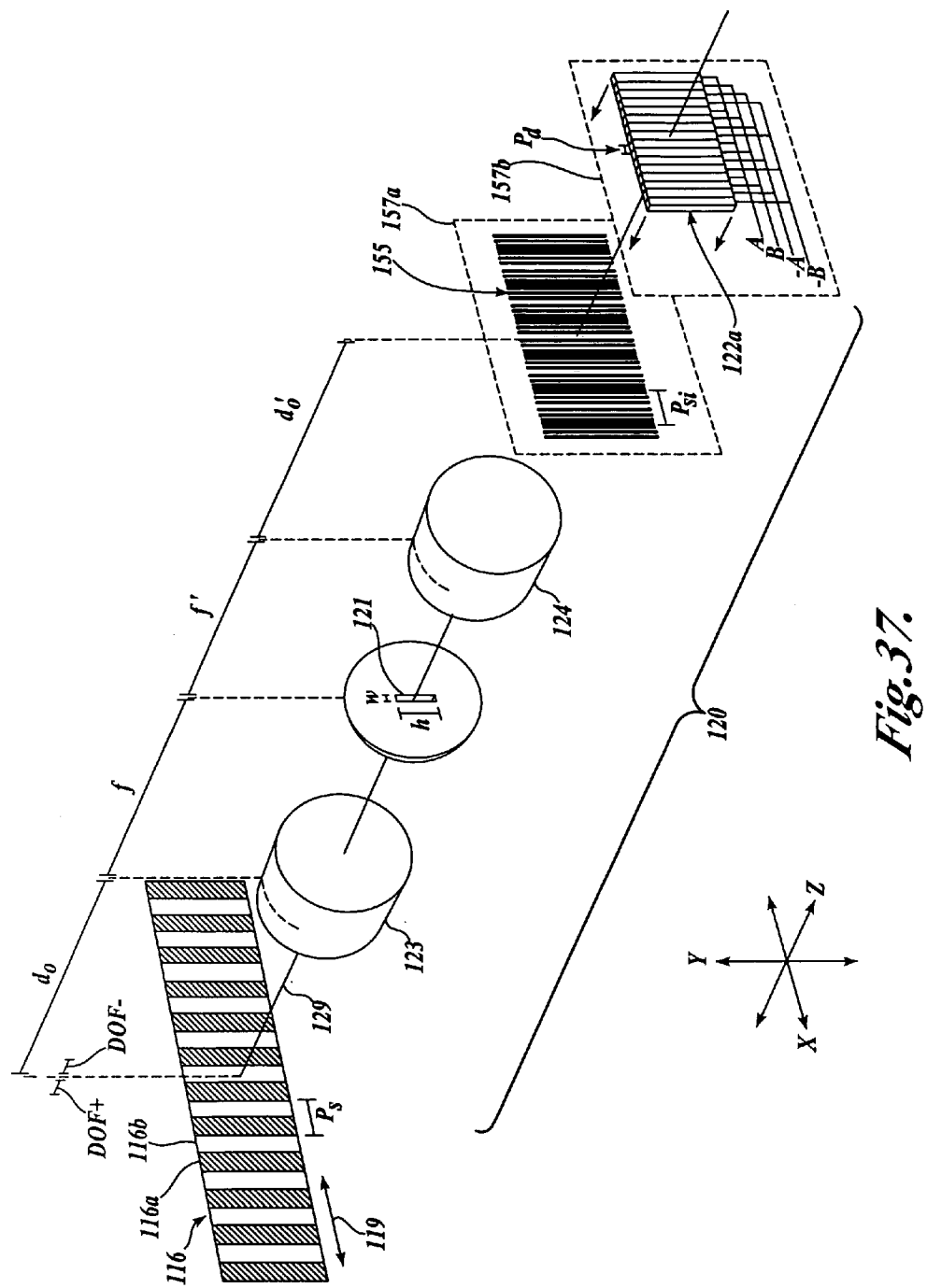
FIG. 37 is an exploded isometric view illustrating the general characteristics of a second exemplary optical arrangement according to this invention that is usable in various readheads according to this invention.

FIG. 37 is an exploded isometric view illustrating the general characteristics of another exemplary optical arrangement according to this invention that is usable in various readheads according to this invention. The exemplary optical arrangement shown in FIG. 37 and described below is substantially the same as the exemplary optical arrangement shown in FIG. 21, with the exception that a second lens 124 is included. Therefore, a detailed explanation is not required and only the differences from the optical arrangement shown in FIG. 21 will be described. Similarly numbered elements in FIGS. 37 and 21 have similar or identical characteristics and are arranged and operated similarly or identically, unless otherwise indicated below.

The second lens 124 is located between the aperture 121 and the image detection plane 157a of the set of optical detectors 122a, with the effective plane of the second lens 124 located at a focal length f of the second lens 124 from the aperture 121. In particular, the characteristics of the second lens 124 and the distance f are chosen to provide a doubly telecentric optical system and, in combination with the characteristics of the lens 123 arranged at its respective focal f from the aperture 121, to provide a desired magnification for the periodic image 155. Due to the doubly telecentric arrangement the magnification of the periodic image 155 is approximately constant even if the distance from the effective plane of the second lens 124 to the image detection plane 157a varies somewhat, which allows more forgiving assembly tolerances and more consistent operation in readheads that include this optical arrangement. However, it should be appreciated that the periodic image 155 still has a plane of best focus and/or contrast, and in FIG. 37 a distance $d_o'$ is intended to coincide with this plane. Thus, the image detection plane 157a of the set of optical detectors 122a is nominally arranged at the distance $d_o'$.

In a particularly advantageous embodiment of the optical arrangement shown in FIG. 37, the second lens 124 has optical characteristics that are nearly the same or identical to those of the lens 123, and it is arranged such that f=f and $d_o'=d_o$, to provide a magnification of 1. In this embodiment, the similar second lens is particularly effective for compensating and/or eliminating various potential image aberrations induced by the first lens. As indicated in FIG. 4, for the smaller diameter lenses that may be desirable for reducing the size of a readhead according to this invention, the selection of economical lenses is typically limited number. In addition, economical smaller diameter lenses are typically available only in simple lens forms, due to the difficulty or cost of fabricating aspherical or multi-element lens with sufficient accuracy. Thus, this arrangement is particularly useful in embodiments that include economical small diameter lenses of simple form. It provides superior overall optical characteristics and an accurate image despite the low cost, small size and potential aberrations of such lenses.

With regard to the use of coherent light sources in various embodiments according to this invention, coherent light sources (such as laser diodes, for example) may be substituted for incoherent light sources (such as LEDs, for example) in various embodiments according to this invention, provided that certain adjustments are made in the selection of the aperture dimension w and certain precautions are considered.

As mentioned above, $$v_c = \frac{2 \cdot NA}{\lambda}$$

for incoherent light, and $$v_c = \frac{NA}{\lambda}$$

for coherent light.

Thus, for coherent light, the equation corresponding to EQUATION 16 remains:

$$\frac{k}{2\pi} < v_c < \frac{3k}{2\pi} \quad \text{(Eq. 23)}$$

and the equations corresponding to EQUATIONS 17, 18 and 19, respectively, are as follows:

For the range of cutoff frequencies indicated by EQUATION 23:

$$\frac{\lambda}{p_s} < NA < \frac{3\lambda}{p_s} \quad \text{(Eq. 24)}$$

NA and w are still related as follows:

$$w = 2f \cdot NA \quad \text{(Eq. 25)}$$

Accordingly, knowing the scale grating pitch ($P_s$), focal length of the lens (f), and illumination wavelength ($\lambda$), one can calculate the range of aperture widths corresponding to EQUATION 23 as follows:

$$2f\left(\frac{\lambda}{p_s}\right) < w < 6f\left(\frac{\lambda}{p_s}\right) \quad \text{(Eq. 26)}$$

This expression for w (in comparison with EQUATION 19) indicates that for fully coherent illumination the maximum dimension w that completely eliminates the third harmonic and higher in the detected image can be twice as large as the comparable maximum dimension usable for incoherent illumination. However, it should be appreciated that, in contrast to the MTF curves shown in FIG. 26, the MTF curves for coherent or approximately coherent illumination are much greater just below the cutoff frequency, and drop off abruptly at the cutoff frequency. Thus, in various readhead embodiments according to this invention that use coherent or approximately coherent illumination, it should be insured that the selected aperture dimension w remains within the range indicated by EQUATION 26 regardless of any allowed tolerances in any of the readhead parameters in EQUATION 26 and regardless of any other design considerations. Otherwise, an insufficient measuring signal will result if the actual dimension w falls below the actual lower limit, and approximately the entire third harmonic component will appear in the detected image if the actual dimension w falls above the actual upper limit. Either of these outcomes is unacceptable in various exemplary embodiments that are intended to provide approximately ideal sinusoidal measuring signals according to this invention.

Various other precautions should be considered when using coherent illumination. For example, it should be appreciated that when certain diffusely reflecting scale grating elements are used for the scale grating, or when coherent illumination passes through certain diffusing scale grating substrates, or the like, the image light may become at least partially spatially incoherent, and probably significantly spatially incoherent. Thus, in such embodiments where significant spatial incoherence arises in the image light due to diffusive scale grating element effects, it is appropriate to determine the aperture dimension w as previously described for the case of incoherent illumination. Such factors must also be taken into account when selecting the aperture dimension w within the ranges outlined above, in order to provide an approximately ideal sinusoidal measuring signal in various embodiments according to this invention. In such embodiments where incoherent image light from the scale grating is guaranteed, the aperture dimension w may be safely determined in a range according to the principles and dimensions previously outlined with reference to incoherent illumination.

In cases of uncertainty, the ability of an aperture dimension w to effectively remove all or part of various spatial harmonics from the scale grating image light arising from a particular scale grating can be determined or verified by experiment, for example by analyzing the scale grating image at the best focused image plane using grating-type spatial filters of various pitches, or the like. It should be appreciated that the results of such an experiment, when interpreted in terms of the operational equations and principles outlined above, will effectively define whether the image light is operationally coherent or incoherent for the purposes of this invention. The aperture may then be determined accordingly, preferably with particular caution taken with regard to the lower limit of EQUATION 26, as outlined above.

It is also important to realize that while spatial harmonic filtering considerations may allow a larger aperture according to EQUATION 26, the associated maximum apertures may provide an inadequate depth of field. Such larger apertures will have approximately the same effect on depth of field whether the illumination is coherent or incoherent. That is, larger apertures will reduce the depth of field regardless of illumination type. Thus, the aperture dimension w is chosen with depth of field considerations as the limiting constraint in various exemplary embodiments using coherent illumination, in the same manner as when using incoherent illumination, and the same limit or range for desirable aperture dimensions may result.

Furthermore, speckle features or other unwanted interference effects may appear in the detected image when coherent illumination is used. In particular, speckle features may arise form rough or diffusing scale grating elements. Thus, in various exemplary embodiments scale grating and readhead configurations are selected to avoid such effects. However, in various other embodiments and/or applications, useful measuring signals can still be obtained despite such effects, and acceptable scale grating and readhead configurations may be determined and/or verified by experiment, if needed.

Thus, more generally, provided that a coherent light source does not give rise to interference phenomena that are of a magnitude that significantly distorts or reduces the nearly sinusoidal measurement signal in various exemplary embodiments according to this invention, such light sources may be used in various exemplary embodiments according to this invention. Various coherent, partially coherent, or incoherent light sources may be tested experimentally in combination with various apertures in various readheads according to this invention, if necessary, in order to determine their suitability for a particular application.

With regard to the use of white or other non-monochromatic light sources in various embodiments according to this invention, the aperture dimension w may generally be determined by treating such light sources as incoherent sources having an effective wavelength that is used as the wavelength $\lambda$. In various exemplary embodiments, the effective wavelength may be determined as the relative-intensity-weighted average of the illumination spectrum of such sources, or even more accurately for the purposes of this invention, as the relative-spectral-intensity-weighted average wavelength of the image light arising from the scale grating. In various exemplary embodiments where it is desired to completely remove all "nth" spatial harmonics arising from the majority wavelengths in the illumination spectrum, the effective wavelength should be determined as approximately the shortest wavelengths included in the spectrum. An aperture determined according to this invention for such a wavelength will also remove the spatial frequencies associated with the spatial harmonics of the longer wavelengths in the spectrum.

While this invention has been described in conjunction with the exemplary embodiments and configurations outlined above, it is evident that the embodiments and configurations described above are indicative of additional alternative embodiments, configurations, and combinations of design parameter values, as will be apparent to those skilled in the art having benefit of this disclosure. Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. A device for measuring the relative displacement between two members, the device comprising:
   (a) a scale grating extending along a measuring axis direction and having a scale grating pitch P; and
   (b) a readhead positionable to receive operable scale grating image light from the scale grating and provide an operable periodic image of the scale grating when the scale grating is illuminated by an illumination source that provides an effective illumination wavelength $\lambda$, the readhead comprising:
      (i) a housing;
      (ii) a set of respective optical detectors positioned within the housing to respectively receive different phases of the operable periodic image;
      (iii) a first lens positioned within the housing to receive light from the scale grating, the first lens having a focal length F that defines a focal point located between the first lens and the set of respective optical detectors; and
      (iv) an aperture positioned approximately at the focal length F between the first lens and the set of respective optical detectors;
   wherein:
   the operable periodic image has a fundamental spatial frequency corresponding to the scale grating pitch P; and
   the aperture is configured with a dimension W along the measuring axis direction such that $W=F*\lambda*(n/P)$, wherein n/P is a cutoff spatial frequency, and one of the following conditions is satisfied:
   C1) the operable scale grating image light is incoherent and n is greater than 1.2 and at most 3.5, and
   C2) the operable scale grating image light is coherent and n is greater than 2.0 and less than 6.0.

2. The device of claim 1, wherein in the condition C1, n is at most 3.0.

3. The device of claim 2, wherein P is at most 20 μm and in the condition C2, n is at most 3.5.

4. The device of claim 3, wherein P is at least 15 μm and in the conditions C1 and C2, n is at least 2.1 and at most 2.7.

5. The device of claim 3, wherein in the condition C2, n is at most 3.0.

6. The device of claim 5, wherein P is at most 15 μm and in the conditions C1 and C2, n is at most 2.5.

7. The device of claim 6, wherein in the condition C1, n is at least 1.4.

8. The device of claim 6, wherein P is at most 12 µm and in the conditions C1 and C2, n is at most 1.8.

9. The device of claim 8, wherein in the condition C1, n is at least 1.4.

10. The device of claim 2, wherein in the condition C1, n is at most 2.0, and in the condition C2, n is at most 4.0.

11. The device of claim 1, wherein the aperture has a dimension H along a direction perpendicular to the measuring axis, wherein H is at least 2 times W.

12. The device of claim 11, wherein H is at most $(2M/(1+M_y))(R-Fo)$, where $M_y$=a nominal magnification of the operable periodic image along the direction of the relatively elongated dimension at a detection plane of the set of respective optical detectors, R=a lens radius perpendicular to an optical axis of the first lens and aperture, and Fo=a nominal dimension between the optical axis and an edge of the field of view at the scale grating and along the direction of the elongated dimension, when the edge of the field of view is defined by the dimensions of the light receiving elements of the readhead and the optical magnification $M_y$.

13. The device of claim 1, wherein each of the respective optical detectors generates an output signal comprising a sinusoidal function of the relative displacement, and the sinusoidal function varies from an ideal sinusoidal function by at most $1/16$ of the peak-to-peak variation of the sinusoidal function.

14. The device of claim 13, wherein the sinusoidal function varies from an ideal sinusoidal function by at most $1/32$ of the peak-to-peak variation of the sinusoidal function.

15. The device of claim 1, wherein the readhead further comprises the illumination source.

16. The device of claim 15, wherein the readhead comprises a reflective surface surrounding the aperture, the reflective surface angled to receive light from the illumination source and deflect that light through the first lens to illuminate the scale grating.

17. The device of claim 1 in a transmissive configuration such that bright regions of the operable periodic image arise from light transmitted through the scale grating.

18. The device of claim 1 in a reflective configuration such that bright regions of the operable periodic image arise from light reflected from the scale grating.

19. The device of claim 18, wherein the scale grating comprises faceted reflective surfaces that are angled with respect to a nominal plane of the scale grating.

20. The device of claim 19, wherein:
the readhead further comprises the illumination source and illuminates the scale grating along a nominal illumination angle relative to a nominal plane of the scale grating; and
the scale grating comprises a first faceted reflective surface in each period of the scale grating that is nominally angled to receive illuminating rays along the nominal illumination angle and reflect those rays along a direction nominally parallel to an optical axis of the readhead, such that brighter regions in the operable periodic image arise from the first faceted reflective surfaces.

21. The device of claim 20, wherein the optical axis of the readhead is nominally normal to the nominal plane of the scale grating.

22. The device of claim 1, wherein the scale grating is provided by a tape-type scale.

23. The device of claim 1, wherein the scale grating is fixed to a generally planar member along a measuring axis direction that follows a straight line on the planar member.

24. The device of claim 1, wherein the scale grating is fixed to a generally planar disk-like member along a measuring axis direction that follows a circular path on the disk-like member.

25. The device of claim 1, wherein the scale grating is fixed to a generally cylindrical member along a measuring axis direction that follows a circular path around the cylindrical member.

26. The device of claim 1, wherein the set of respective optical detectors comprises a set of phase masks included in a set of respective fiber optic receiver channels and the readhead outputs respective optical signals along the respective fiber optic receiver channels, the respective optical signals comprising a sinusoidal function of the relative displacement, and the sinusoidal function varies from an ideal sinusoidal function by at most $1/16$ of the peak-to-peak variation of the sinusoidal function.

27. The device of claim 26, wherein the readhead is a miniature fiber optic readhead constructed such that at least a portion of a length of the housing can be inserted into a bore having a dimension perpendicular to its central axis that is at least as small as 5.0 millimeters.

28. The device of claim 1, the readhead further comprising a second lens having a focal length $F_s$, the second lens positioned within the housing between the aperture and the set of respective optical detectors at the focal length $F_s$ from the aperture, to receive light from the aperture and form the operable periodic image.

29. The device of claim 28, wherein a magnification M of the operable periodic image along the measuring axis direction is approximately $M=F_s/F$, and is set solely by adjusting the distances $F_s$ and F.

30. The device of claim 28, wherein the second lens has the same nominal optical characteristics as the first lens, $F_s=F$, and the first and second lenses are oriented symmetrically about the location of the aperture.

31. A device for measuring the relative displacement between two members, the device comprising:
(a) a scale grating extending along a measuring axis direction; and
(b) a readhead positionable to receive operable scale grating image light from the scale grating and provide an operable periodic image of the scale grating when the scale grating is illuminated with an effective illumination wavelength, the readhead comprising:
(i) a housing;
(ii) a lens positioned within the housing to receive light from the scale grating, the lens having a focal length F that defines a focal point on a side of the lens that faces away from the scale grating;
(iii) an aperture positioned approximately at the focal length F from the lens; and
(iv) a set of respective optical detectors positioned within the housing to respectively receive different phases of the operable periodic image, the set of respective optical detectors positioned at a distance D from the aperture, on the side of the aperture that faces away from the scale grating;
wherein a magnification M of the operable periodic image along the measuring axis direction is approximately M=D/F, and is set solely by adjusting the distances D and F.

32. A method for operating a device for measuring the relative displacement between two members, the device comprising:
(a) a scale grating extending along a measuring axis direction and having a scale grating pitch P; and (b) a readhead positionable to receive operable scale grating image light from the scale grating and provide an operable periodic image of the scale grating when the scale grating is illuminated with an effective illumination wavelength $\lambda$, the readhead comprising:
  (i) a housing;
  (ii) a set of respective optical detectors positioned within the housing to respectively receive different phases of the operable periodic image; and
  (iii) a diffraction-limited imaging system comprising;
    (iii-1) a first lens positioned within the housing to receive light from the scale grating, the lens having a focal length F that defines a focal point located between the lens and the set of respective optical detectors; and
    (iii-2) an aperture positioned approximately at the focal length F between the lens and the set of respective optical detectors and having a dimension W along the measuring axis direction such that $W=F*\lambda*(n/P)$, wherein n/P is a cutoff spatial frequency, and one of the following conditions is satisfied: C1) the operable scale grating image light is incoherent and n is greater than 1.2 and at most 3.5, and C2) the operable scale grating image light is coherent and n is greater than 2.0 and less than 6.0;

the method comprising:

operably positioning the readhead relative to the scale grating;

inputting the operable scale grating image light from the scale grating through at least the first lens and the aperture to provide the operable periodic image;

receiving the operable periodic image at an image receiving plane of the set of respective optical detectors; and outputting at least two respective out-of-phase output signals derived from the received operable periodic image and the set of respective optical detectors, the output signals comprising approximately sinusoidal functions of the relative displacement.

33. The method of claim 32, wherein each sinusoidal function varies from an ideal sinusoidal function by at most $\frac{1}{16}$ of the peak-to-peak variation of the sinusoidal function.

34. The method of claim 32, wherein each sinusoidal function varies from an ideal sinusoidal function by at most $\frac{1}{32}$ of the peak-to-peak variation of the sinusoidal function.

* * * * *

UNITED STATES PATENT AND TRADEMARK OFFICE
CERTIFICATE OF CORRECTION

PATENT NO. : 7,186,969 B2
APPLICATION NO. : 10/804636
DATED : March 6, 2007
INVENTOR(S) : E.H. Altendorf et al.

It is certified that error appears in the above-identified patent and that said Letters Patent is hereby corrected as shown below:

| COLUMN | LINE | ERROR |
|---|---|---|
| Title Page (12) Pg. 1, col. 1 | Inventors | "Shimomura et al." should read --Altendorf et al.-- |
| Title Page (75) Pg. 1, col. 1 | Inventors | delete "Toshitaka Shimomura, Utsunomiya (JP); Shingo Nihommori, Kawasaki (JP); Miyako Mizutani, Kawasaki (JP);" |
| Title Page (56) Pg. 2, col. 2 | Refs. Cited, (Other Publs., Item 2) | "sytstems" should read --systems-- |
| 38 (Claim 28, | 24 line 2) | "$F_{s,}$" should read --Fs,-- |
| 38 (Claim 28, | 26 line 4) | "$F_s$" should read --Fs-- |
| 38 (Claim 29, | 31 line 3) | "$M=F_s/F,$" should read --M=Fs/F,-- |
| 38 (Claim 29, | 32 line 4) | "$F_s$" should read --Fs-- |

UNITED STATES PATENT AND TRADEMARK OFFICE
CERTIFICATE OF CORRECTION

PATENT NO. : 7,186,969 B2
APPLICATION NO. : 10/804636
DATED : March 6, 2007
INVENTOR(S) : E.H. Altendorf et al.

It is certified that error appears in the above-identified patent and that said Letters Patent is hereby corrected as shown below:

| COLUMN | LINE | ERROR |
|---|---|---|
| 38 (Claim 30, | 35 line 3) | "$F_s=F$," should read --Fs=F,-- |

Signed and Sealed this

Thirty-first Day of July, 2007

JON W. DUDAS
*Director of the United States Patent and Trademark Office*